(12) United States Patent
Ihara et al.

(10) Patent No.: US 9,806,377 B2
(45) Date of Patent: Oct. 31, 2017

(54) SECONDARY BATTERY, ELECTROLYTIC SOLUTION, BATTERY PACK, ELECTRONIC DEVICE, AND ELECTRICAL VEHICLE

(75) Inventors: Masayuki Ihara, Fukushima (JP); Yuko Hayakawa, Fukushima (JP); Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 1232 days.

(21) Appl. No.: 13/513,473

(22) PCT Filed: Dec. 2, 2010

(86) PCT No.: PCT/JP2010/071569
§ 371 (c)(1),
(2), (4) Date: Aug. 6, 2012

(87) PCT Pub. No.: WO2011/070964
PCT Pub. Date: Jun. 16, 2011

(65) Prior Publication Data
US 2013/0052543 A1  Feb. 28, 2013

(30) Foreign Application Priority Data

Dec. 7, 2009  (JP) ................. 2009-277634
Dec. 8, 2009  (JP) ................. 2009-278255
Dec. 18, 2009 (JP) ................. 2009-287968

(51) Int. Cl.
*H01M 10/0567* (2010.01)
*H01M 10/0568* (2010.01)
*H01M 10/0569* (2010.01)

(52) U.S. Cl.
CPC ... *H01M 10/0568* (2013.01); *H01M 10/0567* (2013.01); *H01M 10/0569* (2013.01)

(58) Field of Classification Search
CPC ......... H01M 10/0567; H01M 10/0568; H01M 10/0569
See application file for complete search history.

(56) References Cited

U.S. PATENT DOCUMENTS 6,436,582 B1 *  8/2002  Hamamoto ......... H01M 4/5815
                                            252/62.2
6,495,287 B1   12/2002  Kolb et al.
(Continued)

FOREIGN PATENT DOCUMENTS

CN  1358726   7/2002
CN  1371911  10/2002
(Continued)

OTHER PUBLICATIONS

State Intellectual Property Office of P.R.C., Notification of the First Office Action issued in connection with P.R.C. Application No. 201080054468.9, dated Jan. 24, 2014. (16 pages).

(Continued)

*Primary Examiner* — Barbara Gilliam
*Assistant Examiner* — Angela Martin
(74) *Attorney, Agent, or Firm* — K&L Gates LLP

(57) ABSTRACT

A secondary battery capable of improving cycle characteristics, conservation characteristics, and load characteristics is provided. The secondary battery includes a cathode, an anode, and an electrolytic solution. A separator provided between the cathode and the anode is impregnated with an electrolytic solution. The electrolytic solution includes one or more of a dicarbonic ester compound, a dicarboxylic compound, a disulfonic compound, a monofluoro lithium phosphate, and difluoro lithium phosphate and one or more of fluorinated lithium phosphate, fluorinated lithium borate, and imide lithium.

8 Claims, 5 Drawing Sheets

(56) References Cited

U.S. PATENT DOCUMENTS

| | | | |
|---|---|---|---|
| 7,498,102 B2 * | 3/2009 | Oh | C08L 83/12 |
| | | | 429/307 |
| 9,093,716 B2 * | 7/2015 | Tokuda | H01M 4/134 |
| 2001/0039230 A1 * | 11/2001 | Severinsky | B60H 1/004 |
| | | | 477/3 |
| 2002/0090547 A1 | 7/2002 | Schmidt et al. | |
| 2002/0122979 A1 | 9/2002 | Schmidt et al. | |
| 2002/0122988 A1 * | 9/2002 | Hamamoto | H01M 4/587 |
| | | | 429/340 |
| 2006/0134527 A1 | 6/2006 | Amine et al. | |
| 2007/0224514 A1 | 9/2007 | Kotato et al. | |
| 2008/0292971 A1 * | 11/2008 | Ihara | H01M 10/052 |
| | | | 429/331 |
| 2010/0099031 A1 | 4/2010 | Kato et al. | |

FOREIGN PATENT DOCUMENTS

| | | | | |
|---|---|---|---|---|
| CN | 101359750 | | 2/2009 | |
| CN | 101438449 | | 5/2009 | |
| CN | 101507041 | | 8/2009 | |
| EP | 1199766 | * | 4/2002 | ............ H01M 10/40 |
| JP | 08-138741 | * | 5/1996 | |
| JP | 2000-133304 | | 5/2000 | |
| JP | 2000-353546 | | 12/2000 | |
| JP | 2001-057238 | | 2/2001 | |
| JP | 2001-519589 | | 10/2001 | |
| JP | 2001-313071 | | 11/2001 | |
| JP | 2002-308884 | | 10/2002 | |
| JP | 2003-034692 | | 2/2003 | |
| JP | 2004-349132 | | 12/2004 | |
| JP | 2005-340080 | | 12/2005 | |
| JP | 2006-012780 | | 1/2006 | |
| JP | 2006-156008 | | 6/2006 | |
| JP | 2007-005242 | | 1/2007 | |
| JP | 2007-095380 | | 4/2007 | |
| JP | 2007-172947 | | 7/2007 | |
| JP | 2007-220313 | | 8/2007 | |
| JP | 2007-258103 | | 10/2007 | |
| JP | 2008-140767 | | 6/2008 | |
| JP | 2008-218425 | | 9/2008 | |
| JP | 2008-269978 | | 11/2008 | |
| JP | 2008-288144 | | 11/2008 | |
| JP | 2009-129797 | * | 6/2009 | |
| TW | 432733 | | 5/2001 | |

OTHER PUBLICATIONS

European Search Report issued Jun. 18, 2013 for corresponding European Patent Application No. 10835885.4.

* cited by examiner

[ FIG. 1 ]
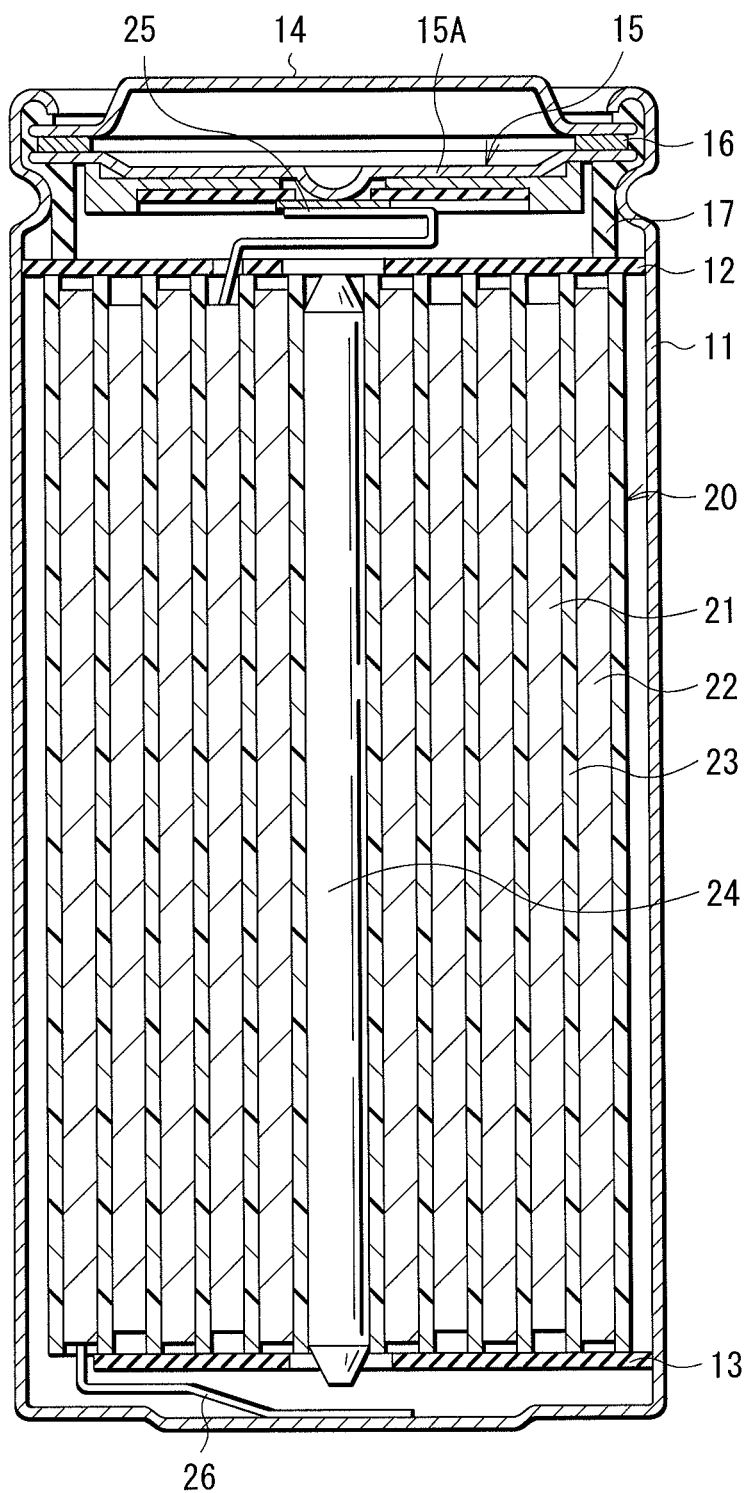

[ FIG. 2 ]
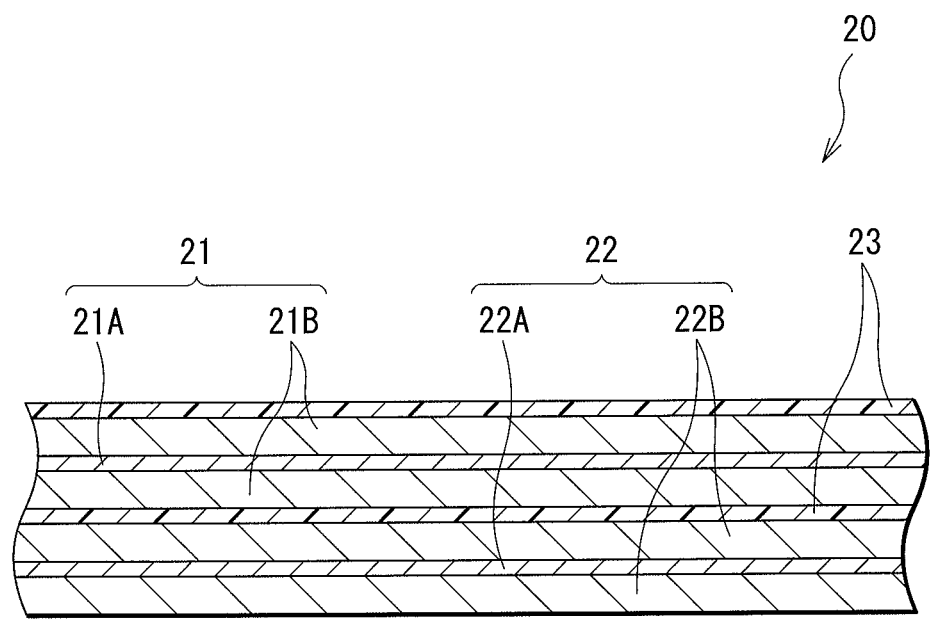

[FIG. 3]
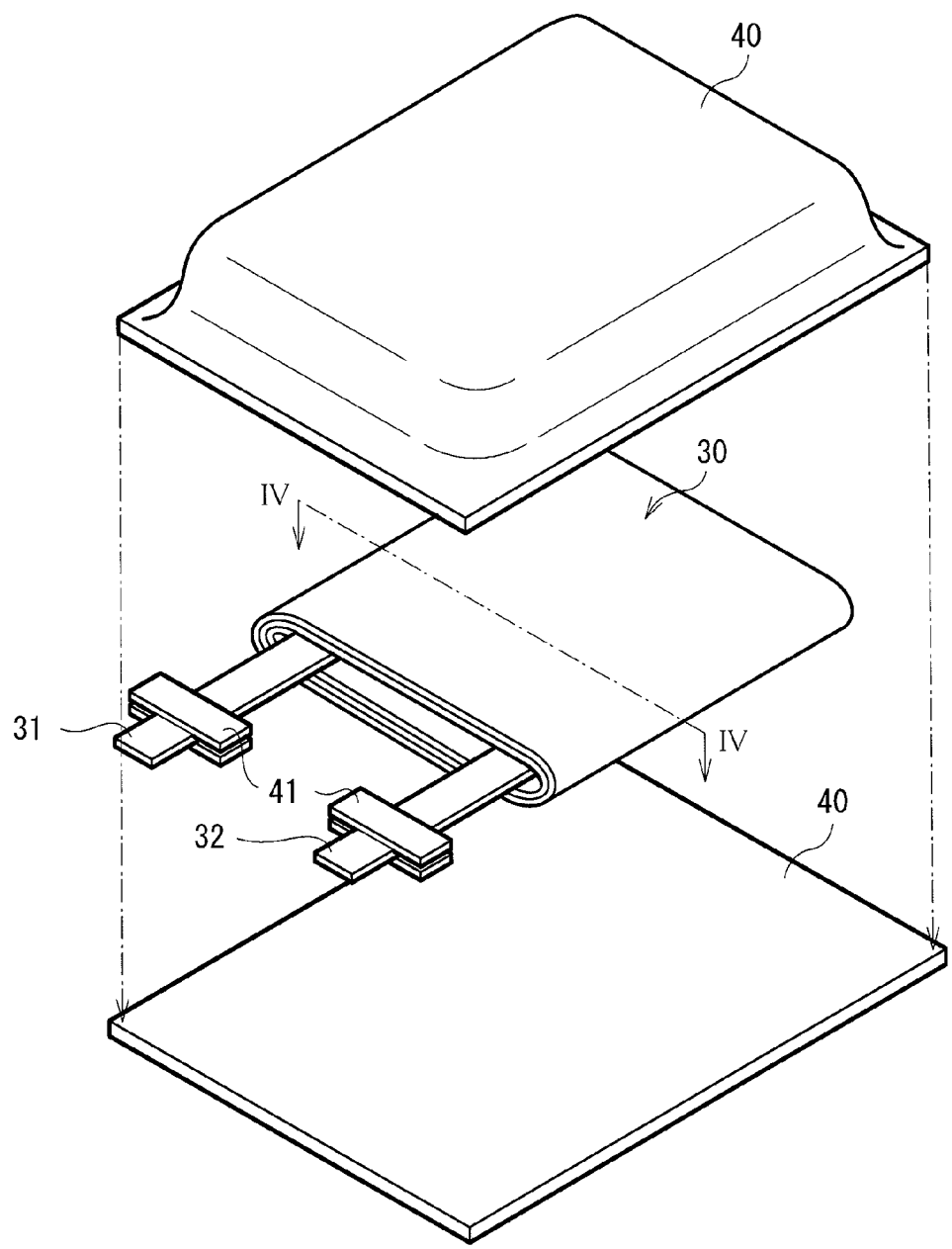

[ FIG. 4 ]
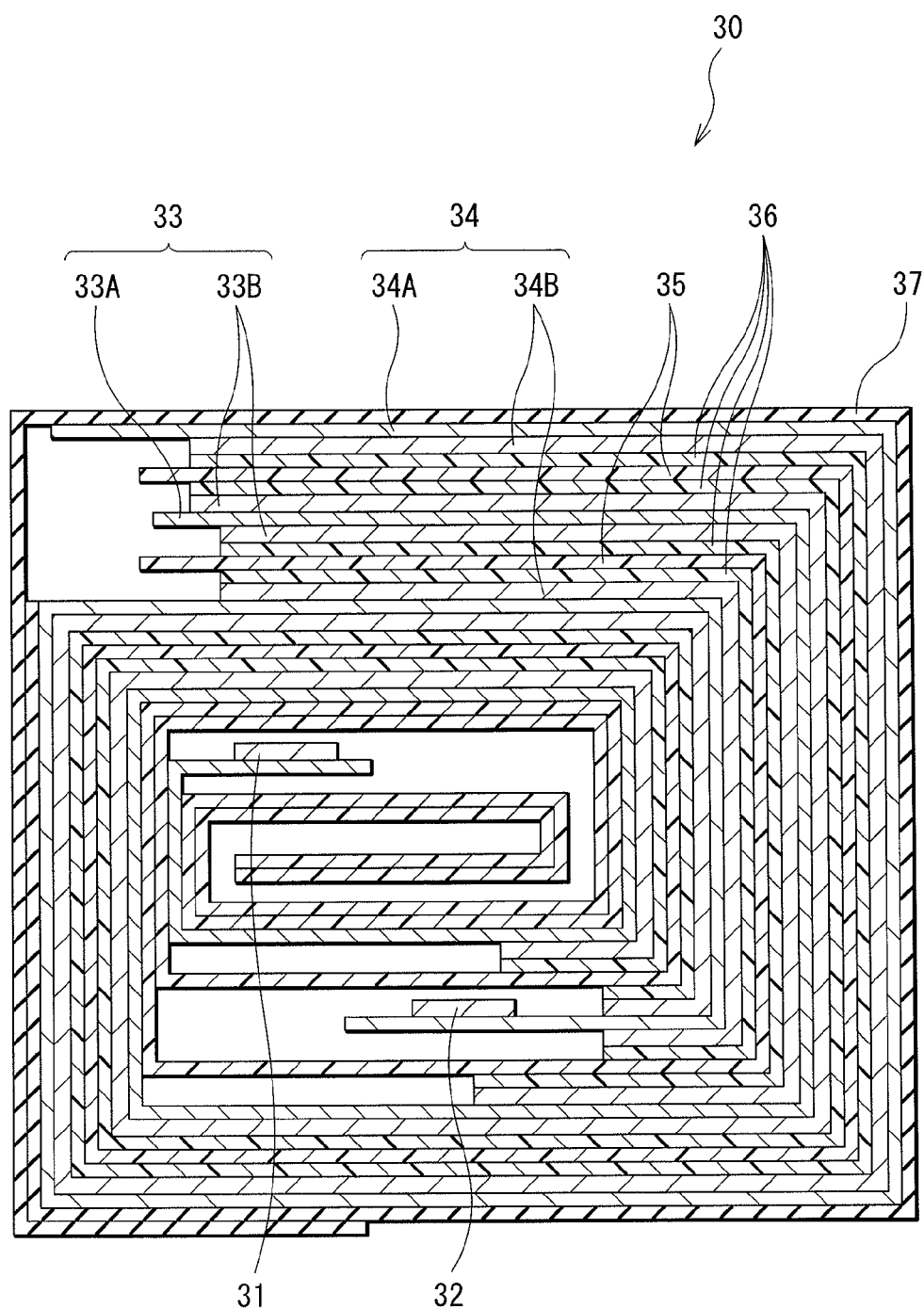

[ FIG. 5 ]
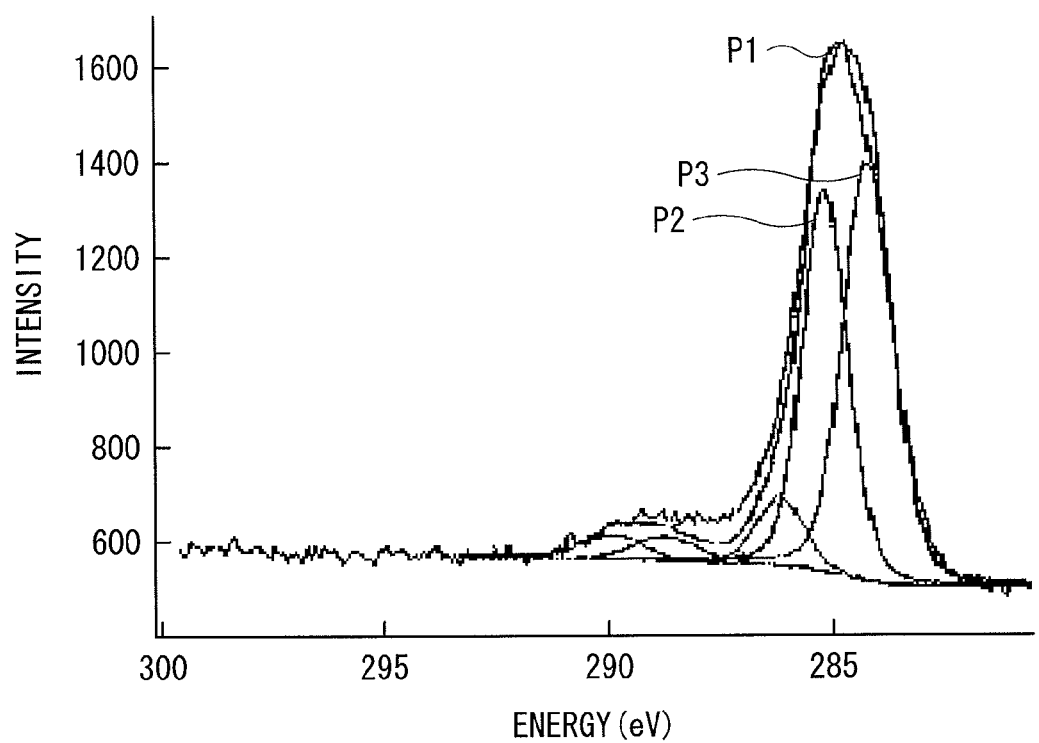

SECONDARY BATTERY, ELECTROLYTIC SOLUTION, BATTERY PACK, ELECTRONIC DEVICE, AND ELECTRICAL VEHICLE

CROSS REFERENCES TO RELATED APPLICATIONS

The present application is a national stage of International Application No. PCT/JP2010/067353 filed on Dec. 2, 2010 and claims priority to Japanese Patent Application No. 2009-277634 filed on Dec. 7, 2009, Japanese Patent Application No. 2009-278255 filed on Dec. 8, 2009, and Japanese Patent Application No. 2009-287968 filed on Dec. 18, 2009, the disclosures of which are incorporated herein by reference.

BACKGROUND

The present invention relates to an electrolytic solution containing a nonaqueous solvent and an electrolyte salt, a secondary battery using the same, a battery pack using the same, an electronic device using the same, and an electrical vehicle using the same.

In recent years, electronic devices represented by a portable terminal or the like have been widely used, and it is strongly demanded to reduce their size and weight and to achieve their long life. Accordingly, as a power source, a battery, in particular, a small and light-weight secondary battery capable of providing a high energy density has been developed. In these days, it has been considered to apply such a secondary battery not only to the electronic devices but also to a power source such as a battery pack, an electrical vehicle such as an electrical automobile, or the like.

For the secondary battery, it has been considered to use various elements as a carrier (matter entering and leaving a cathode and an anode at the time of charge and discharge). Specially, a lithium secondary battery using lithium as a carrier (using lithium reaction as charge and discharge reaction) is largely prospective, since such a lithium secondary battery provides a higher energy density than a lead battery and a nickel cadmium battery. The lithium secondary battery includes a lithium ion secondary battery using insertion and extraction of lithium ions and a lithium metal secondary battery using precipitation and dissolution of lithium metal.

The secondary battery includes a cathode, an anode, and an electrolytic solution. The electrolytic solution contains a nonaqueous solvent and an electrolyte salt. The electrolytic solution functioning as a medium for charge and discharge reaction largely affects performance of the secondary battery. Thus, various studies have been made on the composition thereof.

Specifically, to improve high temperature characteristics, a dicarbonic ester compound, a dicarboxylic compound, or a disulfonic compound is used (for example, see Patent document 1). To improve durable years and performance by improving ion conductivity, tetrakisfluoroalkyl borate or fluoroalkylphosphate is used (for example, see Patent documents 2 and 3). To improve performance, a lithium salt such as $Li[N(SO_2F)_2]$ is used (for example, see Patent document 4). To improve high temperature conservation characteristics and cycle characteristics, lithium phosphate difluoride is used (for example, see Patent document 5).

Further, to improve swollenness characteristics in the high temperature environment, initial charge and discharge characteristics, and the like, a spirodilactone compound such as 1,6-dioxaspiro[4,4]nonane-2,7-dione is used (for example, see Patent documents 6 to 9).

Specifically, to improve cycle characteristics, a spiro dry compound or a dioxane compound is used as an electrode stabilizing addition agent (for example, see Patent document 10). To improve high temperature conservation characteristics and cycle characteristics, a dicarbonic ester compound is used (for example, see Patent document 11). In this case, as other auxiliary agent, tetraoxaspiro[5,5]undecane or the like is used.

PRIOR ART DOCUMENTS

Patent Documents

Patent document 1: Japanese Unexamined Patent Application Publication No. 2008-288144
Patent document 2: Japanese Unexamined Patent Application Publication No. 2002-308884
Patent document 3: Japanese Unexamined Patent Application Publication No. 2003-034692
Patent document 4: Japanese Unexamined Patent Application Publication (Translation of PCT Application) No. 2001-519589
Patent document 5: Japanese Unexamined Patent Application Publication No. 2008-140767
Patent document 6: Japanese Unexamined Patent Application Publication No. 2007-172947
Patent document 7: Japanese Unexamined Patent Application Publication No. 11-219725
Patent document 8: Japanese Unexamined Patent Application Publication No. 2001-052752
Patent document 9: Japanese Unexamined Patent Application Publication No. 2000-353546
Patent document 10: Japanese Unexamined Patent Application Publication (Translation of PCT Application) No. 2008-533650
Patent document 11: Japanese Unexamined Patent Application Publication No. 2007-005242

SUMMARY

In recent years, high performance and multi-functions of the electronic devices are increasingly developed, and usage frequency thereof is increased. Thus, the secondary battery tends to be frequently charged and discharged. Accordingly, further improvement of performance of the secondary battery, in particular, further improvement of cycle characteristics, conservation characteristics, and the load characteristics of the secondary battery has been aspired.

In view of the foregoing disadvantages, it is an object of the present invention to provide an electrolytic solution capable of improving cycle characteristics, conservation characteristics, and load characteristics, a secondary battery using the same, a battery pack using the same, an electronic device using the same, and an electrical vehicle using the same.

An electrolytic solution according to the present invention is used for a secondary battery, and includes a nonaqueous solvent; an electrolyte salt; one or more of compounds represented by Formula (1) to Formula (5); and one or more of compounds represented by Formula (6) to Formula (8). Further, a secondary battery according to the present invention includes a cathode, an anode, and an electrolytic solution. The electrolytic solution has a composition similar to that of the foregoing electrolytic solution according to the present invention.

[Chemical formula 1]

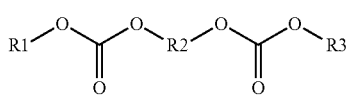

(1)

(Each of R1 and R3 is an alkyl group, an alkenyl group, an alkynyl group, an aryl group, or a heterocyclic group; an alkyl group, an alkenyl group, or an alkynyl group partially substituted by an aromatic hydrocarbon group or an alicyclic hydrocarbon group; or a halogenated group thereof. R2 is a straight-chain or branched alkylene group, an arylene group, a divalent group including an arylene group and an alkylene group, a divalent group having carbon number from 2 to 12 both inclusive and including an ether bond (—O—) and an alkylene group, or a halogenated group thereof.)

[Chemical formula 2]

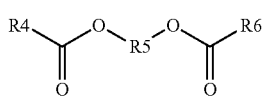

(2)

(Each of R4 and R6 is an alkyl group, an alkenyl group, an alkynyl group, an aryl group, or a heterocyclic group; an alkyl group, an alkenyl group, or an alkynyl group partially substituted by an aromatic hydrocarbon group or an alicyclic hydrocarbon group; or a halogenated group thereof. R5 is a straight-chain or branched alkylene group, an arylene group, a divalent group including an arylene group and an alkylene group, a divalent group having carbon number from 2 to 12 both inclusive and including an ether bond and an alkylene group, or a halogenated group thereof).

[Chemical formula 3]

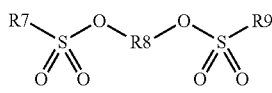

(3)

(Each of R7 and R9 is an alkyl group, an alkenyl group, an alkynyl group, an aryl group, or a heterocyclic group; an alkyl group, an alkenyl group, or an alkynyl group partially substituted by an aromatic hydrocarbon group or an alicyclic hydrocarbon group; or a halogenated group thereof. R8 is a straight-chain or branched alkylene group, an arylene group, a divalent group including an arylene group and an alkylene group, a divalent group having carbon number from 2 to 12 both inclusive and including an ether bond and an alkylene group, or a halogenated group thereof).

$Li_2PFO_3$ (4)

$LiPF_2O_2$ (5)

$Li[PF_mR10_{6-m}]$ (6)

(R10 is a perfluoroalkyl group or a perfluoroaryl group. m is one of integer numbers from 0 to 5 both inclusive.)

$Li[BF_nR11_{4-n}]$ (7)

(R11 is a perfluoroalkyl group or a perfluoroaryl group. n is one of integer numbers from 0 to 3 both inclusive.)

$Li[N(SO_2F)_2]$ (8)

Another electrolytic solution according to the present invention is used for a secondary battery, and includes a nonaqueous solvent; an electrolyte salt; one or more of compounds represented by Formula (9) to Formula (13); and a compound represented by Formula (14). Further, a secondary battery according to the present invention includes a cathode, an anode, and an electrolytic solution. The electrolytic solution has a composition similar to that of the foregoing electrolytic solution according to the present invention.

[Chemical formula 4]

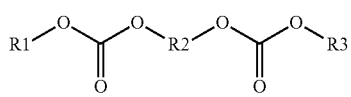

(9)

(Each of R1 and R3 is an alkyl group, an alkenyl group, an alkynyl group, an aryl group, or a heterocyclic group; an alkyl group, an alkenyl group, or an alkynyl group partially substituted by an aromatic hydrocarbon group or an alicyclic hydrocarbon group; or a halogenated group thereof. R2 is a straight-chain or branched alkylene group, an arylene group, a divalent group including an arylene group and an alkylene group, a divalent group having carbon number from 2 to 12 both inclusive and including an ether bond (—O—) and an alkylene group, or a halogenated group thereof).

[Chemical formula 5]

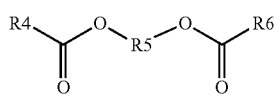

(10)

(Each of R4 and R6 is an alkyl group, an alkenyl group, an alkynyl group, an aryl group, or a heterocyclic group; an alkyl group, an alkenyl group, or an alkynyl group partially substituted by an aromatic hydrocarbon group or an alicyclic hydrocarbon group; or a halogenated group thereof. R5 is a straight-chain or branched alkylene group, an arylene group, a divalent group including an arylene group and an alkylene group, a divalent group having carbon number from 2 to 12 both inclusive and including an ether bond and an alkylene group, or a halogenated group thereof).

[Chemical formula 6]

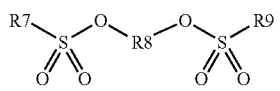

(11)

(Each of R7 and R9 is an alkyl group, an alkenyl group, an alkynyl group, an aryl group, or a heterocyclic group; an alkyl group, an alkenyl group, or an alkynyl group partially substituted by an aromatic hydrocarbon group or an alicyclic hydrocarbon group; or a halogenated group thereof. R8 is a straight-chain or branched alkylene group, an arylene group, a divalent group including an arylene group and an alkylene group, a divalent group having carbon number from 2 to 12 both inclusive and including an ether bond and an alkylene group, or a halogenated group thereof).

$$Li_2PFO_3 \quad (12)$$

$$LiPF_2O_2 \quad (13)$$

[Chemical formula 7]

(14)

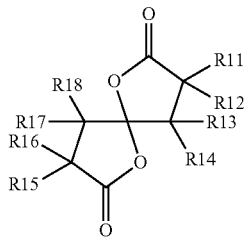

(Each of R11 to R18 is an alkyl group with carbon number from 1 to 12 both inclusive; an alkenyl group with carbon number from 2 to 12 both inclusive; an alkynyl group with carbon number from 2 to 12 both inclusive; an aryl group with carbon number from 6 to 18 both inclusive; an alkoxy group with carbon number from 1 to 12 both inclusive; a halogenated group thereof; a hydrogen group; or a halogen group. R11 to R18 are allowed to be bonded with each other to form a ring structure.)

Still another electrolytic solution according to the present invention is used for a secondary battery, and includes a nonaqueous solvent, an electrolyte salt, one or more of compounds represented by Formula (15) and Formula (16), and one or more of compounds represented by Formula (17) and Formula (18). Further, a secondary battery according to the present invention includes a cathode, an anode, and an electrolytic solution. The electrolytic solution has a composition similar to that of the foregoing electrolytic solution according to the present invention.

$$Li_2PFO_3 \quad (15)$$

$$LiPF_2O_2 \quad (16)$$

[Chemical formula 8]

(17)

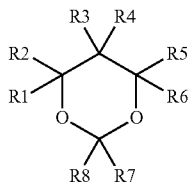

(Each of R1 to R8 is an alkyl group with carbon number from 1 to 12 both inclusive; an alkenyl group with carbon number from 2 to 12 both inclusive; an alkynyl group with carbon number from 2 to 12 both inclusive; an aryl group with carbon number from 6 to 18 both inclusive; an alkoxy group with carbon number from 1 to 12 both inclusive; a halogenated group thereof; a hydrogen group; or a halogen group. R1 to R8 are allowed to be bonded with each other to form a ring structure.)

[Chemical formula 9]

(18)

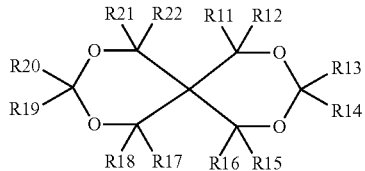

(Each of R11 to R22 is an alkyl group with carbon number from 1 to 12 both inclusive; an alkenyl group with carbon number from 2 to 12 both inclusive; an alkynyl group with carbon number from 2 to 12 both inclusive; an aryl group with carbon number from 6 to 18 both inclusive; an alkoxy group with carbon number from 1 to 12 both inclusive; a halogenated group thereof; a hydrogen group; or a halogen group. R11 to R22 are allowed to be bonded with each other to form a ring structure.)

Further, a battery pack, an electronic device, and an electrical vehicle according to the present invention include a secondary battery. The secondary battery has a configuration similar to that of the foregoing secondary battery according to the present invention.

The electrolytic solution according to the present invention includes one or more of the compounds shown in Formula (1) to Formula (5) and one or more of the compounds shown in Formula (6) to Formula (8). Thereby, chemical stability is improved more than in a case that the electrolytic solution contains none thereof or only either thereof. Therefore, according to a secondary battery using the electrolytic solution, cycle characteristics, conservation characteristics, and load characteristics are allowed to be improved.

Another electrolytic solution according to the present invention includes one or more of the compounds shown in Formula (9) to Formula (13) and the compound shown in Formula (14). Thus, chemical stability is improved more than in a case that the electrolytic solution contains none thereof or only either thereof. Therefore, according to a secondary battery using the electrolytic solution, cycle characteristics, conservation characteristics, and load characteristics are allowed to be improved.

Still another electrolytic solution according to the present invention includes one or more of the compounds shown in Formula (15) and Formula (16) and one or more of the compounds shown in Formula (17) and Formula (18). Thus, chemical stability is improved more than in a case that the electrolytic solution contains none thereof or only either thereof. Therefore, according to a secondary battery using the electrolytic solution, cycle characteristics, conservation characteristics, and load characteristics are allowed to be improved.

Further, according to the battery pack, the electronic device, and the electrical vehicle including the secondary battery according to the present invention, characteristics such as the foregoing cycle characteristics are allowed to be improved.

Additional features and advantages are described herein, and will be apparent from the following Detailed Description and the figures.

BRIEF DESCRIPTION OF THE FIGURES

FIG. 1 is a cross-sectional view illustrating a configuration of a cylindrical type secondary battery including an electrolytic solution for a secondary battery according to an embodiment of the present invention.

FIG. 2 is a cross-sectional view illustrating an enlarged part of a spirally wound electrode body illustrated in FIG. 1.

FIG. 3 is a perspective view illustrating a configuration of a laminated film type secondary battery including an electrolytic solution for a secondary battery according to an embodiment of the present invention.

FIG. 4 is a cross-sectional view taken along a line IV-IV of a spirally wound electrode body illustrated in FIG. 3.

FIG. 5 is a diagram illustrating an analytical result of an SnCoC-containing material by XPS.

DETAILED DESCRIPTION

A description will be hereinafter given in detail of embodiments of the present invention with reference to the drawings. The description will be given in the following order.

1. Electrolytic Solution
1-1. First Embodiment
1-2. Second Embodiment
1-3. Third Embodiment
2. Secondary Battery
2-1. Lithium Ion Secondary Battery (Cylindrical Type)
2-2. Lithium Ion Secondary Battery (Laminated Film Type)
2-3. Lithium Metal Secondary Battery (Cylindrical Type and Laminated Film Type)
3. Applications of Secondary Battery

[1. Electrolytic Solution]

[1-1. First Embodiment]

An electrolytic solution according to a first embodiment of the present invention is used for a secondary battery or the like, and contains a nonaqueous solvent and an electrolyte salt. Further, the electrolytic solution contains one, or two or more of compounds represented by Formula (1) to Formula (5) and one, or two or more of compounds represented by Formula (6) to Formula (8). The electrolytic solution contains the compounds shown in Formula (1) to Formula (5) and the compounds shown in Formula (6) to Formula (8) in combination for the following reason. That is, chemical stability is thereby improved more than in a case that the electrolytic solution contains none thereof or only either thereof.

[Chemical formula 10]

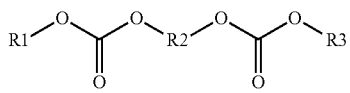

(1)

(Each of R1 and R3 is an alkyl group, an alkenyl group, an alkynyl group, an aryl group, or a heterocyclic group; an alkyl group, an alkenyl group, or an alkynyl group partially substituted by an aromatic hydrocarbon group or an alicyclic hydrocarbon group; or a halogenated group thereof. R2 is a straight-chain or branched alkylene group, an arylene group, a divalent group including an arylene group and an alkylene group, a divalent group having carbon number from 2 to 12 both inclusive and including an ether bond (—O—) and an alkylene group, or a halogenated group thereof).

[Chemical formula 11]

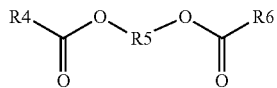

(2)

(Each of R4 and R6 is an alkyl group, an alkenyl group, an alkynyl group, an aryl group, or a heterocyclic group; an alkyl group, an alkenyl group, or an alkynyl group partially substituted by an aromatic hydrocarbon group or an alicyclic hydrocarbon group; or a halogenated group thereof. R5 is a straight-chain or branched alkylene group, an arylene group, a divalent group including an arylene group and an alkylene group, a divalent group having carbon number from 2 to 12 both inclusive and including an ether bond and an alkylene group, or a halogenated group thereof).

[Chemical formula 12]

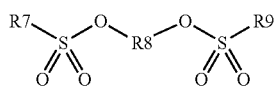

(3)

(Each of R7 and R9 is an alkyl group, an alkenyl group, an alkynyl group, an aryl group, or a heterocyclic group; an alkyl group, an alkenyl group, or an alkynyl group partially substituted by an aromatic hydrocarbon group or an alicyclic hydrocarbon group; or a halogenated group thereof. R8 is a straight-chain or branched alkylene group, an arylene group, a divalent group including an arylene group and an alkylene group, a divalent group having carbon number from 2 to 12 both inclusive and including an ether bond and an alkylene group, or a halogenated group thereof).

 (4)

 (5)

 (6)

(R10 is a perfluoroalkyl group or a perfluoroaryl group. m is one of integer numbers from 0 to 5 both inclusive.)

 (7)

(R11 is a perfluoroalkyl group or a perfluoroaryl group. n is one of integer numbers from 0 to 3 both inclusive.)

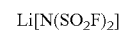 (8)

[Compounds Shown in Formula (1) to Formula (8)]

The compound shown in Formula (1) is a dicarbonic ester compound having an ester carbonate moiety (—O—C(=O)—O—R) on both ends thereof. R1 and R3 may be the same group, or may be groups different from each other.

A description will be herein after given in detail of R1 and R3. Examples of the alkyl group include a methyl group, an ethyl group, an n (normal)-propyl group, an isopropyl group, an n-butyl group, and an isobutyl group. Examples of the alkyl group include a sec (secondary)-butyl group, a tert (tertiary)-butyl group, an n-pentyl group, a 2-methylbutyl group, a 3-methylbutyl group, a 2,2-dimethylpropyl group, and an n-hexyl group. Examples of the alkenyl group include an n-heptyl group, a vinyl group, a 2-methylvinyl group, a 2,2-dimethylvinyl group, a butene-2,4-diyl group, and an aryl group. Examples of the alkynyl group include an ethynyl group. Though the carbon number of the foregoing alkyl group or the like is not particularly limited, the carbon number thereof is preferably from 1 to 20 both inclusive, is more preferably from 1 to 7 both inclusive, and is further more preferably from 1 to 4 both inclusive for the following reason. That is, superior solubility and superior compatibility are thereby obtained. Examples of the aryl group include a phenyl group.

For the alkyl group or the like partially substituted by an aromatic hydrocarbon group or an alicyclic hydrocarbon group, examples of the aromatic hydrocarbon group include a phenyl group, and examples of the alicyclic hydrocarbon group include a cyclohexyl group. Of the foregoing, examples of an alkyl group partially substituted by a phenyl group (aralkyl group) include a benzil group and a 2-phenylethyl group (phenethyl group).

For the halogenated alkyl group or the like, though a halogen type thereof is not particularly limited, specially, fluorine (F), chlorine (Cl), or bromine (Br) is preferable, and fluorine is more preferable. Examples of the halogenated alkyl group include a fluorinated alkyl group. Examples of the fluorinated alkyl group include a fluoromethyl group, a difluoromethyl group, a trifluoromethyl group, a 2,2,2-trifluoroethyl group, and a pentafluoroethyl group. It is to be noted that "Halogenated group" means a group obtained by substituting part or all of hydrogen groups (—H) out of the alkyl group or the like by halogen groups (—F or the like).

Specially, the group partially substituted by an aromatic hydrocarbon group or an alicyclic hydrocarbon group is more preferable, and a group not substituted by an aromatic hydrocarbon group or an alicyclic hydrocarbon group is much more preferable than the halogenated group. In the group partially substituted by an aromatic hydrocarbon group or an alicyclic hydrocarbon group, the carbon number thereof is not particularly limited. As the carbon number, the total of the carbon number of the aromatic hydrocarbon group or the alicyclic hydrocarbon group and the carbon number of the alkyl group or the like is preferably equal to or less than 20, and is more preferably equal to or less than 7.

It is to be noted that each of R1 and R3 may be a derivative of the foregoing alkyl group or the like. The derivative represents a group obtained by introducing one, or two or more substituent groups to the alkyl group or the like. Such a substituent group may be a carbon hydride group, or may be a group other than the carbon hydride group.

A description will be hereinafter given in detail of R2. Though the carbon number of the straight-chain or branched alkyl group or the like is not particularly limited, specially, the carbon number thereof is preferably from 2 to 10 both inclusive, is more preferably from 2 to 6 both inclusive, and is further more preferably from 2 to 4 both inclusive for the following reason. That is, superior solubility and superior compatibility are thereby obtained. It is to be noted that the divalent group containing an arylene group and an alkylene group may be a group in which one arylene group is linked to one alkylene group, or may be a group in which two alkylene groups are linked to each other with an arylene group in between (aralkylene group).

In this case, examples of R2 include straight-chain alkylene groups represented by Formula (1-11) to Formula (1-17), branched alkylene groups represented by Formula (1-18) to Formula (1-26), arylene groups represented by Formula (1-27) to Formula (1-29), and divalent groups represented by Formula (1-30) to Formula (1-32) containing an arylene group and an alkylene group (benzylidene group).

[Chemical formula 13]

 (1-11)

 (1-12)

 (1-13)

 (1-14)

 (1-15)

 (1-16)

 (1-17)

[Chemical formula 14]

 (1-18)

 (1-19)

 (1-20)

 (1-21)

 (1-22)

 (1-23)

 (1-24)

 (1-25)

-continued (1-26)
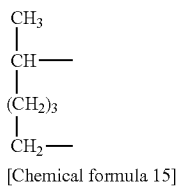

[Chemical formula 15]

(1-27)
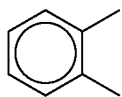

(1-28)
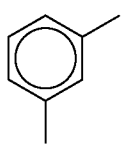

(1-29)
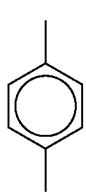

(1-30)
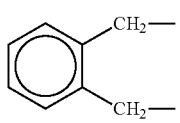

(1-31)
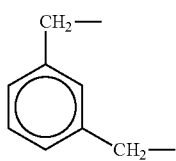

(1-32)
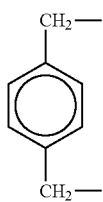

Further, as the divalent group having carbon number from 2 to 12 both inclusive and containing an ether bond and an alkylene group, a group in which two or more alkylene groups are linked to each other through an ether bond, and both ends thereof are a carbon atom is preferable. The carbon number of such a group is preferably from 4 to 12 both inclusive for the following reason. That is, superior solubility and superior compatibility are thereby obtained. The number of ether bonds, linkage order of the ether bond and the alkylene group, and the like are arbitrarily set.

In this case, examples of R2 include groups represented by Formula (1-33) to Formula (1-45). Further, in the case where the divalent groups shown in Formula (1-33) to Formula (1-45) are fluorinated, examples thereof include groups represented by Formula (1-46) to Formula (1-54). Specially, the groups shown in Formula (1-38) to Formula (1-40) are preferable.

[Chemical formula 16]

$-CH_2-O-CH_2-$ (1-33)

$-CH_2(-O-CH_2-)_2$ (1-34)

$-CH_2(-O-CH_2-)_3$ (1-35)

$-CH_2(-O-CH_2-)_4$ (1-36)

$-CH_2(-O-CH_2-)_5$ (1-37)

$-CH_2-CH_2-O-CH_2-CH_2-$ (1-38)

$-CH_2-CH_2(-O-CH_2-CH_2-)_2$ (1-39)

$-CH_2-CH_2(-O-CH_2-CH_2-)_4$ (1-40)

$-CH_2-CH_2(-O-CH_2-CH_2-)_4$ (1-41)

$-CH_2-CH_2(-O-CH_2-CH_2-)_5$ (1-42)

$-CH_2-CH_2-CH_2-O-CH_2-CH_2-CH_2$ (1-43)

$-CH_2-CH_2-CH_2(-O-CH_2-CH_2-CH_2-)_2$ (1-44)

$-CH_2-CH_2-CH_2(-O-CH_2-CH_2-CH_2-)_3$ (1-45)

[Chemical formula 17]

$-CF_2-O-CF_2-$ (1-46)

$-CF_2(-O-CF_2-)_2$ (1-47)

$-CF_2(-O-CF_2-)_3$ (1-48)

$-CF_2-CF_2-O-CF_2-CF_2-$ (1-49)

$-CF_2-CF_2(-O-CF_2-CF_2-)_2$ (1-50)

$-CF_2-CF_2(-O-CF_2-CF_2-)_3$ (1-51)

$-CH_2-CF_2-O-CF_2-CH_2$ (1-52)

$-CH_2-CF_2-O-CF_2-CF_2-O-CF_2-CH_2-$ (1-53)

$-CH_2-CF_2(-O-CF_2-CF_2-)_2O-CF_2-CH_2-$ (1-54)

It is to be noted that R2 may be a derivative of the foregoing alkylene group or the like as in the case described for R1 and R3.

Though the molecular weight of the dicarbonic ester compound is not particularly limited, specially, the molecular weight of the dicarbonic ester compound is preferably from 200 to 800 both inclusive, is more preferably from 200 to 600 both inclusive, and is further more preferably from 200 to 450 both inclusive for the following reason. That is, superior solubility and superior compatibility are thereby obtained.

Specific examples of the dicarbonic ester compound include compounds represented by Formula (1-1) to Formula (1-12) for the following reason. That is, sufficient solubility and sufficient compatibility are thereby obtained, and chemical stability of the electrolytic solution is sufficiently improved. However, compounds other than the compounds shown in Formula (1-1) to Formula (1-12) may be used.

[Chemical formula 18]

(1-1)
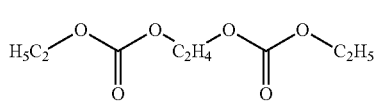

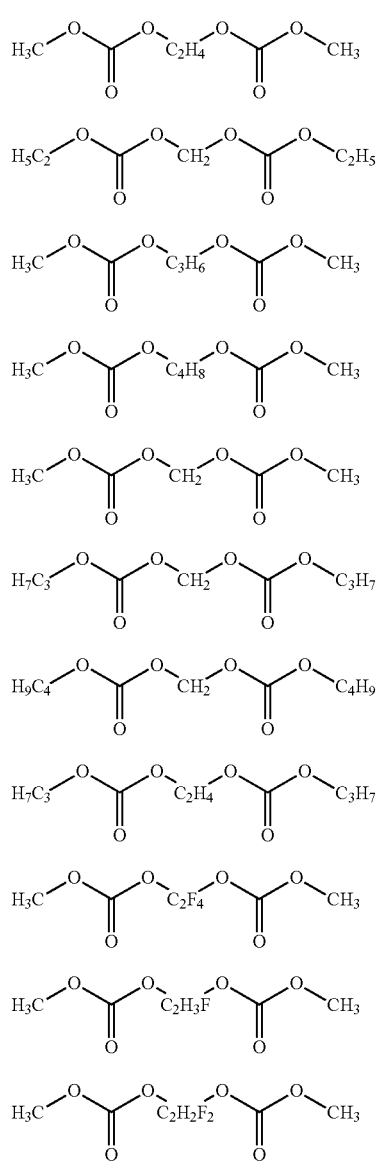

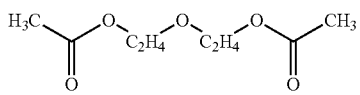
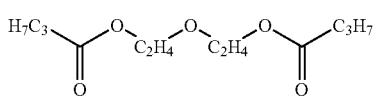
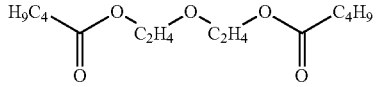
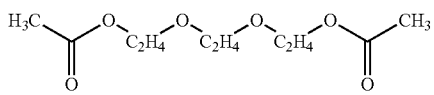
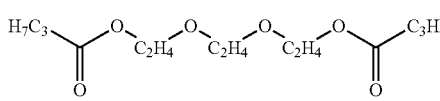
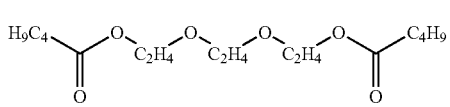
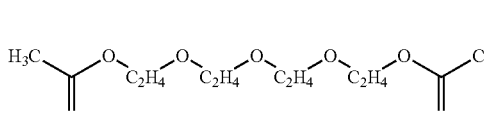
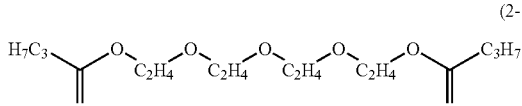
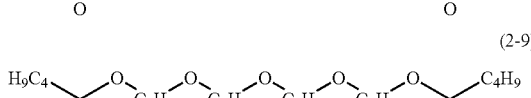
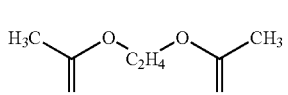
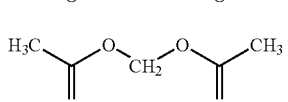
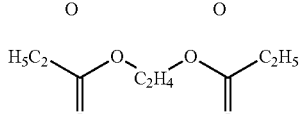
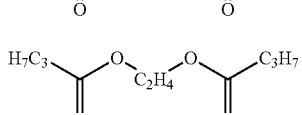

The compound represented by Formula (2) is a dicarboxylic compound having a carboxylic acid moiety (—O—C(=O)—R) on both ends thereof. R4 and R6 may be the same group, or may be groups different from each other. It is to be noted that details of R4 and R6 are similar to those of R1 and R3 described above, and details of R5 are similar to those of R2 described above.

Though the molecular weight of the dicarboxylic compound is not particularly limited, specially, the molecular weight of the dicarboxylic compound is preferably from 162 to 1000 both inclusive, is more preferably from 162 to 500 both inclusive, and is further more preferably from 162 to 300 both inclusive for the following reason. That is, superior solubility and superior compatibility are thereby obtained.

Specific examples of the dicarboxylic compound include compounds represented by Formula (2-1) to Formula (2-17) for the following reason. That is, sufficient solubility and sufficient compatibility are thereby obtained, and chemical stability of the electrolytic solution is sufficiently improved. However, compounds other than the compounds shown in Formula (2-1) to Formula (2-17) may be used.

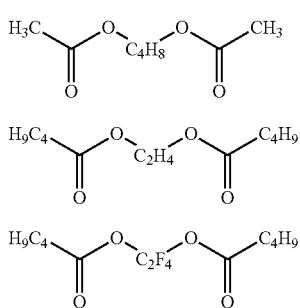

(2-15)
(2-16)
(2-17)

The compound shown in Formula (3) is a disulfonic compound having a sulfonic acid moiety (—O—S(=O)$_2$—R) on both ends thereof. R7 and R9 may be the same group, or may be groups different from each other. It is to be noted that details of R7 and R9 are similar to those of R1 and R3 described above, and details of R8 are similar to those of R2 described above.

Though the molecular weight of the disulfonic compound is not particularly limited, specially, the molecular weight of the disulfonic compound is preferably from 200 to 800 both inclusive, is more preferably from 200 to 600 both inclusive, and is further more preferably from 200 to 450 both inclusive for the following reason. That is, superior solubility and superior compatibility are thereby obtained.

Specific examples of the disulfonic compound include compounds represented by Formula (3-1) to Formula (3-9) for the following reason. That is, sufficient solubility and sufficient compatibility are thereby obtained, and chemical stability of the electrolytic solution is sufficiently improved. However, compounds other than the compounds shown in Formula (3-1) to Formula (3-9) may be used.

[Chemical formula 21]

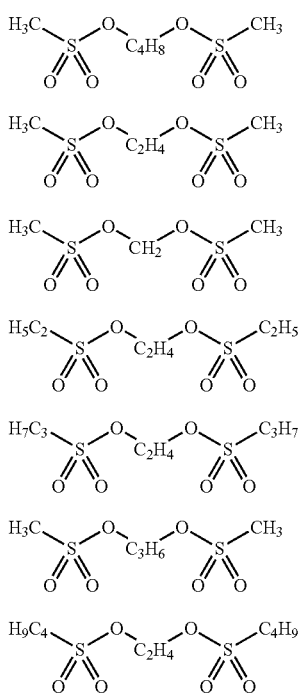

(3-1)
(3-2)
(3-3)
(3-4)
(3-5)
(3-6)
(3-7)

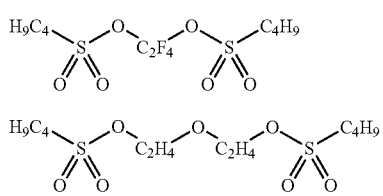

(3-8)
(3-9)

The compound shown in Formula (4) is monofluoro lithium phosphate, and the compound shown in Formula (5) is difluoro lithium phosphate.

The compound shown in Formula (6) is fluorinated lithium phosphate obtained by substituting a fluorine group out of lithium hexafluorophosphate (LiPF$_6$) by R10 (a perfluoroalkyl group or a perfluoroaryl group). In the case where R10 is the perfluoroalkyl group, though the carbon number thereof is not particularly limited, the carbon number thereof is preferably small as much as possible, and is preferably equal to or less than 2, specifically. Examples of the perfluoroalkyl group include a perfluoromethyl group (—CF$_3$) and perfluoroethyl group (—C$_2$F$_5$).

Specific examples of the fluorinated lithium phosphate include Li[PF$_3$(CF$_3$)$_3$], Li[PF$_3$(C$_2$F$_5$)$_3$], Li[PF$_4$(C$_2$F$_5$)$_2$], Li[PF$_4$(CF$_3$)$_2$], Li[PF$_4$(C$_3$F$_7$)$_2$], Li[PF$_5$(CF$_3$)], Li[PF$_5$(C$_2$F$_5$)], Li[PF$_5$(C$_3$F$_7$)], Li[PF$_2$(C$_2$F$_5$)$_4$], Li[PF$_2$(CF$_3$)$_4$], and Li[PF$_3$(C$_6$F$_6$)$_3$]. The propyl group (—C$_3$F$_7$) may be in a state of chain or may be branched for the following reason. That is, sufficient solubility and sufficient compatibility are thereby obtained, and chemical stability of the electrolytic solution is sufficiently improved. However, compounds other than the foregoing compounds may be used.

The compound shown in Formula (7) is fluorinated lithium borate obtained by substituting a fluorine group out of lithium tetrafluoroborate (LiBF$_4$) by R11 (a perfluoroalkyl group or a perfluoroaryl group). In the case where R11 is the perfluoroalkyl group, the carbon number thereof and the perfluoroalkyl group type are similar to those of the case described for R10.

Specific examples of the fluorinated lithium borate include Li[BF$_3$(CF$_3$)], Li[BF$_3$(C$_2$F$_5$)], Li[BF$_2$(CF$_3$)$_2$], Li[BF(CF$_3$)$_3$], Li[B(CF$_3$)$_4$], Li[BF$_2$(C$_2$F$_5$)$_2$], Li[BF(C$_2$F$_5$)$_3$], Li[B(C$_2$F$_5$)$_4$], Li[BF$_3$(C$_3$F$_7$)], Li[BF$_2$(C$_3$F$_7$)$_2$], Li[BF(C$_3$F$_7$)$_3$], Li[B(C$_3$F$_7$)$_4$], and Li[BF$_3$(C$_6$F$_6$)]. The propyl group may be in a state of chain or may be branched for the following reason. That is, sufficient solubility and sufficient compatibility are thereby obtained, and chemical stability of the electrolytic solution is sufficiently improved. However, compounds other than the foregoing compounds may be used.

The compound shown in Formula (8) is imide lithium (bis(fluorosulfonyl)imide lithium) having a fluorinated sulfonyl group (—SO$_2$F).

The contents of the dicarbonic ester compound, the dicarboxylic compound, the disulfonic compound, monofluoro lithium phosphate, and difluoro lithium phosphate in the electrolytic solution are not particularly limited. Specially, the contents thereof are preferably from 0.001 wt % to 2 wt % both inclusive, and are more preferably from 0.001 wt % to 1 wt % both inclusive, since thereby chemical stability of the electrolytic solution is more improved.

The contents of fluorinated lithium phosphate, fluorinated lithium borate, and imide lithium in the electrolytic solution are not particularly limited. Specially, the contents thereof are preferably from 0.01 wt % to 0.5 wt % both inclusive, and are more preferably from 0.01 wt % to 0.2 wt % both inclusive, since thereby chemical stability of the electrolytic solution is more improved.

[Nonaqueous Solvent]

The nonaqueous solvent contains one, or two or more of organic solvents described below. The dicarbonic ester compound, the dicarboxylic compound, and the disulfonic compound described above are excluded from the nonaqueous solvents described below.

Examples of the nonaqueous solvents include the following. That is, examples thereof include ethylene carbonate, propylene carbonate, butylene carbonate, dimethyl carbonate, diethyl carbonate, ethyl methyl carbonate, methylpropyl carbonate, γ-butyrolactone, γ-valerolactone, 1,2-dimethoxyethane, and tetrahydrofuran. Further examples thereof include 2-methyltetrahydrofuran, tetrahydropyran, 1,3-dioxolane, 4-methyl-1,3-dioxolane, 1,3-dioxane, and 1,4-dioxane. Furthermore, examples thereof include methyl acetate, ethyl acetate, methyl propionate, ethyl propionate, methyl butyrate, methyl isobutyrate, trimethyl methyl acetate, and trimethyl ethyl acetate. Furthermore, examples thereof include acetonitrile, glutaronitrile, adiponitrile, methoxyacetonitrile, 3-methoxypropionitrile, N,N-dimethylformamide, N-methylpyrrolidinone, and N-methyloxazolidinone. Furthermore, examples thereof include N,N'-dimethylimidazolidinone, nitromethane, nitroethane, sulfolane, trimethyl phosphate, and dimethyl sulfoxide. Thereby, a superior battery capacity, superior cycle characteristics, superior conservation characteristics, and the like are obtained in the secondary battery using the electrolytic solution.

Specially, one, or two or more of ethylene carbonate, propylene carbonate, dimethyl carbonate, diethyl carbonate, and ethyl methyl carbonate are preferable, since thereby a superior battery capacity, superior cycle characteristics, superior conservation characteristics, and the like are obtained. In this case, a combination of a high viscosity (high dielectric constant) solvent (for example, specific dielectric constant ∈≥30) such as ethylene carbonate and propylene carbonate and a low viscosity solvent (for example, viscosity≤1 mPa·s) such as dimethyl carbonate, ethylmethyl carbonate, and diethyl carbonate is more preferable. Thereby, dissociation property of the electrolyte salt and ion mobility are improved.

In particular, the nonaqueous solvent preferably contains one, or two or more of unsaturated carbon bond cyclic ester carbonates represented by Formula (19) to Formula (21). Thereby, a stable protective film is formed on the surface of the electrode at the time of charge and discharge of the secondary battery, and thus a decomposition reaction of the electrolytic solution is suppressed. The "unsaturated carbon bond cyclic ester carbonate" is cyclic ester carbonate having one, or two or more unsaturated carbon bonds. R21 and R22 may be the same group, or may be groups different from each other. The same is applied to R23 to R26. The content of the unsaturated carbon bond cyclic ester carbonate in the nonaqueous solvent is, for example, from 0.01 wt % to 10 wt % both inclusive. However, the unsaturated carbon bond cyclic ester carbonate is not limited to the after-mentioned compounds and may be other compound.

[Chemical formula 22]

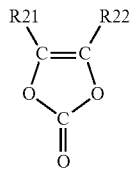

(19)

(Each of R21 and R22 is a hydrogen group or an alkyl group.)

[Chemical formula 23]

(20)

(Each of R23 to R26 is a hydrogen group, an alkyl group, a vinyl group, or an allyl group. One or more of R23 to R26 is a vinyl group or an allyl group.)

[Chemical formula 24]

(21)

(R27 is an alkylene group.)

The unsaturated carbon bond cyclic ester carbonate shown in Formula (19) is a vinylene carbonate-based compound. Examples of the vinylene carbonate-based compounds include the following compounds. That is, examples thereof include vinylene carbonate, methylvinylene carbonate, and ethylvinylene carbonate. Further, examples thereof include 4,5-dimethyl-1,3-dioxole-2-one, 4,5-diethyl-1,3-dioxole-2-one, 4-fluoro-1,3-dioxole-2-one, and 4-trifluoromethyl-1,3-dioxole-2-one. Specially, vinylene carbonate is preferable, since vinylene carbonate is easily available and provides high effect.

The unsaturated carbon bond cyclic ester carbonate shown in Formula (20) is a vinylethylene carbonate-based compound. Examples of the vinylethylene carbonate-based compounds include the following compounds. That is, examples thereof include vinylethylene carbonate, 4-methyl-4-vinyl-1,3-dioxolane-2-one, and 4-ethyl-4-vinyl-1,3-dioxolane-2-one. Further examples thereof include 4-n-propyl-4-vinyl-1,3-dioxolane-2-one, 5-methyl-4-vinyl-1,3-dioxolane-2-one, 4,4-divinyl-1,3-dioxolane-2-one, and 4,5-divinyl-1,3-dioxolane-2-one. Specially, vinylethylene carbonate is preferable, since vinylethylene carbonate is easily available, and provides high effect. It is needless to say that all of R23 to R26 may be the vinyl group or the allyl group. Alternately, some of R23 to R26 may be the vinyl group, and the others thereof may be the allyl group.

The unsaturated carbon bond cyclic ester carbonate shown in Formula (21) is a methylene ethylene carbonate-based compound. Examples of the methylene ethylene carbonate-based compounds include the following compounds. That is, examples thereof include 4-methylene-1,3-dioxolane-2-one, 4,4-dimethyl-5-methylene-1,3-dioxolane-2-one, and 4,4-diethyl-5-methylene-1,3-dioxolane-2-one. The methylene ethylene carbonate-based compound may have one methylene group as shown in Formula (11), or may have two methylene groups.

It is to be noted that the unsaturated carbon bond cyclic ester carbonate may be catechol carbonate having a benzene ring, in addition to the compounds shown in Formula (19) to Formula (21).

Further, the nonaqueous solvent preferably contains one, or two or more of halogenated chain ester carbonates represented by Formula (22) and halogenated cyclic ester carbonates represented by Formula (23). Thereby, a stable protective film is formed on the surface of the electrode at the time of charge and discharge of the secondary battery, and thus a decomposition reaction of the electrolytic solution is suppressed. "Halogenated chain ester carbonate" is a chain ester carbonate having halogen as a constituent element. "Halogenated cyclic ester carbonate" is a cyclic ester carbonate having halogen as a constituent element. It is to be noted that R31 to R36 may be the same group, or may be groups different from each other. The same is applied to R37 to R40. The content of the halogenated chain ester carbonate and the content of the halogenated cyclic ester carbonate in the nonaqueous solvent are, for example, from 0.01 wt % to 50 wt % both inclusive. However, the halogenated chain ester carbonate or the halogenated cyclic ester carbonate is not necessarily limited to the compounds described below, and may be other compound.

[Chemical formula 25]

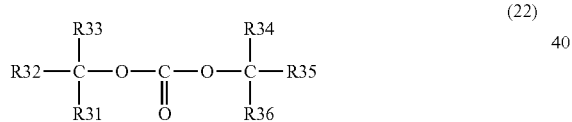
(22)

(Each of R31 to R36 are a hydrogen group, a halogen group, an alkyl group, or a halogenated alkyl group. One or more of R31 to R36 each are a halogen group or a halogenated alkyl group.)

[Chemical formula 26]

(23)

(Each of R37 to R40 is a hydrogen group, a halogen group, an alkyl group, or a halogenated alkyl group. One or more of R37 to R40 each are a halogen group or a halogenated alkyl group.)

Though halogen type is not particularly limited, specially, fluorine, chlorine, or bromine is preferable, and fluorine is more preferable since thereby a higher effect is obtained compared to other halogen. It is to be noted that the number of halogens is more preferably two than one, and further may be three or more, since thereby an ability of forming a protective film is improved, and a more rigid and stable protective film is formed. Accordingly, a decomposition reaction of the electrolytic solution is more suppressed.

Examples of the halogenated chain ester carbonate include fluoromethyl methyl carbonate, bis(fluoromethyl) carbonate, and difluoromethyl methyl carbonate. Examples of the halogenated cyclic ester carbonate include compounds represented by Formula (23-1) to Formula (23-21). The halogenated cyclic ester carbonate includes a geometric isomer. Specially, 4-fluoro-1,3-dioxolane-2-one shown in Formula (23-1) or 4,5-difluoro-1,3-dioxolane-2-one shown in Formula (23-3) is preferable, and the latter is more preferable. In particular, as 4,5-difluoro-1,3-dioxolane-2-one, a trans isomer is more preferable than a sis isomer, since the trans isomer is easily available and provides a high effect.

[Chemical formula 27]

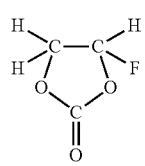
(23-1)

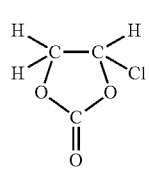
(23-2)

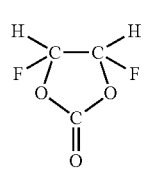
(23-3)

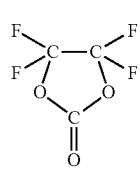
(23-4)

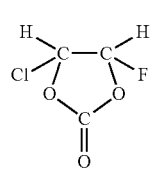
(23-5)

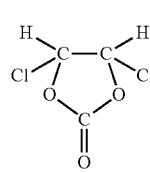
(23-6)

-continued

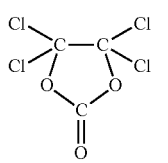
(23-7)

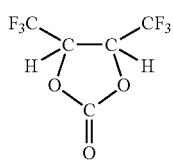
(23-8)

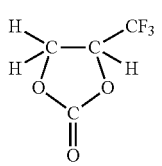
(23-9)

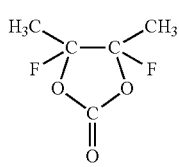
(23-10)

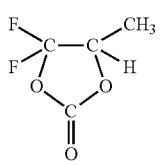
(23-11)

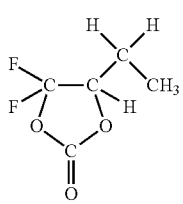
(23-12)

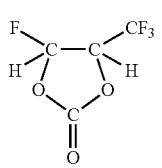
(23-13)

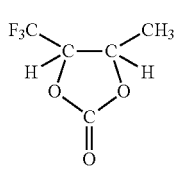
(23-14)

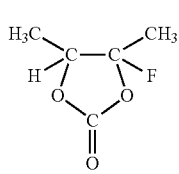
(23-15)

-continued

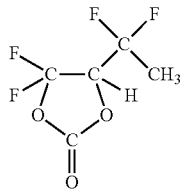
(23-16)

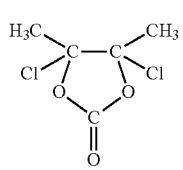
(23-17)

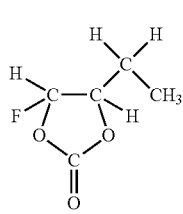
(23-18)

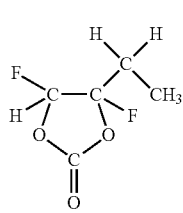
(23-19)

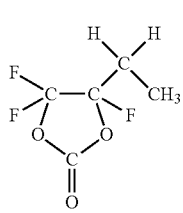
(23-20)

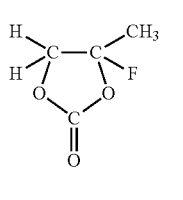
(23-21)

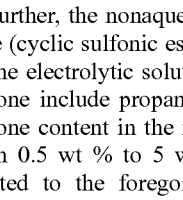

Further, the nonaqueous solvent preferably contains sultone (cyclic sulfonic ester), since thereby chemical stability of the electrolytic solution is more improved. Examples of sultone include propane sultone and propene sultone. The sultone content in the nonaqueous solvent is, for example, from 0.5 wt % to 5 wt % both inclusive. Sultone is not limited to the foregoing compound, and may be other compounds.

Further, the nonaqueous solvent preferably contains an acid anhydride since chemical stability of the electrolytic solution is thereby further improved. Examples of the acid anhydrides include a carboxylic anhydride, a disulfonic anhydride, and an anhydride of carboxylic acid and sulfonic acid. Examples of the carboxylic anhydride include a succinic anhydride, a glutaric anhydride, and a maleic anhydride. Examples of the disulfonic anhydride include an ethane disulfonic anhydride and a propane disulfonic anhydride. Examples of the anhydride of carboxylic acid and sulfonic acid include a sulfobenzoic anhydride, a sulfopropionic anhydride, and a sulfobutyric anhydride. The content of the acid anhydride in the nonaqueous solvent is, for example, from 0.5 wt % to 5 wt % both inclusive. However, the acid anhydrides are not limited to the foregoing compounds, and may be other compounds.

[Electrolyte Salt]

The electrolyte salt may contain, for example, one, or two or more of lithium salts described below. However, the electrolyte salt may contain, for example, a salt other than the lithium salt (for example, a light metal salt other than the lithium salt).

Examples of the lithium salts include the following. That is, examples thereof include lithium hexafluorophosphate ($LiPF_6$), lithium tetrafluoroborate ($LiBF_4$), lithium perchlorate ($LiClO_4$), and lithium hexafluoroarsenate ($LiAsF_6$). Further, examples thereof include lithium tetraphenylborate ($LiB(C_6H_5)_4$), lithium methanesulfonate ($LiCH_3SO_3$), lithium trifluoromethane sulfonate ($LiCF_3SO_3$), and lithium tetrachloroaluminate ($LiAlCl_4$). Further, examples thereof include dilithium hexafluorosilicate ($Li_2SiF_6$), lithium chloride (LiCl), and lithium bromide (LiBr). Thereby, a superior battery capacity, superior cycle characteristics, superior conservation characteristics, and the like are obtained in the secondary battery using the electrolytic solution. However, the lithium salt is not necessarily limited to the foregoing compounds, and may be other compounds.

Specially, one, or two or more of lithium hexafluorophosphate, lithium tetrafluoroborate, lithium perchlorate, and lithium hexafluoroarsenate are preferable, and lithium hexafluorophosphate is more preferable, since the internal resistance is lowered, and thus a higher effect is obtained.

In particular, the electrolyte salt preferably contains one, or two or more of compounds represented by Formula (24) to Formula (26), since thereby higher effect is obtained. It is to be noted that R41 and R43 may be the same group, or may be different groups from each other. The same is applied to R51 to R53, R61, and R62. However, the compounds shown in Formula (24) to Formula (26) are not limited to the after-mentioned compounds, and may be other compounds.

[Chemical formula 28]

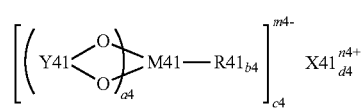

(24)

(X41 is a Group 1 element or a Group 2 element in the long period periodic table or aluminum. M41 is a transition metal, a Group 13 element, a Group 14 element, or a Group 15 element in the long period periodic table. R41 is a halogen group. Y41 is —C(=O)—R42-C(=O)—, —C(=O)—CR43$_2$-, or —C(=O)—C(=O)—. It is to be noted that R42 is an alkylene group, a halogenated alkylene group, an arylene group, or a halogenated arylene group. R43 is an alkyl group, a halogenated alkyl group, an aryl group, or a halogenated aryl group. a4 is one of integer numbers 1 to 4 both inclusive. b4 is one of integer numbers 0, 2, and 4. Each of c4, d4, m4, and n4 is one of integer numbers 1 to 3 both inclusive.)

[Chemical formula 29]

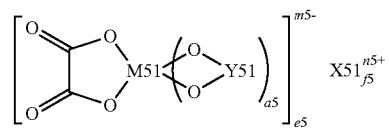

(25)

(X51 is a Group 1 element or a Group 2 element in the long period periodic table. M51 is a transition metal, a Group 13 element, a Group 14 element, or a Group 15 element in the long period periodic table. Y51 is —C(=O)—(CR51$_2$)$_{b5}$—C(=O)—, —R53$_2$C—(CR52$_2$)$_{c5}$—C(=O)—, —R53$_2$C—(CR52$_2$)$_{c5}$—CR53$_2$-, —R53$_2$C—(CR52$_2$)$_{c5}$-S(=O)$_2$—, —S(=O)$_2$—(CR52$_2$)$_{d5}$-S(=O)$_2$—, or —C(=O)—(CR52$_2$)$_{d5}$-S(=O)$_2$—. It is to be noted that each of R51 and R53 is a hydrogen group, an alkyl group, a halogen group, or a halogenated alkyl group. One or more of R51 and R53 is the halogen group or the halogenated alkyl group. R52 is a hydrogen group, an alkyl group, a halogen group, or a halogenated alkyl group. Each of a5, e5, and n5 is one of integer numbers 1 and 2. Each of b5 and d5 is one of integer numbers 1 to 4 both inclusive. c5 is one of integer numbers 0 to 4 both inclusive. Each of f5 and m5 is one of integer numbers 1 to 3 both inclusive.)

[Chemical formula 30]

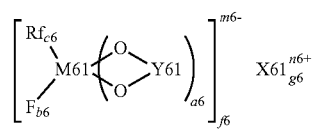

(26)

(X61 is a Group 1 element or a Group 2 element in the long period periodic table. M61 is a transition metal, a Group 13 element, a Group 14 element, or a Group 15 element in the long period periodic table. Rf is a fluorinated alkyl group with carbon number from 1 to 10 both inclusive or a fluorinated aryl group with carbon number from 1 to 10 both inclusive. Y61 is —C(=O)—(CR61$_2$)$_{d6}$—C(=O)—, —R62$_2$C—(CR61$_2$)$_{d6}$—C(=O)—, —R62$_2$C—(CR61$_2$)$_{d6}$—CR62$_2$-, —R62$_2$C—(CR61$_2$)$_{d6}$-S(=O)$_2$—, —S(=O)$_2$—(CR61$_2$)$_{e6}$-S(=O)$_2$—, or —C(=O)—(CR61$_2$)$_{e6}$-S(=O)$_2$—. It is to be noted that R61 is a hydrogen group, an alkyl group, a halogen group, or a halogenated alkyl group. R62 is a hydrogen group, an alkyl group, a halogen group, or a halogenated alkyl group, and one or more thereof are each a halogen group or a halogenated alkyl group. Each of a6, f6, and n6 is one of integer numbers 1 and 2. Each of b6, c6, and e6 is one of integer numbers 1 to 4 both inclusive. d6 is one of integer numbers 0 to 4 both inclusive. Each of g6 and m6 is one of integer numbers 1 to 3 both inclusive.)

It is to be noted that Group 1 element represents hydrogen, lithium, sodium, potassium, rubidium, cesium, and francium. Group 2 element represents beryllium, magnesium, calcium, strontium, barium, and radium. Group 13 element represents boron, aluminum, gallium, indium, and thallium. Group 14 element represents carbon, silicon, germanium, tin, and lead. Group 15 element represents nitrogen, phosphorus, arsenic, antimony, and bismuth.

Examples of the compound shown in Formula (24) include compounds represented by Formula (24-1) to Formula (24-6). Examples of the compound shown in Formula (25) include compounds represented by Formula (25-1) to Formula (25-8). Examples of the compound shown in Formula (26) include a compound represented by Formula (26-1).

[Chemical formula 31]

(24-1)
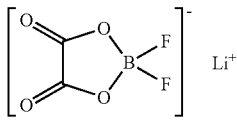

(24-2)
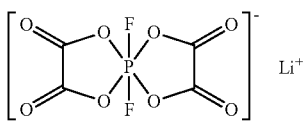

(24-3)
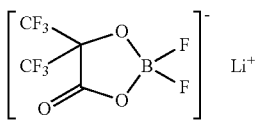

(24-4)
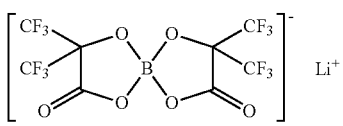

(24-5)
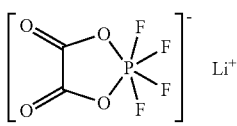

(24-6)
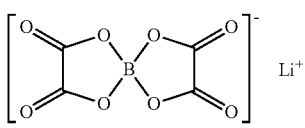

[Chemical formula 32]

(25-1)
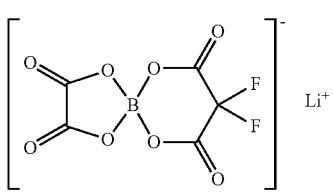

(25-2)
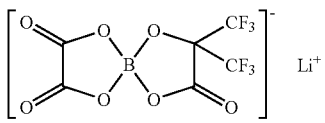

(25-3)
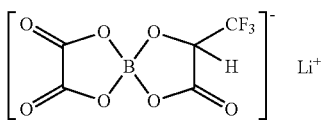

(25-4)
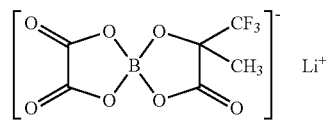

(25-5)
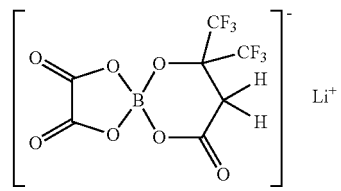

(25-6)
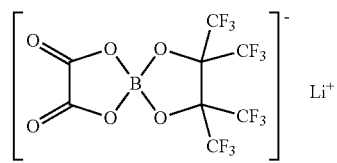

(25-7)
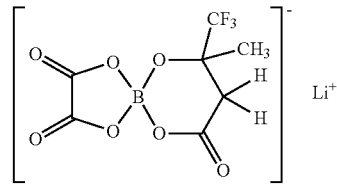

(25-8)
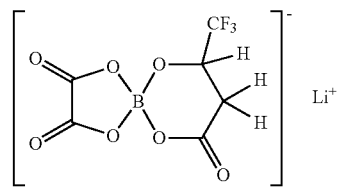

[Chemical formula 33]

(26-1)
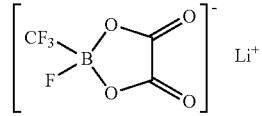

Further, the electrolyte salt preferably contains one, or two or more of compounds represented by Formula (27) to Formula (29), since thereby a higher effect is obtained. m and n may be the same value or values different from each other. The same is applied to p, q, and r. It is to be noted that the usable compounds are not limited to compounds described below and may be other compounds, as long as structures shown in Formula (27) to Formula (29) are therein included.

$$\text{LiN}(C_mF_{2m+1}SO_2)(C_nF_{2n+1}SO_2) \tag{27}$$

(Each of m and n is an integer number equal to or greater than 1.)

[Chemical formula 34]

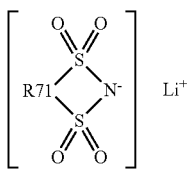 (28)

(R71 is a straight-chain or branched perfluoro alkylene group with carbon number from 2 to 4 both inclusive.)

$$\text{LiC}(C_pF_{2p+1}SO_2)(C_qF_{2q+1}SO_2)(C_rF_{2r+1}SO_2) \quad (29)$$

(Each of p, q, and r is an integer number equal to or greater than 1.)

The compound shown in Formula (27) is a chain imide compound. Examples of the chain imide compound include the following compounds. That is, examples thereof include lithium bis(trifluoromethanesulfonyl)imide ($\text{LiN}(CF_3SO_2)_2$) and lithium bis(pentafluoroethanesulfonyl)imide ($\text{LiN}(C_2F_5SO_2)_2$). Further examples thereof include lithium (trifluoromethanesulfonyl)(pentafluoroethanesulfonyl)imide ($\text{LiN}(CF_3SO_2)(C_2F_5SO_2)$). Further examples thereof include lithium(trifluoromethanesulfonyl)(heptafluoropropanesulfonyl)imide ($\text{LiN}(CF_3SO_2)(C_3F_7SO_2)$). Further examples thereof include lithium(trifluoromethanesulfonyl)(nonafluorobutanesulfonyl)imide ($\text{LiN}(CF_3SO_2)(C_4F_9SO_2)$).

The compound shown in Formula (28) is a cyclic imide compound. Examples of the cyclic imide compound include compounds represented by Formula (28-1) to Formula (28-4).

[Chemical formula 35]

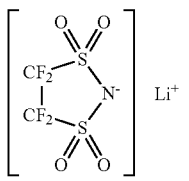 (28-1)

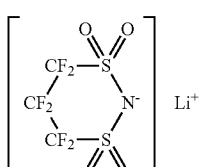 (28-2)

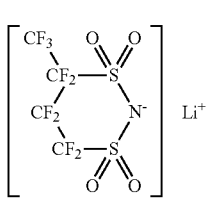 (28-3)

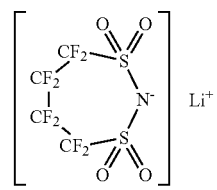 (28-4)

The compound shown in Formula (29) is a chain methyde compound. Examples of the chain methyde compound include lithium tris(trifluoromethanesulfonyl)methyde (LiC($CF_3SO_2$)$_3$).

The content of the electrolyte salt is preferably from 0.3 mol/kg to 3.0 mol/kg both inclusive with respect to the nonaqueous solvent, since thereby high ion conductivity is obtained.

The electrolytic solution contains a combination of the following materials. The combination is formed of: one, or two or more of the dicarbonic ester compound, the dicarboxylic compound, the disulfonic compound, the monofluoro lithium phosphate, and the difluoro lithium phosphate; and one, or two or more of fluorinated lithium phosphate, fluorinated lithium borate, and imide lithium. Thus, compared to a case that the electrolytic solution does not contain a combination of the dicarbonic ester compound or the like and fluorinated lithium phosphate or the like or a case that the electrolytic solution contains only either of the dicarbonic ester compound or the like or fluorinated lithium phosphate or the like, chemical stability is more improved. Therefore, since a decomposition reaction of the electrolytic solution is suppressed at the time of charge and discharge, the electrolytic solution is allowed to contribute to improving performance of a secondary battery using such an electrolytic solution.

In particular, in the case where the content of the dicarbonic ester compound or the like in the nonaqueous solvent is from 0.001 wt % to 2 wt % both inclusive, higher effects are allowed to be obtained. Further, in the case where the content of fluorinated lithium phosphate or the like in the nonaqueous solvent is from 0.01 wt % to 0.5 wt % both inclusive, higher effects are allowed to be obtained.

[1-2. Second Embodiment]

An electrolytic solution according to a second embodiment of the present invention is used for a secondary battery, and contains a nonaqueous solvent and an electrolyte salt. Further, the electrolytic solution contains one, or two or more of compounds represented by Formula (9) to Formula (13) and one, or two or more of compounds represented by Formula (14). The electrolytic solution contains a combination of the compounds shown in Formula (9) to Formula (13) and the compounds shown in Formula (14) for the following reason. That is, chemical stability is thereby improved more than in a case that the electrolytic solution contains none thereof or only either thereof

[Chemical formula 36]

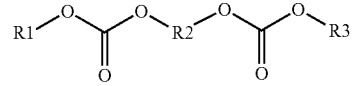 (9)

(Each of R1 and R3 is an alkyl group, an alkenyl group, an alkynyl group, an aryl group, or a heterocyclic group; an alkyl group, an alkenyl group, or an alkynyl group partially substituted by an aromatic hydrocarbon group or an alicyclic hydrocarbon group; or a halogenated group thereof. R2 is a straight-chain or branched alkylene group, an arylene group, a divalent group including an arylene group and an alkylene group, a divalent group having carbon number from 2 to 12 both inclusive and including an ether bond (—O—) and an alkylene group, or a halogenated group thereof).

[Chemical formula 37]

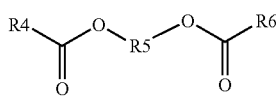

(10)

(Each of R4 and R6 is an alkyl group, an alkenyl group, an alkynyl group, an aryl group, or a heterocyclic group; an alkyl group, an alkenyl group, or an alkynyl group partially substituted by an aromatic hydrocarbon group or an alicyclic hydrocarbon group; or a halogenated group thereof. R5 is a straight-chain or branched alkylene group, an arylene group, a divalent group including an arylene group and an alkylene group, a divalent group having carbon number from 2 to 12 both inclusive and including an ether bond and an alkylene group, or a halogenated group thereof).

[Chemical formula 38]

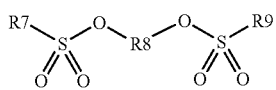

(11)

(Each of R7 and R9 is an alkyl group, an alkenyl group, an alkynyl group, an aryl group, or a heterocyclic group; an alkyl group, an alkenyl group, or an alkynyl group partially substituted by an aromatic hydrocarbon group or an alicyclic hydrocarbon group; or a halogenated group thereof. R8 is a straight-chain or branched alkylene group, an arylene group, a divalent group including an arylene group and an alkylene group, a divalent group having carbon number from 2 to 12 both inclusive and including an ether bond and an alkylene group, or a halogenated group thereof).

$Li_2PFO_3$ (12)

$LiPF_2O_2$ (13)

[Chemical formula 39]

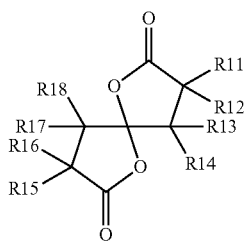

(14)

(Each of R11 to R18 is an alkyl group with carbon number from 1 to 12 both inclusive; an alkenyl group with carbon number from 2 to 12 both inclusive; an alkynyl group with carbon number from 2 to 12 both inclusive; an aryl group with carbon number from 6 to 18 both inclusive; an alkoxy group with carbon number from 1 to 12 both inclusive; a halogenated group thereof; a hydrogen group; or a halogen group. R11 to R18 are allowed to be bonded with each other to form a ring structure.)

[Compounds Shown in Formula (9) to Formula (13)]

The compound shown in Formula (9) is a dicarbonic ester compound having an ester carbonate moiety (—O—C(=O)—O—R) on both ends thereof. R1 and R3 may be the same group, or may be different groups from each other.

A description will be hereinafter given in detail of R1 and R3. Examples of the alkyl group include a methyl group, an ethyl group, an n (normal)-propyl group, an isopropyl group, an n-butyl group, and an isobutyl group. Examples of the alkyl group include a sec (secondary)-butyl group, a tert (tertiary)-butyl group, an n-pentyl group, a 2-methylbutyl group, a 3-methylbutyl group, a 2,2-dimethylpropyl group, and an n-hexyl group. Examples of the alkenyl group include an n-heptyl group, a vinyl group, a 2-methylvinyl group, a 2,2-dimethylvinyl group, a butene-2,4-diyl group, and an allyl group. Examples of the alkynyl group include an ethynyl group. Though the carbon number of the foregoing alkyl group or the like is not particularly limited, specially, the carbon number thereof is preferably from 1 to 20 both inclusive, is more preferably from 1 to 7 both inclusive, and is further more preferably from 1 to 4 both inclusive for the following reason. That is, superior solubility and superior compatibility are thereby obtained.

For the alkyl group or the like partially substituted by an aromatic hydrocarbon group or an alicyclic hydrocarbon group, examples of the aromatic hydrocarbon group include a phenyl group, and examples of the alicyclic hydrocarbon group include a cyclohexyl group. Examples of an alkyl group partially substituted by a phenyl group (aralkyl group) include a benzil group and 2-phenylethyl group (phenethyl group).

For the halogenated alkyl group or the like, though a halogen type thereof is not particularly limited, specially, fluorine (F), chlorine (Cl), or bromine (Br) is preferable, and fluorine is more preferable. Examples of the halogenated alkyl group include a fluorinated alkyl group. Examples of the fluorinated alkyl group include a fluoromethyl group, a difluoromethyl group, a trifluoromethyl group, a 2,2,2-trifluoroethyl group, and a pentafluoroethyl group. It is to be noted that "Halogenated group" means a group obtained by substituting part or all of hydrogen groups (—H) out of the alkyl group or the like by halogen groups (—F or the like).

Specially, the group partially substituted by an aromatic hydrocarbon group or an alicyclic hydrocarbon group is preferable, and a group not substituted by an aromatic hydrocarbon group or an alicyclic hydrocarbon group is more preferable. In the group partially substituted by an aromatic hydrocarbon group or an alicyclic hydrocarbon group, the carbon number thereof is not particularly limited. For the carbon number, the total of the carbon number of the aromatic hydrocarbon group or the alicyclic hydrocarbon group and the carbon number of the alkyl group or the like is preferably equal to or less than 20, and is more preferably equal to or less than 7.

It is to be noted that each of R1 and R3 may be a derivative of the foregoing alkyl group or the like. The derivative means a group obtained by introducing one, or two or more substituent groups to the alkyl group or the like.

Such a substituent group may be a carbon hydride group, or may be a group other than the carbon hydride group.

A description will be hereinafter given in detail of R2. Though the carbon number of the straight-chain or branched alkylene group or the like is not particularly limited, specially, the carbon number thereof is preferably from 2 to 10 both inclusive, is more preferably from 2 to 6 both inclusive, and is further more preferably from 2 to 4 both inclusive for the following reason. That is, superior solubility and superior compatibility are thereby obtained. It is to be noted that the divalent group containing an arylene group and an alkylene group may be a group in which one arylene group is linked to one alkylene group, or a group in which two alkylene groups are linked to each other with an arylene group in between (aralkylene group).

In this case, examples of R2 include straight-chain alkylene groups represented by Formula (9-11) to Formula (9-17), branched alkylene groups represented by Formula (9-18) to Formula (9-26), arylene groups represented by Formula (9-27) to Formula (9-29), and a divalent group containing an arylene group and an alkylene group (benzylidene group) represented by Formula (9-30) to Formula (9-32).

[Chemical formula 40]

 (9-11)

 (9-12)

 (9-13)

 (9-14)

 (9-15)

 (9-16)

 (9-17)

[Chemical formula 41]

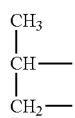 (9-18)

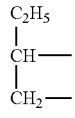 (9-19)

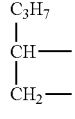 (9-20)

 (9-21)

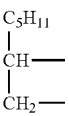 (9-22)

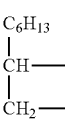 (9-23)

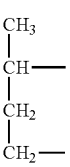 (9-24)

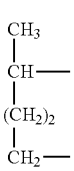 (9-25)

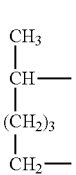 (9-26)

[Chemical formula 42]

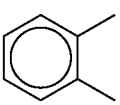 (9-27)

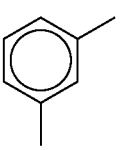 (9-28)

 (9-29)

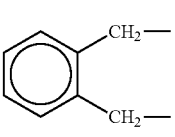 (9-30)

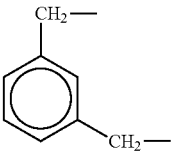 (9-31)

-continued

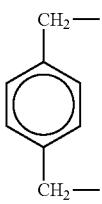 (9-32)

Further, as the divalent group containing an ether bond and an alkylene group with carbon number from 2 to 12 both inclusive, a group in which two or more alkylene groups are linked to each other through an ether bond, and both ends thereof are carbon atoms is preferable. The carbon number of such a group is preferably from 4 to 12 both inclusive for the following reason. That is, superior solubility and superior compatibility are thereby obtained. The number of ether bonds, linkage order of the ether bond and the alkylene group, and the like may be arbitrarily set.

In this case, examples of R2 include groups represented by Formula (9-33) to Formula (9-45). Further, in the case where the divalent groups shown in Formula (9-33) to Formula (9-45) are fluorinated, examples thereof include groups represented by Formula (9-46) to Formula (9-54). Specially, the groups shown in Formula (9-38) to Formula (9-40) are preferable.

[Chemical formula 43]

—CH$_2$—O—CH$_2$— (9-33)

—CH$_2$-(-O—CH$_2$-)$_2$ (9-34)

—CH$_2$-(-O—CH$_2$-)$_3$ (9-35)

—CH$_2$-(-O—CH$_2$-)$_4$ (9-36)

—CH$_2$-(-O—CH$_2$-)$_5$ (9-37)

—CH$_2$—CH$_2$—O—CH$_2$—CH$_2$— (9-38)

—CH$_2$—CH$_2$-(-O—CH$_2$—CH$_2$-)$_2$ (9-39)

—CH$_2$—CH$_2$-(-O—CH$_2$—CH$_2$-)$_3$ (9-40)

—CH$_2$—CH$_2$-(-O—CH$_2$—CH$_2$-)$_4$ (9-41)

—CH$_2$—CH$_2$-(-O—CH$_2$—CH$_2$-)$_5$ (9-42)

—CH$_2$—CH$_2$—CH$_2$—O—CH$_2$—CH$_2$—CH$_2$— (9-43)

—CH$_2$—CH$_2$—CH$_2$-(-O—CH$_2$—CH$_2$—CH$_2$-)$_2$ (9-44)

—CH$_2$—CH$_2$—CH$_2$-(-O—CH$_2$—CH$_2$—CH$_2$-)$_3$ (9-45)

[Chemical formula 44]

—CF$_2$—O—CF$_2$— (9-46)

—CF$_2$-(-O—CF$_2$-)$_2$ (9-47)

—CF$_2$-(-O—CF$_2$-)$_3$ (9-48)

—CF$_2$—CF$_2$—O—CF$_2$—CF$_2$— (9-49)

—CF$_2$—CF$_2$-(-O—CF$_2$—CF$_2$-)$_2$ (9-50)

—CF$_2$—CF$_2$-(-O—CF$_2$—CF$_2$-)$_3$ (9-51)

—CH$_2$—CF$_2$—O—CF$_2$—CH$_2$— (9-52)

—CH$_2$—CF$_2$—O—CF$_2$—CF$_2$—$_2$O—CF$_2$—CH$_2$— (9-53)

—CH$_2$—CF$_2$-(-O—CF$_2$—CF$_2$-)$_2$O—CF$_2$—CH$_2$— (9-54)

It is to be noted that R2 may be a derivative of the foregoing alkylene group or the like as in the case described for R1 and R3.

Though the molecular weight of the dicarbonic ester compound is not particularly limited, specially, the molecular weight of the dicarbonic ester compound is preferably from 200 to 800 both inclusive, is more preferably from 200 to 600 both inclusive, and is further more preferably from 200 to 450 both inclusive for the following reason. That is, superior solubility and superior compatibility are thereby obtained.

Specific examples of the dicarbonic ester compound include compounds represented by Formula (9-1) to Formula (9-12) for the following reason. That is, sufficient solubility and sufficient compatibility are thereby obtained, and chemical stability of the electrolytic solution is sufficiently improved. However, compounds other than the compounds shown in Formula (9-1) to Formula (9-12) may be used.

[Chemical formula 45]

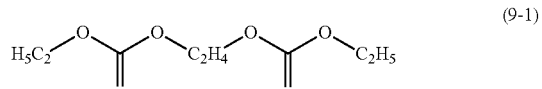 (9-1)

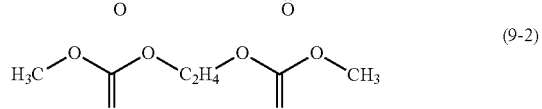 (9-2)

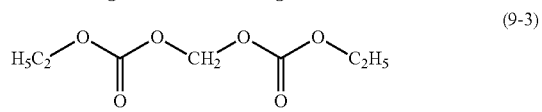 (9-3)

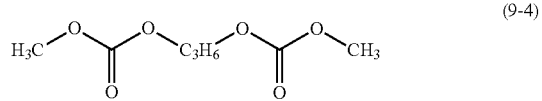 (9-4)

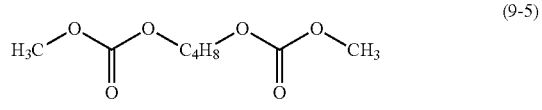 (9-5)

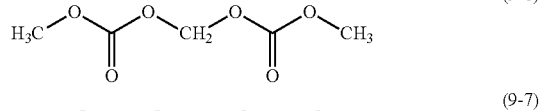 (9-6)

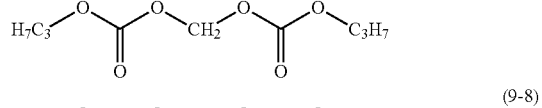 (9-7)

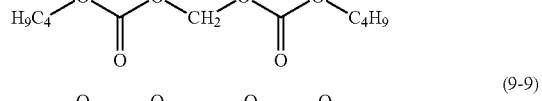 (9-8)

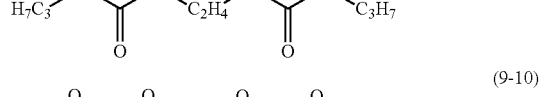 (9-9)

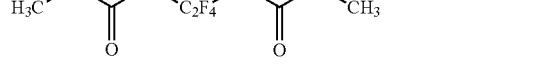 (9-10)

-continued

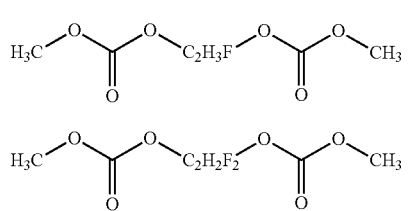
(9-11)

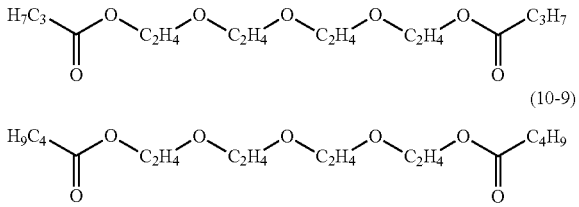
(10-8)

(9-12)

(10-9)

The compound shown in Formula (10) is a dicarboxylic compound having a carboxylic acid moiety (—O—C(=O)—R) on both ends thereof. R4 and R6 may be the same group, or may be groups different from each other. It is to be noted that details of R4 and R6 are similar to those of R1 and R3 described above, and details of R5 are similar to those of R2 described above.

Though the molecular weight of the dicarboxylic compound is not particularly limited, specially, the molecular weight of the dicarboxylic compound is preferably from 162 to 1000 both inclusive, is more preferably from 162 to 500 both inclusive, and is further more preferably from 162 to 300 both inclusive for the following reason. That is, superior solubility and superior compatibility are thereby obtained.

Specific examples of the dicarboxylic compound include compounds represented by Formula (10-1) to Formula (10-17) for the following reason. That is, sufficient solubility and sufficient compatibility are thereby obtained, and chemical stability of the electrolytic solution is sufficiently improved. However, compounds other than the compounds shown in Formula (10-1) to Formula (10-17) may be used.

[Chemical formula 47]

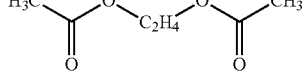
(10-10)

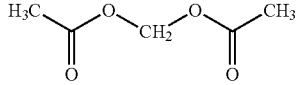
(10-11)

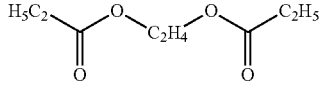
(10-12)

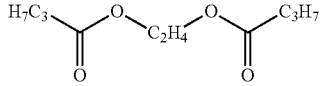
(10-13)

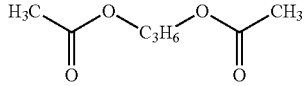
(10-14)

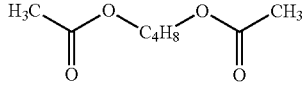
(10-15)

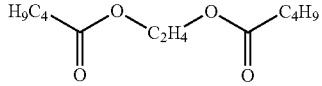
(10-16)

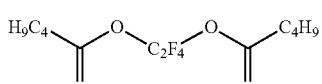
(10-17)

[Chemical formula 46]

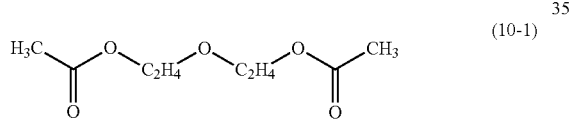
(10-1)

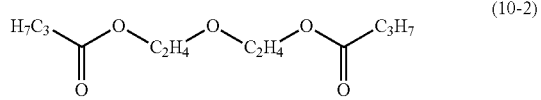
(10-2)

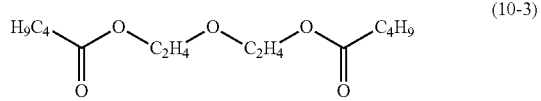
(10-3)

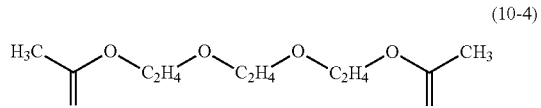
(10-4)

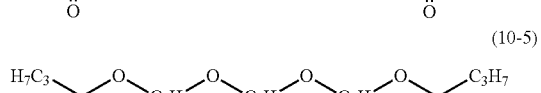
(10-5)

(10-6)

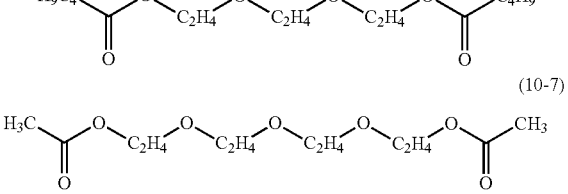
(10-7)

The compound shown in Formula (11) is a disulfonic compound having a sulfonic acid moiety (—O—S(=O)$_2$—R) on both ends thereof. R7 and R9 may be the same group, or may be different groups from each other. It is to be noted that details of R7 and R9 are similar to those of R1 and R3 described above, and details of R8 are similar to those of R2 described above.

Though the molecular weight of the disulfonic compound is not particularly limited, specially, the molecular weight of the disulfonic compound is preferably from 200 to 800 both inclusive, is more preferably from 200 to 600 both inclusive, and is further more preferably from 200 to 450 both inclusive for the following reason. That is, superior solubility and superior compatibility are thereby obtained.

Specific examples of the disulfonic compound include compounds represented by Formula (11-1) to Formula (11-9) for the following reason. That is, sufficient solubility and sufficient compatibility are thereby obtained, and chemical stability of the electrolytic solution is sufficiently improved. However, compounds other than the compounds shown in Formula (11-1) to Formula (11-9) may be used.

[Chemical formula 48]

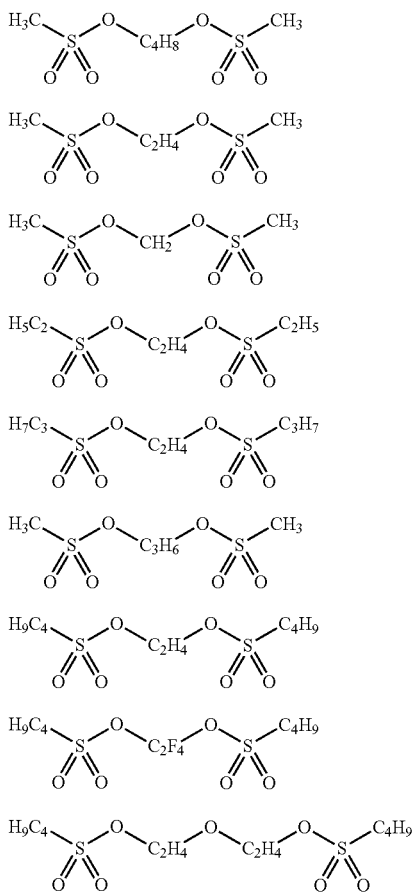

The compound shown in Formula (12) is monofluoro lithium phosphate, and the compound shown in Formula (13) is difluoro lithium phosphate.

The compound shown in Formula (14) is a spirodilactone compound having two γ lactone rings, and is 1,6-dioxaspiro[4,4]nonane-2,7-dione or a derivative thereof. The derivative is other compound obtained by substituting one, or two or more hydrogen atoms contained in 1,6-dioxaspiro[4,4]nonane-2,7-dione as a constituent element by other atoms or atom groups.

R11 to R18 may be the same group, or may be groups different from each other. Details of R11 to R18 will be described below.

Though halogen group type is not particularly limited, specially, a fluorine group is preferable for the following reason. That is, the fluorine group contributes to improving chemical stability of the electrolytic solution more than a chlorine group or the like.

The alkyl group is not particularly limited as long as the carbon number thereof is from 1 to 12 both inclusive, and its structure may be straight-chain or branched. The carbon number thereof is in the foregoing range for the following reason. That is, superior solubility and superior compatibility are thereby obtained. Specially, the carbon number of the alkyl group is preferably equal to or less than 2, since more superior solubility and more superior compatibility are thereby obtained. Specific examples of the alkyl group include those similar to the specific examples of the alkyl group explained in the foregoing detailed description of R1 and R3. The same is applied to a structure and preferable carbon number of the alkoxy group. Specific examples of the alkoxy group include a methoxy group and an ethoxy group.

The alkenyl group is not particularly limited as long as the carbon number thereof is from 2 to 12 both inclusive, and its structure may be straight-chain or branched. The carbon number of the alkenyl group is from 2 to 12 both inclusive for a reason similar to that of the carbon number of the alkyl group described above. Specially, the carbon number of the alkenyl group is preferably equal to or less than 3 for a reason similar to that of the carbon number of the alkyl group described above. Specific examples of the alkenyl group include those similar to the specific examples of the alkenyl group explained in the foregoing detailed description of R1 and R3. The same is applied to a structure, preferable carbon number, and specific examples of the alkenyl group.

The aryl group is not particularly limited as long as the carbon number thereof is from 6 to 18 both inclusive. For example, the aryl group may be a phenyl group, a benzil group, a tolyl group, a xylyl group, a naphthyl group, a phenanthrene group, an anthracene group, or the like. The carbon number of the aryl group is from 6 to 18 both inclusive for a reason similar to that of the carbon number of the alkyl group or the like described above.

Details of the halogenated alkyl group or the like are similar to those of the halogenated alkyl group or the like explained in the foregoing detailed description of R1 and R3.

It is to be noted that R11 to R18 may be bonded with each other to form a ring structure. The ring structure may be, for example, an aromatic ring, a heterocycle, or an alicyclic type, and is not particularly limited. Further, each of R11 to R18 may be a derivative of the foregoing alkyl group or the like. The derivative is a group obtained by introducing one, or two more substituent groups to the alkyl group or the like. Such a substituent group may be a carbon hydride group, or may be a group other than the carbon hydride group.

Specific examples of the spirodilactone compound include compounds represented by Formula (14-1) to Formula (14-10) for the following reason. That is, sufficient solubility and sufficient compatibility are thereby obtained, and chemical stability of the electrolytic solution is sufficiently improved. However, compounds other than the compounds shown in Formula (14-1) to Formula (14-10) may be used.

[Chemical formula 49]

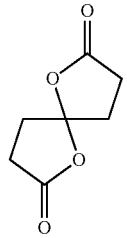

(14-1)

(14-1)
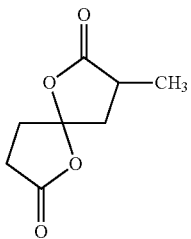

(14-2)
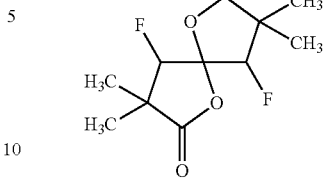

(14-3)
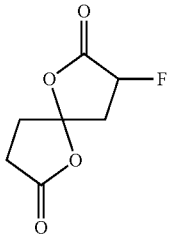

(14-8)
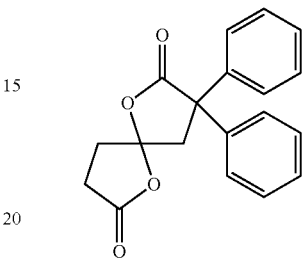

(14-4)
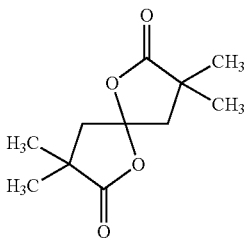

(14-9)
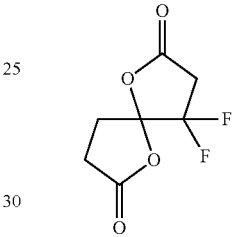

(14-5)
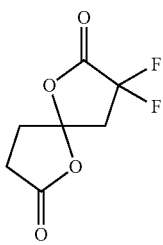

(14-10)

(14-6)

(14-7)
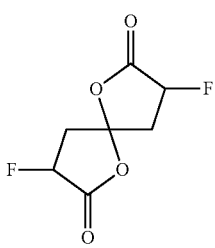

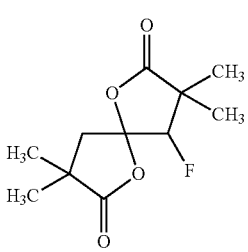

The contents of the dicarbonic ester compound, the dicarboxylic compound, the disulfonic compound, the monofluoro lithium phosphate, and the difluoro lithium phosphate in the electrolytic solution are not particularly limited. Specially, the contents thereof are preferably from 0.001 wt % to 2 wt % both inclusive, and are more preferably from 0.1 wt % to 1 wt % both inclusive, since thereby chemical stability of the electrolytic solution is more improved.

Though the content of the spirodilactone compound in the electrolytic solution is not particularly limited, the content thereof is preferably from 0.01 wt % to 5 wt % both inclusive, and is more preferably from 0.5 wt % to 5 wt % both inclusive, since thereby chemical stability of the electrolytic solution is more improved.

[Nonaqueous Solvent and Electrolyte Salt]

Nonaqueous solvent types, electrolyte salt types, and the like are, for example, similar to those of the first embodiment.

The electrolytic solution contains one, or two more of the dicarbonic ester compound, the dicarboxylic compound, the disulfonic compound, monofluoro lithium phosphate, and difluoro lithium phosphate and one, or two more of the spirodilactone compounds. Thus, compared to a case that the electrolytic solution does not contain a combination of the dicarbonic ester compound or the like and the spirodilactone compound and a case that the electrolytic solution contains only either of the dicarbonic ester compound or the like or the spirodilactone compound, chemical stability is more improved. Therefore, since a decomposition reaction of the electrolytic solution is suppressed at the time of charge and discharge, the electrolytic solution is allowed to contribute to improving performance of a secondary battery using such an electrolytic solution.

In particular, in the case where the content of the dicarbonic ester compound or the like in the nonaqueous solvent is from 0.001 wt % to 2 wt % both inclusive, higher effects are allowed to be obtained. Further, in the case where the content of the spirodilactone compound in the nonaqueous solvent is from 0.01 wt % to 0.5 wt % both inclusive, higher effects are allowed to be obtained.

[1-3. Third Embodiment]

An electrolytic solution according to a third embodiment of the present invention is used for a secondary battery, and contains a nonaqueous solvent and an electrolyte salt. Further, the electrolytic solution contains one or more of compounds represented by Formula (15) and Formula (16) and one or more of compounds represented by Formula (17) and Formula (18). The electrolytic solution contains a combination of one or more of the compounds represented by Formula (15) and Formula (16) and one or more of the compounds represented by Formula (17) and Formula (18) for the following reason. That is, chemical stability is thereby improved more than in a case that the electrolytic solution contains none thereof or only either thereof.

  (15)

  (16)

[Chemical formula 50]

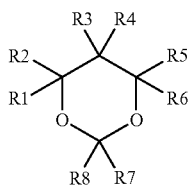  (17)

(Each of R1 to R8 is an alkyl group with carbon number from 1 to 12 both inclusive; an alkenyl group with carbon number from 2 to 12 both inclusive; an alkynyl group with carbon number from 2 to 12 both inclusive; an aryl group with carbon number from 6 to 18 both inclusive; an alkoxy group with carbon number from 1 to 12 both inclusive; a halogenated group thereof; a hydrogen group; or a halogen group. R1 to R18 are allowed to be bonded with each other to form a ring structure.)

[Chemical formula 51]

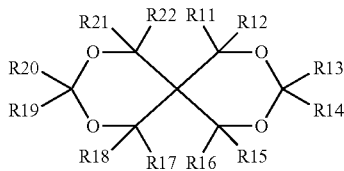  (18)

(Each of R11 to R22 is an alkyl group with carbon number from 1 to 12 both inclusive; an alkenyl group with carbon number from 2 to 12 both inclusive; an alkynyl group with carbon number from 2 to 12 both inclusive; an aryl group with carbon number from 6 to 18 both inclusive; an alkoxy group with carbon number from 1 to 12 both inclusive; a halogenated group thereof; a hydrogen group; or a halogen group. R11 to R22 are allowed to be bonded with each other to form a ring structure.)

[Compounds Shown in Formula (15) and Formula (16)]

The compound shown in Formula (15) is monofluoro lithium phosphate, and the compound shown in Formula (16) is difluoro lithium phosphate. Though the contents of monofluoro lithium phosphate and difluoro lithium phosphate in the electrolytic solution are not particularly limited, specially, the contents thereof are preferably from 0.001 wt % to 2 wt % both inclusive, since thereby chemical stability of the electrolytic solution is more improved. Further, the contents thereof are more preferably from 0.001 wt % to 1 wt % both inclusive, since a superior battery capacity is thereby obtained. It is to be noted that the foregoing contents thereof are applicable to both a case in which the electrolytic solution contains only one of monofluoro lithium phosphate and difluoro lithium phosphate and a case in which the electrolytic solution contains both thereof.

[Compounds Shown in Formula (17) and Formula (18)]

The compound shown in Formula (17) is a dioxane compound having a dioxane structure (—O—C(=O)—O—). R1 to R8 may be the same group, or may be groups different from each other.

A description will be hereinafter given in detail of R1 to R8. Though halogen group type is not particularly limited, specially, a fluorine group (—F), a chlorine group (—Cl), or a bromine group (—Br) is preferable, and the fluorine group is more preferable, since thereby chemical stability of the electrolytic solution is more improved.

Examples of the alkyl group include a methyl group, an ethyl group, an n (normal)-propyl group, an isopropyl group, an n-butyl group, and an isobutyl group. Examples of the alkyl group include a sec (secondary)-butyl group, a tert (tertiary)-butyl group, an n-pentyl group, a 2-methylbutyl group, a 3-methylbutyl group, a 2,2-dimethylpropyl group, and an n-hexyl group. Examples of the alkenyl group include an n-heptyl group, a vinyl group, a 2-methylvinyl group, a 2,2-dimethylvinyl group, a butene-2,4-diyl group, and an allyl group. Examples of the alkynyl group include an ethynyl group. Examples of the aryl group include a phenyl group, a benzil group, and a naphtyl group. Examples of the alkoxy group include a methoxy group, an ethoxy group, and a propoxy group.

The carbon number of the alkyl group or the like is equal to or less than 12 and the carbon number of the aryl group is equal to or less than 18 for the following reason. That is, superior solubility and superior compatibility are thereby obtained. Specially, the carbon number of the alkyl group or the like is preferably small as much as possible, and is more preferably equal to or less than 3, and is further more preferably equal to or less than 2. Further, the carbon number of the aryl group is preferably small as much as possible, and is more preferably 6 for the following reason. That is, superior solubility and superior compatibility are thereby obtained.

"Halogenated group thereof" is a group obtained by substituting one or more hydrogen groups out of the alkyl group, the alkenyl group, the alkynyl group, the aryl group, and the alkoxy group by the foregoing halogen group.

Though ring structure type formed of R1 to R8 is not particularly limited, specially, the ring structure type is preferably an aromatic ring or a cyclohexane ring, and is more preferably the aromatic ring for the following reason. That is, superior solubility and superior compatibility are thereby obtained. Examples of the aromatic ring include a benzene ring, a naphthalene ring, and an anthracene ring, and may be a derivative thereof.

Examples of the dioxane compound include one, or two or more of compounds represented by Formula (17-1) to Formula (17-18) for the following reason. That is, superior solubility and superior compatibility are thereby obtained, and chemical stability of the electrolytic solution is thereby improved. However, other compounds may be used as long as the compound has the structure shown in Formula (17).

[Chemical formula 52]

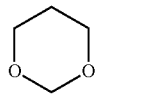 (17-1)

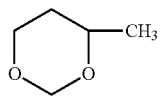 (17-2)

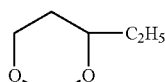 (17-3)

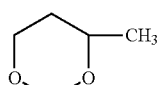 (17-4)

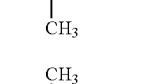 (17-5)

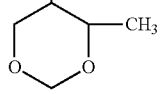 (17-6)

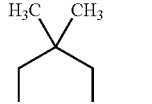 (17-7)

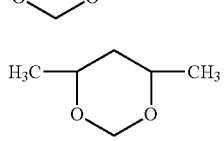 (17-8)

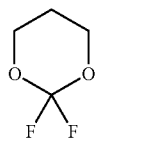 (17-9)

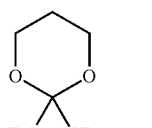 (17-10)

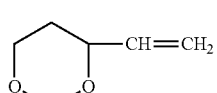 (17-11)

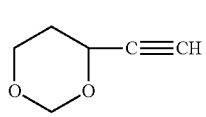 (17-12)

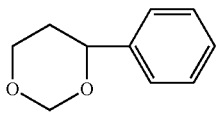 (17-13)

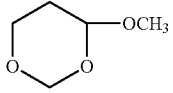 (17-14)

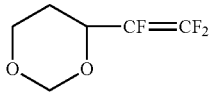 (17-15)

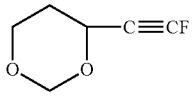 (17-16)

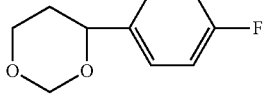 (17-17)

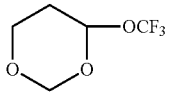 (17-18)

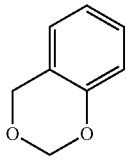

The compound shown in Formula (18) is a spirobidioxane compound having two dioxane structures. R11 to R22 may be the same group, or may be groups different from each other. Details of R11 to R22 are similar to those of R1 to R8.

Examples of the spirobidioxane compound include one, or two or more of compounds represented by Formula (18-1) to Formula (18-17) for the following reason. That is, superior solubility and superior compatibility are thereby obtained, and chemical stability of the electrolytic solution is thereby improved. However, other compound may be used as long as the compound has the structure shown in Formula (18).

[Chemical formula 53]

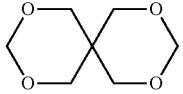 (18-1)

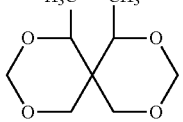 (18-2)

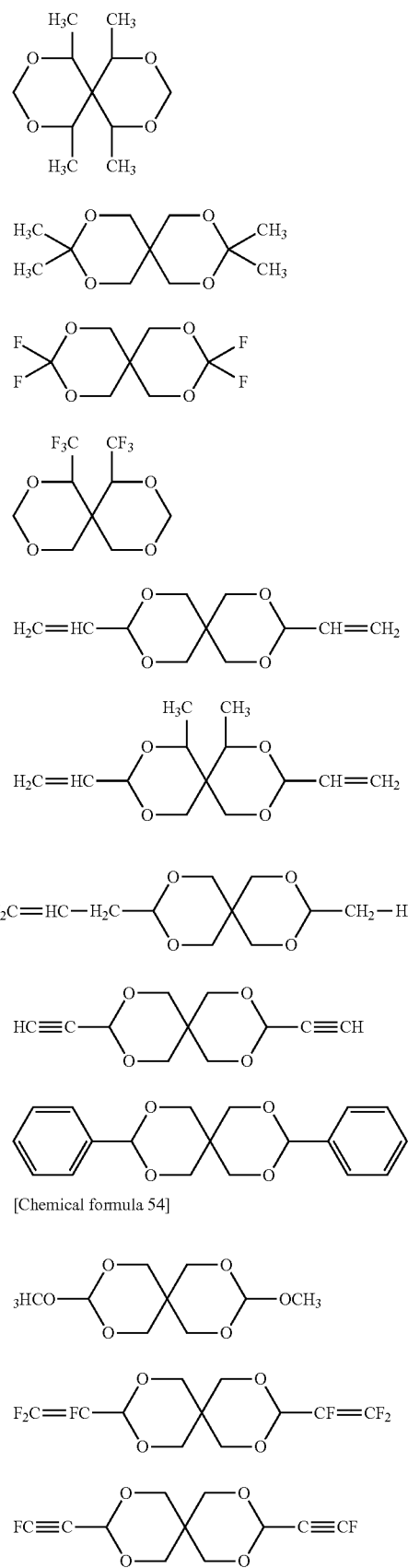
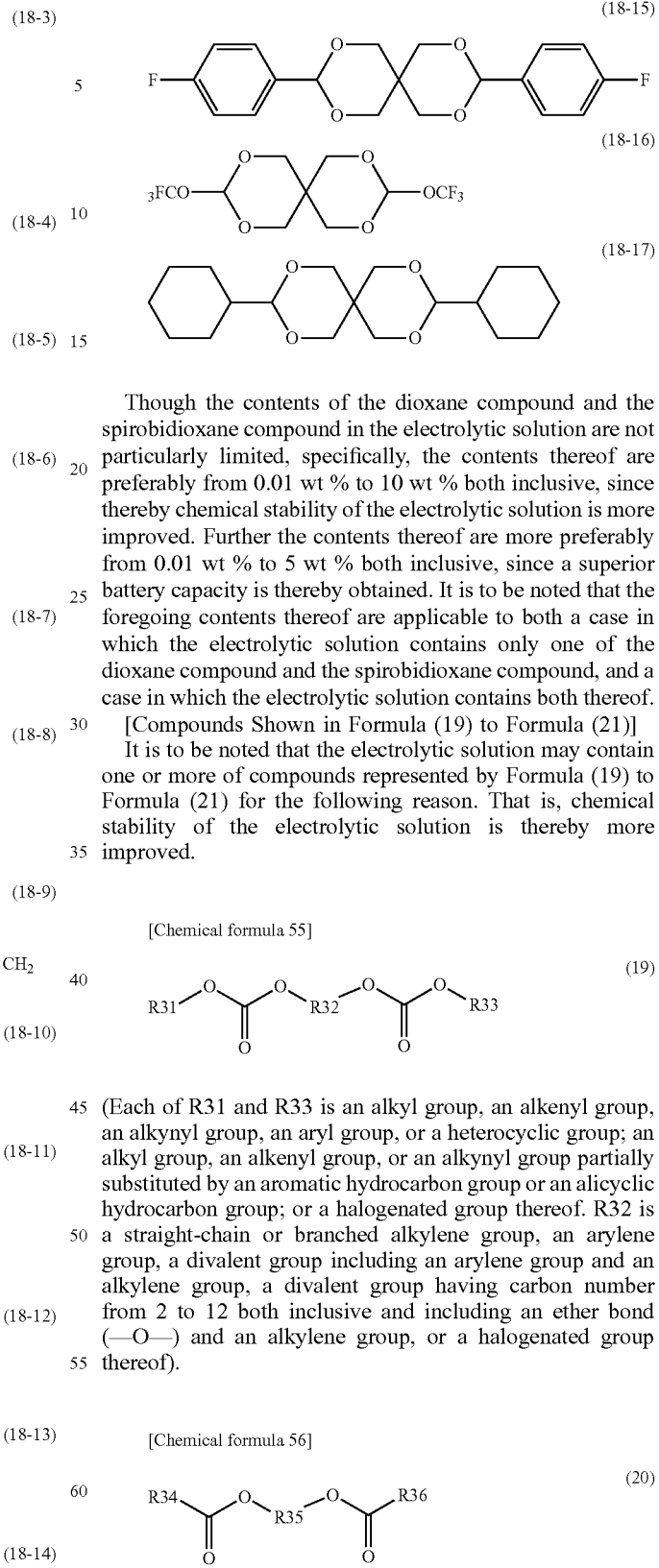

Though the contents of the dioxane compound and the spirobidioxane compound in the electrolytic solution are not particularly limited, specifically, the contents thereof are preferably from 0.01 wt % to 10 wt % both inclusive, since thereby chemical stability of the electrolytic solution is more improved. Further the contents thereof are more preferably from 0.01 wt % to 5 wt % both inclusive, since a superior battery capacity is thereby obtained. It is to be noted that the foregoing contents thereof are applicable to both a case in which the electrolytic solution contains only one of the dioxane compound and the spirobidioxane compound, and a case in which the electrolytic solution contains both thereof.

[Compounds Shown in Formula (19) to Formula (21)]

It is to be noted that the electrolytic solution may contain one or more of compounds represented by Formula (19) to Formula (21) for the following reason. That is, chemical stability of the electrolytic solution is thereby more improved.

[Chemical formula 55]

$$R31\text{-}O\text{-}\underset{O}{\overset{\|}{C}}\text{-}O\text{-}R32\text{-}O\text{-}\underset{O}{\overset{\|}{C}}\text{-}O\text{-}R33 \quad (19)$$

(Each of R31 and R33 is an alkyl group, an alkenyl group, an alkynyl group, an aryl group, or a heterocyclic group; an alkyl group, an alkenyl group, or an alkynyl group partially substituted by an aromatic hydrocarbon group or an alicyclic hydrocarbon group; or a halogenated group thereof. R32 is a straight-chain or branched alkylene group, an arylene group, a divalent group including an arylene group and an alkylene group, a divalent group having carbon number from 2 to 12 both inclusive and including an ether bond (—O—) and an alkylene group, or a halogenated group thereof).

[Chemical formula 56]

$$R34\text{-}\underset{O}{\overset{\|}{C}}\text{-}O\text{-}R35\text{-}O\text{-}\underset{O}{\overset{\|}{C}}\text{-}R36 \quad (20)$$

(Each of R34 and R36 is an alkyl group, an alkenyl group, an alkynyl group, an aryl group, or a heterocyclic group; an alkyl group, an alkenyl group, or an alkynyl group partially substituted by an aromatic hydrocarbon group or an alicyclic hydrocarbon group; or a halogenated group thereof. R35 is a straight-chain or branched alkylene group, an arylene group, a divalent group including an arylene group and an alkylene group, a divalent group having carbon number from 2 to 12 both inclusive and including an ether bond and an alkylene group, or a halogenated group thereof).

[Chemical formula 57]

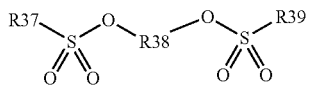

(21)

(Each of R37 and R39 is an alkyl group, an alkenyl group, an alkynyl group, an aryl group, or a heterocyclic group; an alkyl group, an alkenyl group, or an alkynyl group partially substituted by an aromatic hydrocarbon group or an alicyclic hydrocarbon group; or a halogenated group thereof. R8 is a straight-chain or branched alkylene group, an arylene group, a divalent group including an arylene group and an alkylene group, a divalent group having carbon number from 2 to 12 both inclusive and including an ether bond and an alkylene group, or a halogenated group thereof).

The compound shown in Formula (19) is a dicarbonic ester compound having an ester carbonate structure (—O—C(=O)—O—R) on both ends thereof. R31 and R33 may be the same group, or may be groups different from each other.

A description will be hereinafter given in detail of R31 and R33. Examples of the alkyl group include a methyl group, an ethyl group, an n-propyl group, an isopropyl group, an n-butyl group, and an isobutyl group. Examples of the alkyl group include a sec-butyl group, a tert-butyl group, an n-pentyl group, a 2-methylbutyl group, a 3-methylbutyl group, a 2,2-dimethylpropyl group, and an n-hexyl group. Examples of the alkenyl group include an n-heptyl group, a vinyl group, a 2-methylvinyl group, a 2,2-dimethylvinyl group, a butene-2,4-diyl group, and an aryl group. Examples of the alkynyl group include an ethynyl group. Though the carbon number of the foregoing alkyl group or the like is not particularly limited, the carbon number thereof is preferably from 1 to 20 both inclusive, is more preferably from 1 to 7 both inclusive, and is further more preferably from 1 to 4 both inclusive for the following reason. That is, superior solubility and superior compatibility are thereby obtained.

For the alkyl group or the like partially substituted by an aromatic hydrocarbon group or an alicyclic hydrocarbon group, examples of the aromatic hydrocarbon group include a phenyl group, and examples of the alicyclic hydrocarbon group include a cyclohexyl group. Examples of an alkyl group partially substituted by a phenyl group (aralkyl group) include a benzil group and a 2-phenylethyl group (phenethyl group).

Halogen group types of the "halogenated group thereof" are similar to those described for the dioxane compound or the spirobidioxane compound. Examples of the halogenated alkyl group include a fluorinated alkyl group. Examples of the fluorinated alkyl group include a fluoromethyl group, a difluoromethyl group, a trifluoromethyl group, a 2,2,2-trifluoroethyl group, and a pentafluoroethyl group.

Specially, the group partially substituted by an aromatic hydrocarbon group or an alicyclic hydrocarbon group is more preferable and a group not substituted by an aromatic hydrocarbon group or an alicyclic hydrocarbon group is further more preferable. In the group partially substituted by an aromatic hydrocarbon group or an alicyclic hydrocarbon group, the carbon number thereof is not particularly limited. For the carbon number, the total of the carbon number of the aromatic hydrocarbon group or the alicyclic hydrocarbon group and the carbon number of the alkyl group or the like is preferably equal to or less than 20, and is more preferably equal to or less than 7.

It is to be noted that each of R31 and R33 may be a derivative of the foregoing alkyl group or the like. The derivative represents a group obtained by introducing one, or two or more substituent groups to the alkyl group or the like. Such a substituent group may be a carbon hydride group, or may be a group other than the carbon hydride group.

A description will be hereinafter given in detail of R32. Though the carbon number of the straight-chain or branched alkylene group or the like is not particularly limited, the carbon number thereof is preferably from 2 to 10 both inclusive, is more preferably from 2 to 6 both inclusive, and is further more preferably from 2 to 4 both inclusive for the following reason. That is, superior solubility and superior compatibility are thereby obtained. It is to be noted that the divalent group containing an arylene group and an alkylene group may be a group in which one arylene group is linked to one alkylene group, or a group in which two alkylene groups are linked to each other with an arylene group in between (aralkylene group).

In this case, examples of R32 include straight-chain alkylene groups represented by Formula (19-11) to Formula (19-17), branched alkylene groups represented by Formula (19-18) to Formula (19-26), arylene groups represented by Formula (19-27) to Formula (19-29), and a divalent group containing an arylene group and an alkylene group (benzylidene group) represented by Formula (19-30) to Formula (19-32).

[Chemical formula 58]

(19-11)

(19-12)

(19-13)

(19-14)

(19-15)

(19-16)

(19-17)

[Chemical formula 59]

(19-18)

(19-19)

-continued

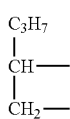 (19-20)

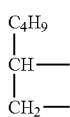 (19-21)

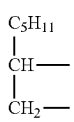 (19-22)

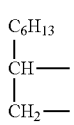 (19-23)

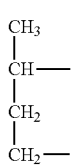 (19-24)

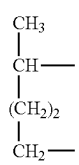 (19-25)

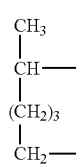 (19-26)

[Chemical formula 60]

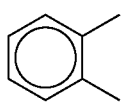 (19-27)

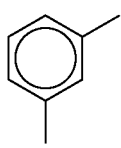 (19-28)

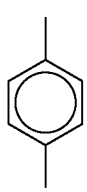 (19-29)

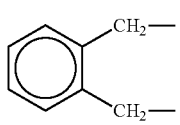 (19-30)

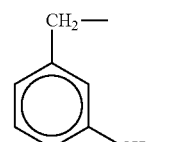 (19-31)

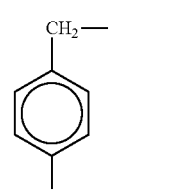 (19-32)

Further, as the divalent group containing an ether bond and an alkylene group (carbon number from 2 to 12 both inclusive), a group in which two or more alkylene groups are linked through an ether bond, and both ends thereof are carbon atoms is preferable. The carbon number of such a group is preferably from 4 to 12 both inclusive for the following reason. That is, superior solubility and superior compatibility are thereby obtained. The number of ether bonds, linkage order of the ether bond and the alkylene group, and the like are arbitrarily set.

In this case, examples of R32 include groups represented by Formula (19-33) to Formula (19-45). Further, examples of fluorinated groups of the groups represented by Formula (19-33) to Formula (19-45) include groups represented by Formula (19-46) to Formula (19-54). Specially, the groups represented by Formula (19-38) to Formula (19-40) are preferable.

[Chemical formula 61]

—CH$_2$—O—CH$_2$— (19-33)

—CH$_2$—(O—CH$_2$)$_2$— (19-34)

—CH$_2$—(O—CH$_2$)$_3$— (19-35)

—CH$_2$—(O—CH$_2$)$_4$— (19-36)

—CH$_2$—(O—CH$_2$)$_5$— (19-37)

—CH$_2$—CH$_2$—O—CH$_2$—CH$_2$— (19-38)

—CH$_2$—CH$_2$—(O—CH$_2$—CH$_2$)$_2$— (19-39)

—CH$_2$—CH$_2$—(O—CH$_2$—CH$_2$)$_3$— (19-40)

—CH$_2$—CH$_2$—(O—CH$_2$—CH$_2$)$_4$— (19-41)

—CH$_2$—CH$_2$—(O—CH$_2$—CH$_2$)$_5$— (19-42)

—CH$_2$—CH$_2$—CH$_2$—O—CH$_2$—CH$_2$—CH$_2$— (19-43)

—CH$_2$—CH$_2$—CH$_2$—(O—CH$_2$—CH$_2$—CH$_2$)$_2$— (19-44)

—CH$_2$—CH$_2$—CH$_2$—(O—CH$_2$—CH$_2$—CH$_2$)$_3$— (19-45)

[Chemical formula 62]

—CF$_2$—O—CF$_2$— (19-46)

—CF$_2$—(O—CF$_2$)$_2$— (19-47)

—CF$_2$—(O—CF$_2$)$_3$— (19-48)

—CF$_2$—CF$_2$—O—CF$_2$—CF$_2$— (19-49)

—CF$_2$—CF$_2$—(O—CF$_2$—CF$_2$)$_2$  (19-50)

—CF$_2$—CF$_2$—(O—CF$_2$—CF$_2$)$_3$  (19-51)

—CH$_2$—CF$_2$—O—CF$_2$—CH$_2$—  (19-52)

—CH$_2$—CF$_2$—O—CF$_2$—CF$_2$—O—CF$_2$—CH$_2$—  (19-53)

—CH$_2$—CF$_2$—(O—CF$_2$—CF$_2$)$_2$—O—CF$_2$—CH$_2$—  (19-54)

It is to be noted that R32 may be a derivative of the alkylene group or the like described above as in the case explained for R31 and R33.

Though the molecular weight of the dicarbonic ester compound is not particularly limited, specially, the molecular weight of the dicarbonic ester compound is preferably from 200 to 800 both inclusive, is more preferably from 200 to 600 both inclusive, and is further more preferably from 200 to 450 both inclusive for the following reason. That is, superior solubility and superior compatibility are thereby obtained.

Examples of the dicarbonic ester compound include one, or two or more of compounds represented by Formula (19-1) to Formula (19-12) for the following reason. That is, sufficient solubility and sufficient compatibility are thereby obtained, and chemical stability of the electrolytic solution is sufficiently improved. However, other compounds may be used as long as the compound has the structure shown in Formula (19).

[Chemical formula 63]

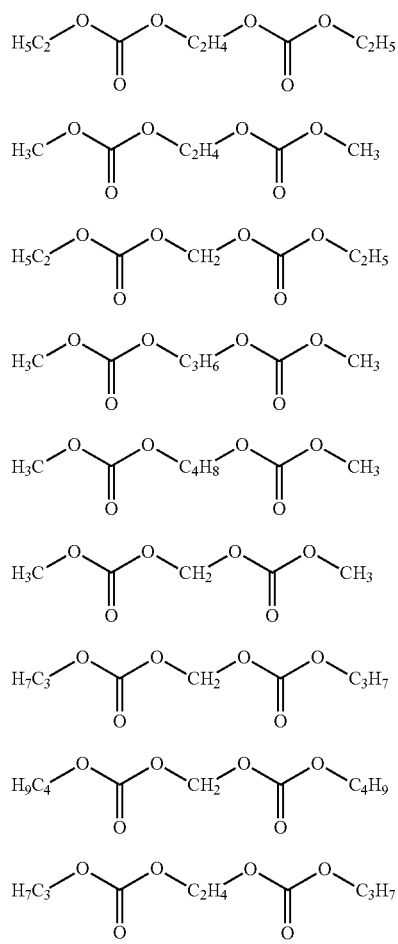

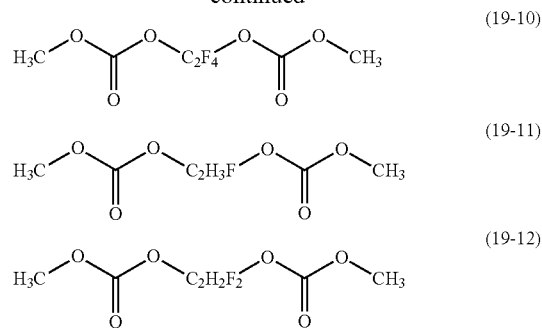

The compound shown in Formula (20) is a dicarboxylic compound having a carboxylic acid structure (—O—C(=O)—R) on both ends. R34 and R36 may be the same group, or may be groups different from each other. It is to be noted that details of R34 to R36 are respectively similar to those of R31 to R33 described above.

Though the molecular weight of the dicarboxylic compound is not particularly limited, specially, the molecular weight of the dicarboxylic compound is preferably from 162 to 1000 both inclusive, is more preferably from 162 to 500 both inclusive, and is further more preferably from 162 to 300 both inclusive for the following reason. That is, superior solubility and superior compatibility are thereby obtained.

Examples of the dicarboxylic compound include one, or two or more of compounds represented by Formula (20-1) to Formula (20-17) for the following reason. That is, sufficient solubility and sufficient compatibility are thereby obtained, and chemical stability of the electrolytic solution is sufficiently improved. However, other compounds may be used as long as the compound has the structure shown in Formula (20).

[Chemical formula 64]

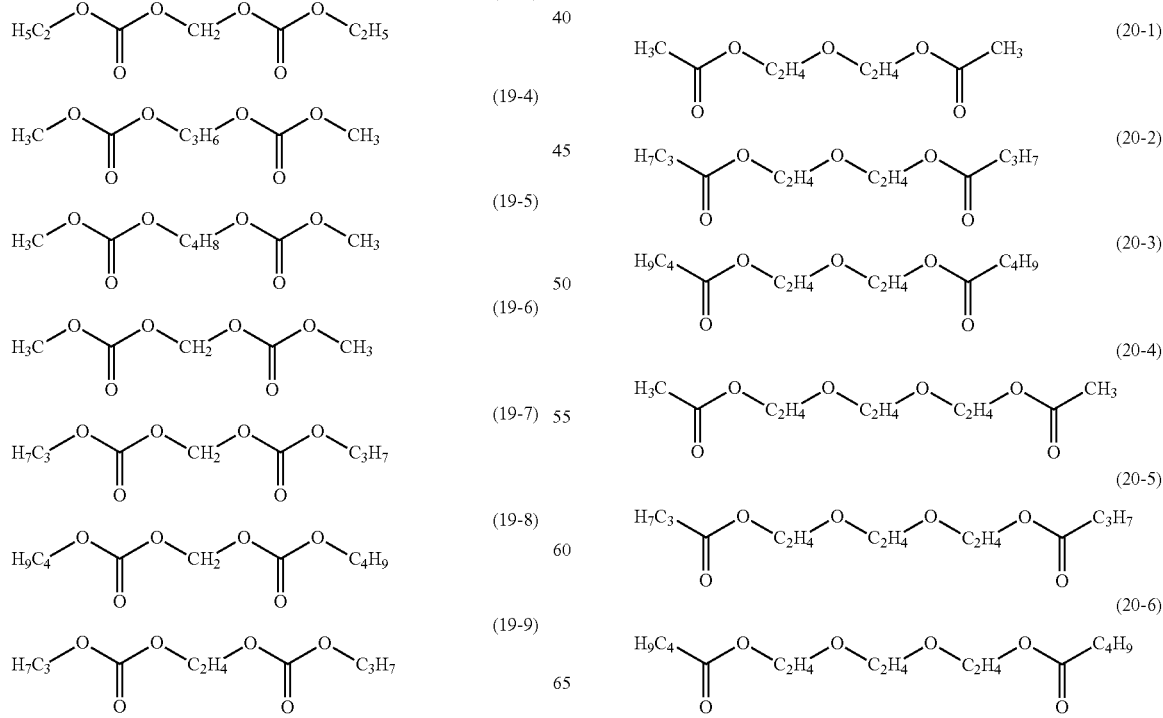

-continued

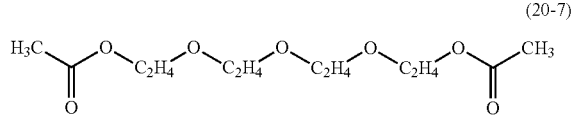 (20-7)

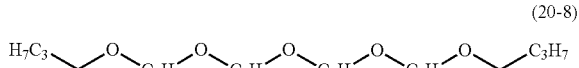 (20-8)

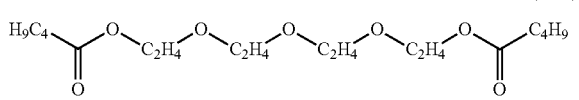 (20-9)

[Chemical formula 65]

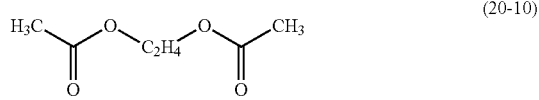 (20-10)

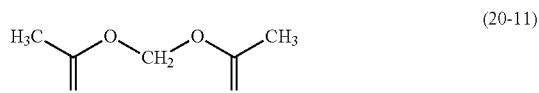 (20-11)

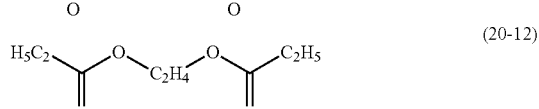 (20-12)

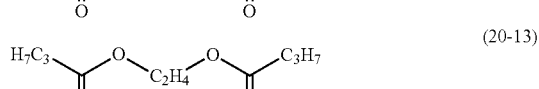 (20-13)

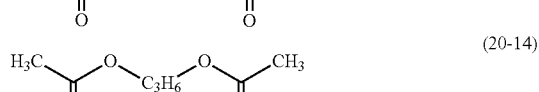 (20-14)

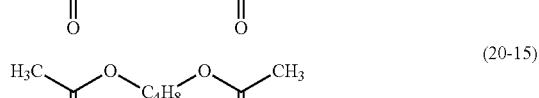 (20-15)

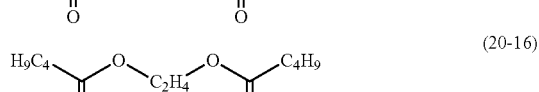 (20-16)

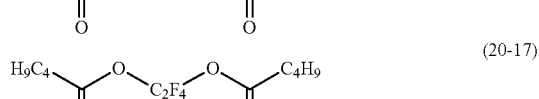 (20-17)

The compound shown in Formula (21) is a disulfonic compound having a sulfonic acid structure (—O—S(=O)$_2$—R) on both ends thereof. R37 and R39 may be the same group, or may be groups different from each other. It is to be noted that details of R37 to R39 are respectively similar to those of R31 to R33 described above.

Though the molecular weight of the disulfonic compound is not particularly limited, specially, the molecular weight of the disulfonic compound is preferably from 200 to 800 both inclusive, is more preferably from 200 to 600 both inclusive, and is further more preferably from 200 to 450 both inclusive for the following reason. That is, superior solubility and superior compatibility are thereby obtained.

Examples of the disulfonic compound include one, or two or more of compounds represented by Formula (21-1) to Formula (21-9) for the following reason. That is, sufficient solubility and sufficient compatibility are thereby obtained, and chemical stability of the electrolytic solution is sufficiently improved. However, other compounds may be used as long as the compound has the structure shown in Formula (21).

[Chemical formula 66]

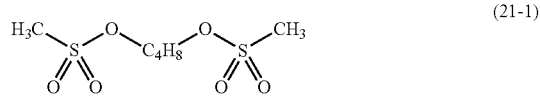 (21-1)

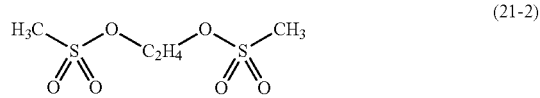 (21-2)

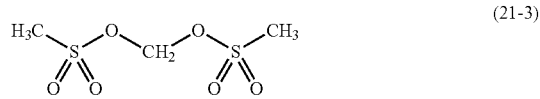 (21-3)

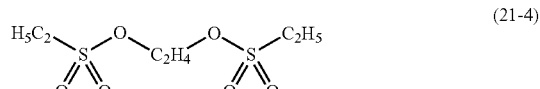 (21-4)

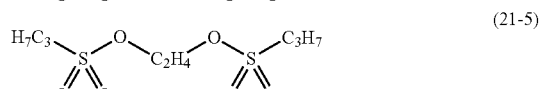 (21-5)

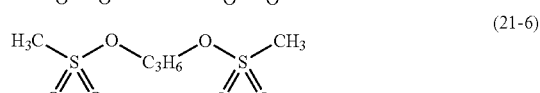 (21-6)

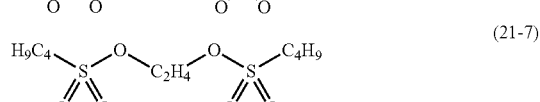 (21-7)

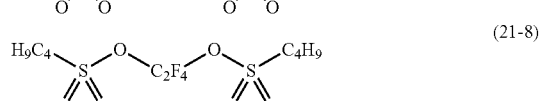 (21-8)

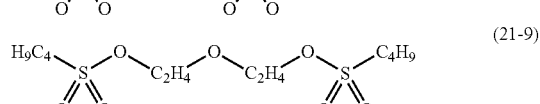 (21-9)

The contents of the dicarbonic ester compound, the dicarboxylic compound, and the disulfonic compound in the electrolytic solution are not particularly limited. Specially, the total of the contents of monofluoro lithium phosphate, difluoro lithium phosphate, the dicarbonic ester compound, the dicarboxylic compound, and the disulfonic compound is preferably from 0.001 wt % to 2 wt % both inclusive, and is more preferably from 0.001 wt % to 1 wt % both inclusive, since thereby chemical stability of the electrolytic solution is more improved.

[Nonaqueous Solvent and Electrolyte Salt]

Nonaqueous solvent types, electrolyte salt types, and the like are, for example, similar to those of the first embodiment.

The electrolytic solution contains one or both of monofluoro lithium phosphate and difluoro lithium phosphate and one or both of the dioxane compound and the spirobidioxane compound. Thus, compared to a case that the electrolytic solution does not contain a combination of one or both of monofluoro lithium phosphate and difluoro lithium phosphate and one or both of the dioxane compound and the spirobidioxane compound and a case that the electrolytic solution contains only either of them, chemical stability of the electrolytic solution is more improved. Therefore, since a decomposition reaction of the electrolytic solution is suppressed at the time of charge and discharge, the electrolytic solution is allowed to contribute to improving performance of a secondary battery using such an electrolytic solution.

In particular, in the case where the contents of monofluoro lithium phosphate and difluoro lithium phosphate in the electrolytic solution are from 0.001 wt % to 2 wt % both inclusive, higher effects are allowed to be obtained. Further, in the case where the contents of the dioxane compound and the spirobidioxane compound in the electrolytic solution are from 0.01 wt % to 10 wt % both inclusive, higher effects are allowed to be obtained.

Further, in the case where the electrolytic solution contains one or more of the dicarbonic ester compound, the dicarboxylic compound, and the disulfonic compound, higher effects are allowed to be obtained.

[2. Secondary Battery]

Next, a description will be given of application examples of the foregoing electrolytic solutions. The electrolytic solutions are used for a lithium secondary battery, for example, as follows.

[2-1. Lithium Ion Secondary Battery (Cylindrical Type)]

FIG. 1 and FIG. 2 illustrate a cross-sectional configuration of a lithium ion secondary battery (cylindrical type). FIG. 2 illustrates an enlarged part of a spirally wound electrode body 20 illustrated in FIG. 1. In the lithium ion secondary battery, the anode capacity is expressed by insertion and extraction of lithium ions.

[Whole Configuration of Secondary Battery]

The secondary battery mainly contains the spirally wound electrode body 20 and a pair of insulating plates 12 and 13 inside a battery can 11 in the shape of a substantially hollow cylinder. The spirally wound electrode body 20 is a spirally wound laminated body in which a cathode 21 and an anode 22 are layered with a separator 23 in between and are spirally wound.

The battery can 11 has a hollow structure in which one end of the battery can 11 is closed and the other end of the battery can 11 is opened. The battery can 11 is made of, for example, iron, aluminum, an alloy thereof, or the like. It is to be noted that, in the case where the battery can 11 is made of iron, for example, the surface of the battery can 11 may be plated with nickel or the like. The pair of insulating plates 12 and 13 is arranged to sandwich the spirally wound electrode body 20 in between from the upper and lower sides, and to extend perpendicularly to the spirally wound periphery face.

At the open end of the battery can 11, a battery cover 14, a safety valve mechanism 15, and a PTC (positive temperature coefficient) device 16 are attached by being swaged with a gasket 17. Inside of the battery can 11 is hermetically sealed. The battery cover 14 is made of, for example, a material similar to that of the battery can 11. The safety valve mechanism 15 and the PTC device 16 are provided inside the battery cover 14. The safety valve mechanism 15 is electrically connected to the battery cover 14 through the PTC device 16. In the safety valve mechanism 15, in the case where the internal pressure becomes a certain level or more by internal short circuit, external heating, or the like, a disk plate 15A inverts to cut the electric connection between the battery cover 14 and the spirally wound electrode body 20. As temperature rises, the PTC device 16 increases the resistance and thereby abnormal heat generation resulting from a large current is prevented. The gasket 17 is made of, for example, an insulating material. The surface of the gasket 17 may be coated with, for example, asphalt.

In the center of the spirally wound electrode body 20, a center pin 24 may be inserted. A cathode lead 25 made of a conductive material such as aluminum is connected to the cathode 21, and an anode lead 26 made of a conductive material such as nickel is connected to the anode 22. The cathode lead 25 is electrically connected to the battery cover 14 by, for example, being welded to the safety valve mechanism 15. The anode lead 26 is, for example, welded and thereby electrically connected to the battery can 11.

[Cathode]

In the cathode 21, for example, a cathode active material layer 21B is provided on both surfaces of a cathode current collector 21A. However, the cathode active material layer 21B may be provided only on a single surface of the cathode current collector 21A.

The cathode current collector 21A is made of, for example, a conductive material such as aluminum (Al), nickel (Ni), and stainless steel.

The cathode active material layer 21B contains, as a cathode active material, one type, or two or more types of cathode materials capable of inserting and extracting lithium ions. As needed, the cathode active material layer 21B may contain other material such as a cathode binder and a cathode electrical conductor.

As the cathode material, a lithium-containing compound is preferable, since thereby a high energy density is allowed to be obtained. Examples of the lithium-containing compound include a composite oxide having lithium and a transition metal element as constituent elements and a phosphate compound containing lithium and a transition metal element as constituent elements. Specially, a compound having one, or two or more of cobalt (Co), nickel, manganese (Mn), and iron (Fe) as a transition metal element is preferable, since thereby a higher voltage is obtained. The chemical formula thereof is expressed by, for example, $Li_xM1O_2$ or $Li_yM2_2PO_4$. In the formula, M1 and M2 represent one or more transition metal elements. Further, values of x and y vary according to the charge and discharge state, and are generally in the range of $0.05 \leq x \leq 1.10$ and $0.05 \leq y \leq 1.10$.

Examples of the composite oxide having lithium and a transition metal element include a lithium-cobalt composite oxide ($Li_xCoO_2$), a lithium-nickel composite oxide ($Li_xNiO_2$), and a lithium-nickel-based composite oxide represented by Formula (30). Examples of the phosphate compound having lithium and a transition metal element include lithium-iron phosphate compound ($LiFePO_4$) and a lithium-iron-manganese phosphate compound ($LiFe_{1-u}Mn_uPO_4$ (u<1)), since thereby a high battery capacity is obtained and superior cycle characteristics are obtained.

$$LiNi_{1-x}M_xO_2 \tag{30}$$

(M is one, or two or more of cobalt, manganese, iron, aluminum, vanadium, tin, magnesium, titanium, strontium, calcium, zirconium, molybdenum, technetium, ruthenium, tantalum, tungsten, rhenium, ytterbium, copper, zinc, barium, boron, chromium, silicon, gallium, phosphorus, antimony, and niobium. x is in the range of 0.005<x<0.5.)

In addition, examples of cathode materials include an oxide, a disulfide, a chalcogenide, and a conductive polymer. Examples of the oxide include titanium oxide, vanadium oxide, and manganese dioxide. Examples of the disulfide include titanium disulfide and molybdenum sulfide.

Examples of the chalcogenide include niobium selenide. Examples of the conductive polymer include sulfur, polyaniline, and polythiophene.

Examples of cathode binders include one type, or two or more types of a synthetic rubber-based and a polymer material. Examples of the synthetic rubber include styrene butadiene rubber, fluorinated rubber, and ethylene propylene diene. Examples of the polymer material include polyvinylidene fluoride and polyimide.

Examples of cathode electrical conductors include one type, or two or more types of carbon materials. Examples of the carbon materials include graphite, carbon black, acetylene black, and Ketjen black. It is to be noted that the cathode electrical conductor may be a metal material, a conductive polymer, or the like as long as the material has electric conductivity.

[Anode]

In the anode 22, for example, an anode active material layer 22B is provided on both surfaces of an anode current collector 22A. However, the anode active material layer 22B may be provided only on a single surface of the anode current collector 22A.

The anode current collector 22A is made of, for example, a conductive material such as copper, nickel, and stainless steel. The surface of the anode current collector 22A is preferably roughened. Thereby, due to what we call anchor effect, adhesion characteristics of the anode active material layer 22B with respect to the anode current collector 22A are improved. In this case, it is enough that at least the surface of the anode current collector 22A in the region opposed to the anode active material layer 22B is roughened. Examples of roughening methods include a method of forming fine particles by electrolytic treatment. The electrolytic treatment is a method of providing concavity and convexity by forming fine particles on the surface of the anode current collector 22A by an electrolytic method in an electrolytic bath. A copper foil formed by an electrolytic method is generally called "electrolytic copper foil."

The anode active material layer 22B contains one type, or two or more types of anode materials capable of inserting and extracting lithium ions as an anode active material, and may also contain other materials such as an anode binder and an anode electrical conductor as needed. It is to be noted that details of the anode binder and the anode electrical conductor are, for example, respectively similar to those of the cathode binder and the cathode electrical conductor. In the anode active material layer 22B, for example, a chargeable capacity of the anode material is preferably larger than a discharge capacity of the cathode 21 in order to prevent unintentional precipitation of lithium metal at the time of charge and discharge.

Examples of the anode material include a carbon material. In the carbon material, crystal structure change at the time of insertion and extraction of lithium ions is extremely small. Thus, the carbon material provides a high energy density and superior cycle characteristics. Further, the carbon material functions as an anode electrical conductor as well. Examples of the carbon material include graphitizable carbon, non-graphitizable carbon in which the spacing of (002) plane is equal to or greater than 0.37 nm, and graphite in which the spacing of (002) plane is equal to or less than 0.34 nm. More specifically, examples of the carbon material include pyrolytic carbons, cokes, glassy carbon fiber, an organic polymer compound fired body, activated carbon, and carbon blacks. Of the foregoing, the cokes include pitch coke, needle coke, and petroleum coke. The organic polymer compound fired body is obtained by firing and carbonizing a phenol resin, a furan resin, or the like at appropriate temperature. It is to be noted that the shape of the carbon material may be any of a fibrous shape, a spherical shape, a granular shape, and a scale-like shape.

Further, examples of the anode material include a material (metal-based material) having one, or two or more types of metal elements and metalloid elements as a constituent element, since a high energy density is allowed to be thereby obtained. Such a metal-based material may be a simple substance, an alloy, or a compound of a metal element or a metalloid element, may be two or more thereof, or may have one type, or two or more types of phases thereof at least in part. It is to be noted that "Alloy" in the present invention includes a material containing one or more metal elements and one or more metalloid elements, in addition to a material formed of two or more metal elements. Further, "alloy" may contain a nonmetallic element. The structure thereof includes a solid solution, a eutectic crystal (eutectic mixture), an intermetallic compound, and a structure in which two or more thereof coexist.

The foregoing metal element or the foregoing metalloid element is, for example, a metal element or a metalloid element capable of forming an alloy with lithium. Specifically, the foregoing metal element or the foregoing metalloid element is one, or two or more of the following elements. That is, the foregoing metal element or the foregoing metalloid element is one, or two or more of magnesium (Mg), boron (B), aluminum, gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). Specially, one or both of silicon and tin are preferably used. Silicon and tin have a high ability of inserting and extracting lithium ions, and thus provide a high energy density.

A material containing one or both of silicon and tin may be, for example, a simple substance, an alloy, or a compound of silicon or tin; two or more thereof; or a material having one type, or two or more types of phases thereof at least in part.

Examples of the alloy of silicon include a material having one, or two or more of the following elements as constituent elements other than silicon. Such an element other than silicon is tin, nickel, copper, iron, cobalt, manganese, zinc, indium, silver, titanium, germanium, bismuth, antimony, and chromium. Examples of the compound of silicon include a compound having oxygen or carbon as a constituent element other than silicon. It is to be noted that the compounds of silicon may have one, or two or more of the elements described for the alloys of silicon as a constituent element other than silicon.

Examples of the alloy or the compound of silicon include the following materials. That is, examples thereof include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), and $LiSiO$.

Examples of the alloy of tin include a material having one, or two or more of the following elements as constituent elements other than tin. Such elements are silicon, nickel, copper, iron, cobalt, manganese, zinc, indium, silver, titanium, germanium, bismuth, antimony, or chromium. Examples of the compound of tin include a material having oxygen or carbon as a constituent element. It is to be noted that the compounds of tin may contain one, or two or more of the elements described for the alloys of tin as a constituent element other than tin. Examples of the alloy or the compound of tin include $SnO_w$ ($0<w\leq2$), $SnSiO_3$, $LiSnO$, and $Mg_2Sn$.

In particular, as a material having silicon, for example, the simple substance of silicon is preferable, since a high battery capacity, superior cycle characteristics, and the like are thereby obtained. It is to be noted that "simple substance" only means a general simple substance (may contain a slight amount of impurity), and does not necessarily mean a substance with purity 100%.

Further, as a material having tin, for example, a material containing a second constituent element and a third constituent element in addition to tin as a first constituent element is preferable. The second constituent element is, for example, one, or two or more of the following elements. That is, the second constituent element may be one, or two or more of cobalt, iron, magnesium, titanium, vanadium, chromium, manganese, nickel, copper, zinc, gallium, zirconium, niobium, molybdenum, silver, indium, cerium (Ce), hafnium, tantalum, tungsten (W), bismuth, and silicon. The third constituent element is, for example, one, or two or more of boron, carbon, aluminum, and phosphorus. In the case where the second constituent element and the third constituent element are contained, a high battery capacity, superior cycle characteristics, and the like are obtained.

Specially, a material having tin, cobalt, and carbon (SnCoC-containing material) is preferable. As the composition of the SnCoC-containing material, for example, the carbon content is from 9.9 wt % to 29.7 wt % both inclusive, and the ratio of tin and cobalt contents (Co/(Sn+Co)) is from 20 wt % to 70 wt % both inclusive, since a high energy density is obtained in such a composition range.

It is preferable that the SnCoC-containing material have a phase containing tin, cobalt, and carbon. Such a phase preferably has a low crystalline structure or an amorphous structure. The phase is a reaction phase capable of reacting with lithium. Due to existence of the reaction phase, superior characteristics are obtained. The half bandwidth of the diffraction peak obtained by X-ray diffraction of the phase is preferably 1.0 deg or more based on diffraction angle of 2θ in the case where CuKα ray is used as a specific X ray, and the insertion rate is 1 deg/min. Thereby, lithium ions are more smoothly inserted and extracted, and reactivity with the electrolytic solution is decreased. It is to be noted that in some cases, the SnCoC-containing material has a phase containing a simple substance of the respective constituent elements or some of the constituent elements in addition to the low crystalline or amorphous phase.

Whether or not the diffraction peak obtained by X-ray diffraction corresponds to the reaction phase capable of reacting with lithium is allowed to be easily determined by comparison between X-ray diffraction charts before and after electrochemical reaction with lithium. For example, the position of the diffraction peak after electrochemical reaction with lithium is changed from the position of the diffraction peak before the electrochemical reaction with lithium, the obtained diffraction peak corresponds to the reaction phase capable of reacting with lithium. In this case, for example, the diffraction peak of the low crystalline or amorphous reaction phase is seen in the range of 2θ which is 20 to 50 deg both inclusive. Such a reaction phase has, for example, the foregoing respective constituent elements, and the low crystalline or amorphous structure may mainly result from existence of carbon.

In the SnCoC-containing material, part or all of carbon as a constituent element is preferably bonded with a metal element or a metalloid element as other constituent element, since thereby cohesion or crystallization of tin or the like is suppressed. The bonding state of elements is allowed to be checked by, for example, X-ray photoelectron spectroscopy (XPS). In a commercially available device, for example, as a soft X ray, Al—Kα ray, Mg—Kα ray, or the like is used. In the case where part or all of carbon is bonded with a metal element, a metalloid element, or the like, the peak of a synthetic wave of 1s orbit of carbon (C1s) is shown in a region lower than 284.5 eV. It is to be noted that, in the device, energy calibration is made so that the peak of 4f orbit of gold atom (Au4f) is obtained in 84.0 eV. At this time, in general, since surface contamination carbon exists on the material surface, the peak of C1s of the surface contamination carbon is regarded as 284.8 eV, which is used as the energy standard. In XPS measurement, the waveform of the peak of C1s is obtained as a form including the peak of the surface contamination carbon and the peak of carbon in the SnCoC-containing material. Thus, for example, analysis is made by using commercially available software to isolate both peaks from each other. In the waveform analysis, the position of a main peak existing on the lowest bound energy side is the energy standard (284.8 eV).

It is to be noted that the SnCoC-containing material may further have other constituent elements as needed. Examples of other constituent elements include one, or two or more of silicon, iron, nickel, chromium, indium, niobium, germanium, titanium, molybdenum, aluminum, phosphorus, gallium, and bismuth.

In addition to the SnCoC-containing material, a material containing tin, cobalt, iron, and carbon (SnCoFeC-containing material) is also preferable. The composition of the SnCoFeC-containing material is allowed to be arbitrarily set. For example, a composition in which the iron content is set small is as follows. That is, the carbon content is from 9.9 wt % to 29.7 wt % both inclusive, the iron content is from 0.3 wt % to 5.9 wt % both inclusive, and the ratio of contents of tin and cobalt (Co/(Sn+Co)) is from 30 wt % to 70 wt % both inclusive. Further, for example, a composition in which the iron content is set large is as follows. That is, the carbon content is from 11.9 wt % to 29.7 wt % both inclusive, the ratio of contents of tin, cobalt, and iron ((Co+Fe)/(Sn+Co+Fe)) is from 26.4 wt % to 48.5 wt % both inclusive, and the ratio of contents of cobalt and iron (Co/(Co+Fe)) is from 9.9 wt % to 79.5 wt % both inclusive. In such a composition range, a high energy density is obtained. The physical properties (half bandwidth and the like) of the SnCoFeC-containing material are similar to those of the foregoing SnCoC-containing material.

Further, examples of other anode materials include a metal oxide and a polymer compound. Examples of the metal oxide include iron oxide, ruthenium oxide, and molybdenum oxide. Examples of the polymer compound include polyacetylene, polyaniline, and polypyrrole.

The anode active material layer 22B is formed by, for example, a coating method, a vapor-phase deposition method, a liquid-phase deposition method, a spraying method, a firing method (sintering method), or a combination of two or more of these methods. The coating method is a method in which, for example, after a particulate anode active material is mixed with a binder or the like, the mixture is dispersed in a solvent such as an organic solvent, and the anode current collector is coated with the resultant. Examples of the vapor-phase deposition method include a physical deposition method and a chemical deposition method. Specifically, examples thereof include a vacuum evaporation method, a sputtering method, an ion plating method, a laser ablation method, a thermal CVD (chemical vapor deposition) method, and a plasma CVD method. Examples of the liquid-phase deposition method include an electrolytic plating method and an electroless plating method. The spraying method is a method in which an anode active material is sprayed in a fused state or a semi-fused state. The firing method is, for example, a method in which, after the anode current collector is coated by a procedure similar to that of the coating method, heat treatment is performed at temperature higher than the melting point of the binder or the like. Examples of the firing method include a known technique such as an atmosphere firing method, a reactive firing method, and a hot press firing method.

[Separator]

The separator 23 separates the cathode 21 from the anode 22, and passes lithium ions while preventing current short circuit resulting from contact of both electrodes. The separator 23 is impregnated with the foregoing electrolytic solution as a liquid electrolyte. The separator 23 is formed of, for example, a porous film made of a synthetic resin or ceramics. The separator 23 may be a laminated film formed of two or more porous films thereof. Examples of the synthetic resin include polytetrafluoroethylene, polypropylene, and polyethylene.

[Operation of Secondary Battery]

In the secondary battery, at the time of charge, for example, lithium ions extracted from the cathode 21 are inserted in the anode 22 through the electrolytic solution. Meanwhile, at the time of discharge, for example, lithium ions extracted from the anode 22 are inserted in the cathode 21 through the electrolytic solution.

[Method of Manufacturing Secondary Battery]

The secondary battery is manufactured, for example, by the following procedure.

First, the cathode 21 is formed. First, a cathode active material is mixed with a cathode binder, a cathode electrical conductor, or the like as needed to prepare a cathode mixture, which is subsequently dispersed in a solvent such as an organic solvent to obtain a paste cathode mixture slurry. Subsequently, both surfaces of the cathode current collector 21A are coated with the cathode mixture slurry, which is dried to form the cathode active material layer 21B. Finally, the cathode active material layer 21B is compression-molded by a rolling press machine or the like while being heated as needed. In this case, the resultant may be compression-molded over several times.

Next, the anode 22 is formed by a procedure similar to that of the foregoing cathode 21. In this case, an anode active material is mixed with an anode binder, an anode electrical conductor, or the like as needed to prepare an anode mixture, which is subsequently dispersed in a solvent to form a paste anode mixture slurry. Subsequently, both surfaces of the anode current collector 22A are coated with the anode mixture slurry, which is dried to form the anode active material layer 22B. After that, the anode active material layer 22B is compression-molded as needed.

It is to be noted that the anode 22 may be formed by a procedure different from that of the cathode 21. In this case, for example, the anode material is deposited on both surfaces of the anode current collector 22A by a vapor-phase deposition method such as an evaporation method to form the anode active material layer 22B.

Finally, the secondary battery is assembled by using the cathode 21 and the anode 22. First, the cathode lead 25 is attached to the cathode current collector 21A by welding or the like, and the anode lead 26 is attached to the anode current collector 22A by welding or the like. Subsequently, the cathode 21 and the anode 22 are layered with the separator 23 in between and are spirally wound, and thereby the spirally wound electrode body 20 is formed. After that, the center pin 24 is inserted in the center of the spirally wound electrode body. Subsequently, the spirally wound electrode body 20 is sandwiched between the pair of insulating plates 12 and 13, and is contained in the battery can 11. In this case, the tip end of the cathode lead 25 is attached to the safety valve mechanism 15 by welding or the like, and the tip end of the anode lead 26 is attached to the battery can 11 by welding or the like. Subsequently, the electrolytic solution is injected into the battery can 11, and the separator 23 is impregnated with the electrolytic solution. Finally, at the open end of the battery can 11, the battery cover 14, the safety valve mechanism 15, and the PTC device 16 are swaged with the gasket 17. The secondary battery illustrated in FIG. 1 and FIG. 2 is thereby completed.

Since the lithium ion secondary battery includes the foregoing electrolytic solution, a decomposition reaction of the electrolytic solution at the time of charge and discharge is suppressed. Therefore, cycle characteristics, conservation characteristics, and load characteristics are allowed to be improved. In particular, in the case where the metal-based material advantageous to realizing a high capacity is used as an anode active material of the anode 22, the characteristics are improved. Thus, in this case, a higher effect is allowed to be obtained than in a case that a carbon material or the like is used. Other effect for the lithium ion secondary battery is similar to that of the electrolytic solution.

[2-2. Lithium Ion Secondary Battery (Laminated Film Type)]

FIG. 3 illustrates an exploded perspective configuration of a lithium ion secondary battery (laminated film type). FIG. 4 illustrates a cross section taken along a line IV-IV of a spirally wound electrode body 30 illustrated in FIG. 3.

In the secondary battery, a spirally wound electrode body 30 is contained in a film-like outer package member 40 mainly. The spirally wound electrode body 30 is a spirally wound laminated body in which a cathode 33 and an anode 34 are layered with a separator 35 and an electrolyte layer 36 in between and are spirally wound. A cathode lead 31 is attached to the cathode 33, and an anode lead 32 is attached to the anode 34. The outermost periphery of the spirally wound electrode body 30 is protected by a protective tape 37.

The cathode lead 31 and the anode lead 32 are, for example, respectively led out from inside to outside of the outer package member 40 in the same direction. The cathode lead 31 is made of, for example, a conductive material such as aluminum, and the anode lead 32 is made of, for example, a conducive material such as copper, nickel, and stainless steel. These materials are in the shape of, for example, a thin plate or mesh.

The outer package member 40 is a laminated film in which, for example, a fusion bonding layer, a metal layer, and a surface protective layer are layered in this order. In the laminated film, for example, the respective outer edges of the fusion bonding layers of two films are bonded with each other by fusion bonding, an adhesive, or the like so that the fusion bonding layers and the spirally wound electrode body 30 are opposed to each other. Examples of the fusion bonding layer include a film made of polyethylene, polypropylene, or the like. Examples of the metal layer include an aluminum foil. Examples of the surface protective layer include a film made of nylon, polyethylene terephthalate, or the like.

Specially, as the outer package member 40, an aluminum laminated film in which a polyethylene film, an aluminum foil, and a nylon film are layered in this order is preferable. However, the outer package member 40 may be made of a laminated film having other laminated structure, a polymer film such as polypropylene, or a metal film.

An adhesive film 41 to protect from outside air intrusion is inserted between the package member 40, and the cathode lead 31 and the anode lead 32. The adhesive film 41 is made of a material having adhesion characteristics with respect to the cathode lead 31 and the anode lead 32. Examples of such a material include a polyolefin resin such as polyethylene, polypropylene, modified polyethylene, and modified polypropylene.

In the cathode 33, for example, a cathode active material layer 33B is provided on both surfaces of a cathode current collector 33A. In the anode 34, for example, an anode active material layer 34B is provided on both surfaces of an anode current collector 34A. The configurations of the cathode current collector 33A, the cathode active material layer 33B, the anode current collector 34A, and the anode active material layer 34B are respectively similar to the configurations of the cathode current collector 21A, the cathode active material layer 21B, the anode current collector 22A and the anode active material layer 22B. The configuration of the separator 35 is similar to the configuration of the separator 23.

In the electrolyte layer 36, an electrolytic solution is held by a polymer compound. The electrolyte layer 36 may contain other material such as an additive as needed. The electrolyte layer 36 is what we call a gel electrolyte. The gel electrolyte is preferable, since thereby high ion conductivity (for example, 1 mS/cm or more at room temperature) is obtained and liquid leakage of the electrolytic solution is prevented.

Examples of the polymer compound include one, or two or more of the following polymer materials. That is, examples thereof include polyacrylonitrile, polyvinylidene fluoride, polytetrafluoroethylene, polyhexafluoropropylene, polyethylene oxide, polypropylene oxide, polyphosphazene, polysiloxane, and polyvinyl fluoride. Further, examples thereof include polyvinyl acetate, polyvinyl alcohol, polymethacrylic acid methyl, polyacrylic acid, polymethacrylic acid, styrene-butadiene rubber, nitrile-butadiene rubber, polystyrene, and polycarbonate. Further examples thereof include a copolymer of vinylidene fluoride and hexafluoro propylene. Specially, polyvinylidene fluoride or the copolymer of vinylidene fluoride and hexafluoro propylene is preferable, since such a polymer compound is electrochemically stable.

The composition of the electrolytic solution is similar to the composition of the electrolytic solution described in the cylindrical type secondary battery. However, in the electrolyte layer 36 as the gel electrolyte, a nonaqueous solvent of the electrolytic solution represents a wide concept including not only the liquid solvent but also a material having ion conductivity capable of dissociating the electrolyte salt. Therefore, in the case where the polymer compound having ion conductivity is used, the polymer compound is also included in the nonaqueous solvent.

Instead of the gel electrolyte layer 36, the electrolytic solution may be used as it is. In this case, the separator 35 is impregnated with the electrolytic solution.

In the secondary battery, at the time of charge, for example, lithium ions extracted from the cathode 33 are inserted in the anode 34 through the electrolyte layer 36. Meanwhile, at the time of discharge, for example, lithium ions extracted from the anode 34 are inserted in the cathode 33 through the electrolyte layer 36.

The secondary battery including the gel electrolyte layer 36 is manufactured, for example, by the following three procedures.

In the first procedure, first, the cathode 33 and the anode 34 are formed by a formation procedure similar to that of the cathode 21 and the anode 22. In this case, the cathode 33 is formed by forming the cathode active material layer 33B on both surfaces of the cathode current collector 33A, and the anode 34 is formed by forming the anode active material layer 34B on both surfaces of the anode current collector 34A. Subsequently, a precursor solution containing an electrolytic solution, a polymer compound, and a solvent such as an organic solvent is prepared. After that, the cathode 33 and the anode 34 are coated with the precursor solution to form the gel electrolyte layer 36. Subsequently, the cathode lead 31 is attached to the cathode current collector 33A and the anode lead 32 is attached to the anode current collector 34A by a welding method or the like. Subsequently, the cathode 33 and the anode 34 provided with the electrolyte layer 36 are layered with the separator 35 in between and are spirally wound to form the spirally wound electrode body 30. After that, the protective tape 37 is adhered to the outermost periphery thereof. Finally, after the spirally wound electrode body 30 is sandwiched between two pieces of film-like outer package members 40, outer edges of the package members 40 are contacted by a thermal fusion bonding method or the like to enclose the spirally wound electrode body 30 into the outer package members 40. In this case, the adhesive films 41 are inserted between the cathode lead 31 and the anode lead 32, and the outer package member 40.

In the second procedure, first, the cathode lead 31 is attached to the cathode 33, and the anode lead 32 is attached to the anode 34. Subsequently, the cathode 33 and the anode 34 are layered with the separator 35 in between and are spirally wound to form a spirally wound body as a precursor of the spirally wound electrode body 30. After that, the protective tape 37 is adhered to the outermost periphery thereof. Subsequently, after the spirally wound body is sandwiched between two pieces of the film-like outer package members 40, the outermost peripheries except for one side are bonded by a thermal fusion bonding method or the like, and the spirally wound body is contained in the pouch-like outer package member 40. Subsequently, a composition for electrolyte containing an electrolytic solution, a monomer as a raw material for the polymer compound, a polymerization initiator, and other materials such as a polymerization inhibitor as needed is prepared, which is injected into the pouch-like outer package member 40. After that, the opening of the outer package member 40 is hermetically sealed by using a thermal fusion bonding method or the like. Finally, the monomer is thermally polymerized to obtain a polymer compound. Thereby, the gel electrolyte layer 36 is formed.

In the third procedure, the spirally wound body is formed and contained in the pouch-like outer package member 40 in a similar manner to that of the foregoing second procedure, except that the separator 35 with both surfaces coated with a polymer compound is used firstly. Examples of the polymer compound with which the separator 35 is coated include a polymer containing vinylidene fluoride as a component (a homopolymer, a copolymer, a multicomponent copolymer, or the like). Specific examples thereof include polyvinylidene fluoride, a binary copolymer containing vinylidene fluoride and hexafluoro propylene as components, and a ternary copolymer containing vinylidene fluoride, hexafluoro propylene, and chlorotrifluoroethylene as a component. It is to be noted that, in addition to the polymer containing vinylidene fluoride as a component, another one type, or two or more types of polymer compounds may be used. Subsequently, an electrolytic solution is prepared and injected into the outer package member 40. After that, the opening of the outer package member 40 is hermetically sealed by a thermal fusion bonding method or the like. Finally, the resultant is heated while a weight is applied to the outer package member 40, and the separator 35 is adhered to the cathode 33 and the anode 34 with the polymer compound in between. Thereby, the polymer compound is impregnated with the electrolytic solution, and accordingly the polymer compound is gelated to form the electrolyte layer 36.

In the third procedure, swollenness of the battery is more suppressed compared to in the first procedure. Further, in the third procedure, the monomer as a raw material of the polymer compound, the solvent, and the like are less likely to be left in the electrolyte layer 36 compared to in the second procedure. Thus, the formation step of the polymer compound is favorably controlled. Therefore, sufficient adhesion characteristics are obtained between the cathode 33, the anode 34, and the separator 35, and the electrolyte layer 36.

According to the lithium ion secondary battery, the electrolyte layer 36 contains the foregoing electrolytic solution. Therefore, cycle characteristics, conservation characteristics, and load characteristics are allowed to be improved by a function similar to that of the cylindrical type secondary battery. Other effects of the lithium ion secondary battery are similar to those of the electrolytic solution.

[2-3. Lithium Metal Secondary Battery (Cylindrical Type and Laminated Film Type)]

A secondary battery hereinafter described is a lithium metal secondary battery in which the anode capacity is expressed by precipitation and dissolution of lithium metal. The secondary battery has a configuration similar to that of the foregoing lithium ion secondary battery (cylindrical type), except that the anode active material layer 22B is formed of lithium metal, and is manufactured by a procedure similar to that of the foregoing lithium ion secondary battery (cylindrical type).

In the secondary battery, lithium metal is used as an anode active material, and thereby a higher energy density is allowed to be obtained. The anode active material layer 22B may exist at the time of assembling, but the anode active material layer 22B does not necessarily exist at the time of assembling and may be formed of lithium metal precipitated at the time of charge. Further, the anode active material layer 22B may be used as a current collector as well, and the anode current collector 22A may be omitted.

In the secondary battery, at the time of charge, for example, lithium ions extracted from the cathode 21 are precipitated as lithium metal on the surface of the anode current collector 22A through the electrolytic solution. Meanwhile, at the time of discharge, for example, lithium metal is eluded as lithium ions from the anode active material layer 22B, and is inserted in the cathode 21 through the electrolytic solution.

The lithium metal secondary battery includes the foregoing electrolytic solution. Therefore, cycle characteristics, conservation characteristics, and load characteristics are allowed to be improved by a function similar to that of the lithium ion secondary battery. Other effects of the lithium metal secondary battery are similar to those of the electrolytic solution. It is to be noted that the foregoing lithium metal secondary battery is not limited to the cylindrical type secondary battery, but may be a laminated film type secondary battery. In this case, a similar effect is allowed to be also obtained.

[3. Applications of Secondary Battery]

Next, a description will be given of application examples of the foregoing secondary battery.

Applications of the secondary battery are not particularly limited as long as the secondary battery is applied to a machine, a device, an instrument, an equipment, a system (collective entity of a plurality of devices and the like), or the like that is allowed to use the secondary battery as a drive power source, an electric power storage source for electric power storage, or the like. In the case where the secondary battery is used as a power source, the secondary battery may be used as a main power source (power source used preferentially), or an auxiliary power source (power source used instead of a main power source or used being switched from the main power source). In the latter case, the main power source type is not limited to the secondary battery.

Examples of applications of the secondary battery are as follows.

Examples of applications of the secondary battery include electronic devices described below. That is, examples thereof include portable electronic devices such as a video camcorder, a digital still camera, a mobile phone, a notebook personal computer, a cordless phone (cordless handset), a headphone stereo (music player), a digital book, an electronic dictionary, a portable radio, a portable television, a headset, a game machine, a navigation system, and a personal digital assistant (PDA). However, the secondary battery is applicable to a non-portable (stationary) unit such as a large-screen television and a stereo system. Further examples of applications of the secondary battery include a lifestyle device such as an electric shaver, a refrigerator, an air conditioner, a water heater, a microwave oven, a dish washer, a washing machine, a drying machine, a toy, and a lighting unit. Further examples of applications of the secondary battery include a storage device such as a backup power source and a memory card. Further examples of applications of the secondary battery include an electric power tool such as an electric drill and an electric saw. Further examples of applications of the secondary battery include a medical device such as a pacemaker and a hearing aid. Further examples of applications of the secondary battery include a power source such as a battery pack. Further examples of applications of the secondary battery include a signaler and a robot.

Further examples of applications of the secondary battery include an electrical vehicle such as an electric automobile (including a hybrid car), a rail vehicle, a golf cart, and an electric cart. In the electrical vehicle, for example, the secondary battery is used as the foregoing main power source, the foregoing auxiliary power source, or the like.

Further examples of applications of the secondary battery include an electric storage device such as a load conditioner that stores electric power in case of emergency or the like. The electric storage device may be an electric power storage source for buildings represented by a dwelling house or for power generating units.

Specially, the secondary battery is effectively applied to the battery pack, the electronic device, the electrical vehicle, or the like. In these applications, since superior characteristics (cycle characteristics, conservation characteristics, load characteristics, and the like) of the secondary battery are demanded, the characteristics are allowed to be effectively improved by using the secondary battery of the present invention. It is to be noted that the battery pack includes, for example, a control means that controls the secondary battery and an outer package that therein contains the secondary battery together with the secondary battery. The electronic device executes various functions by receiving electric power supply from the secondary battery. The electrical vehicle includes a conversion unit that converts electric power supply from the secondary battery to drive power of the vehicle and a control unit that performs information processing for vehicle control based on information of the secondary battery.

EXAMPLES

Specific examples of the present invention will be described in detail.

[1. Examples of First Embodiment]

Examples 1-1 to 1-59

The cylindrical type lithium ion secondary battery illustrated in FIG. 1 and FIG. 2 was fabricated by the following procedure.

First, the cathode 21 was formed. In this case, first, lithium carbonate ($Li_2CO_3$) and cobalt carbonate ($CoCO_2$) were mixed at a molar ratio of 0.5:1. After that, the mixture was fired in the air at 900 deg C for 5 hours. Thereby, lithium-cobalt composite oxide ($LiCoO_2$) was obtained. Subsequently, 91 parts by mass of $LiCoO_2$ as a cathode active material, 6 parts by mass of graphite as a cathode electrical conductor, and 3 parts by mass of polyvinylidene fluoride as a cathode binder were mixed to obtain a cathode mixture. Subsequently, the cathode mixture was dispersed in N-methyl-2-pyrrolidone to obtain a paste cathode mixture slurry. Subsequently, both surfaces of the cathode current collector 21A were coated with the cathode mixture slurry by a coating device, which was dried to form the cathode active material layer 21B. As the cathode current collector 21A, a strip-shaped aluminum foil (thickness: 20 μm) was used. Finally, the cathode active material layer 21B was compression-molded by a roll pressing machine.

Next, the anode 22 was formed. In this case, first, 90 parts by mass of the carbon material (artificial graphite) as an anode active material and 10 parts by mass of polyvinylidene fluoride as an anode binder were mixed to obtain an anode mixture. Subsequently, the anode mixture was dispersed in N-methyl-2-pyrrolidone to obtain a paste anode mixture slurry. Subsequently, both surfaces of the anode current collector 22A were coated with the anode mixture slurry by a coating device, which was dried to form the anode active material layer 22B. As the anode current collector 22A, a strip-shaped electrolytic copper foil (thickness: 15 μm) was used. Finally, the anode active material layer 22B was compression-molded by a roll pressing machine.

Next, an electrolyte salt and other materials were added to a nonaqueous solvent, and electrolytic solutions were prepared so that compositions illustrated in Table 1 to Table 4 were obtained. In this case, ethylene carbonate (EC) and dimethyl carbonate (DMC) were used as the nonaqueous solvent. The mixture ratio (weight ratio) of EC and DMC was 50:50. As the electrolyte salt, lithium hexafluorophosphate ($LiPF_6$) was used, and the content thereof was 1 mol/kg with respect to the solvent. Types and contents of other materials were as illustrated in Table 1 to Table 4.

Finally, the secondary battery was assembled by using the cathode 21, the anode 22, and the electrolytic solution. In this case, first, the cathode lead 25 was welded to the cathode current collector 21A, and the anode lead 26 was welded to the anode current collector 22A. Subsequently, the cathode 21 and the anode 22 were layered with the separator 23 in between and were spirally wound to form the spirally wound electrode body 20. After that, the center pin 24 was inserted in the center of the spirally wound electrode body. As the separator 23, a microporous polypropylene film (thickness: 25 μm) was used. Subsequently, while the spirally wound electrode body 20 was sandwiched between the pair of insulating plates 12 and 13, the spirally wound electrode body 20 was contained in the iron battery can 11 plated with nickel. At this time, the cathode lead 25 was welded to the safety valve mechanism 15, and the anode lead 26 was welded to the battery can 11. Subsequently, the electrolytic solution was injected into the battery can 11 by a depressurization method, and the separator 23 was impregnated with the electrolytic solution. Finally, at the open end of the battery can 11, the battery cover 14, the safety valve mechanism 15, and the PTC device 16 were fixed by being swaged with the gasket 17. The cylindrical type secondary battery was thereby completed. In forming the secondary battery, lithium metal was prevented from being precipitated on the anode 22 at the time of full charge by adjusting the thickness of the cathode active material layer 21B.

Cycle characteristics, conservation characteristics, and load characteristics for the secondary batteries were examined. Results illustrated in Table 1 to Table 4 were obtained.

In examining the cycle characteristics, first, two cycles of charge and discharge were performed in the atmosphere at 23 deg C, and the discharge capacity was measured. Subsequently, the secondary battery was charged and discharged repeatedly in the same atmosphere until the total number of cycles became 100 cycles, and thereby the discharge capacity was measured. Finally, cycle retention ratio (%)=(discharge capacity at the 100th cycle/discharge capacity at the second cycle)*100 was calculated. At the time of charge, constant current and constant voltage charge was performed at a current of 0.2 C until the voltage reached the upper limit voltage of 4.2 V. At the time of discharge, constant current discharge was performed at a current of 0.2 C until the voltage reached the final voltage of 2.5 V. "0.2 C" is a current value at which the theoretical capacity is completely discharged in 5 hours.

In examining the conservation characteristics, first, 2 cycles of charge and discharge were performed in the atmosphere at 23 deg C, and the discharge capacity was measured. Subsequently, after the battery was stored in a constant temperature bath at 80 deg C for 10 days in a state of being charged again, discharge was performed in the atmosphere at 23 deg C, and the discharge capacity was measured. Finally, conservation retention ratio (%)=(discharge capacity after storage/discharge capacity before storage)*100 was calculated. Charge and discharge conditions were similar to those in the case of examining the cycle characteristics.

In examining the load characteristics, after 1 cycle of charge and discharge was performed in the atmosphere at 23 deg C, charge was performed again and the charge capacity was measured. Subsequently, discharge was performed in the same atmosphere to measure the discharge capacity. Finally, load retention ratio (%)=(charge capacity at the second cycle/discharge capacity at the second cycle)*100 was calculated. Charge and discharge conditions were similar to those in the case of examining the cycle characteristics, except for changing the current to 3C. "3C" is a current value at which the theoretical capacity is completely discharged in ⅓ hour.

TABLE 1

Anode active material: artificial graphite

| | Nonaqueous solvent | Electrolyte salt | Type | Content (wt %) | Others Type | Content (wt %) | Cycle retention ratio (%) | Conservation retention ratio (%) | Load retention ratio (%) |
|---|---|---|---|---|---|---|---|---|---|
| Example 1-1 | EC + DMC | $LiPF_6$ | $LiPF_3(C_2F_5)_3$ | 0.1 | $LiPF_2O_2$ | 0.001 | 80 | 88 | 88 |
| Example 1-2 | | | | | | 0.1 | 82 | 89 | 90 |
| Example 1-3 | | | | | | 0.2 | 85 | 92 | 92 |
| Example 1-4 | | | | | | 1 | 82 | 88 | 92 |
| Example 1-5 | | | | | | 2 | 80 | 88 | 90 |
| Example 1-6 | EC + DMC | $LiPF_6$ | $LiPF_3(C_2F_5)_3$ | 0.01 | $LiPF_2O_2$ | 0.2 | 79 | 86 | 88 |
| Example 1-7 | | | | 0.05 | | | 82 | 87 | 90 |
| Example 1-8 | | | | 0.2 | | | 84 | 88 | 92 |
| Example 1-9 | | | | 0.5 | | | 82 | 86 | 88 |
| Example 1-10 | EC + DMC | $LiPF_6$ | $LiPF_3(C_2F_5)_3$ | 0.1 | (1-1) | 0.2 | 84 | 88 | 92 |
| Example 1-11 | | | | | (2-1) | | 83 | 87 | 92 |
| Example 1-12 | | | | | (3-1) | | 86 | 90 | 94 |
| Example 1-13 | | | | | $Li_2PFO_3$ | | 84 | 88 | 92 |
| Example 1-14 | | | | | $LiPF_2O_2$ + (1-1) | 0.2 + 0.2 | 87 | 91 | 92 |
| Example 1-15 | EC + DMC | $LiPF_6$ | $LiPF_4(C_2F_5)_2$ | 0.1 | (1-1) | 0.2 | 84 | 90 | 91 |
| Example 1-16 | | | | | (2-1) | | 84 | 88 | 90 |
| Example 1-17 | | | | | (3-1) | | 85 | 91 | 92 |
| Example 1-18 | | | | | $Li_2PFO_3$ | | 85 | 89 | 91 |

TABLE 2

Anode active material: artificial graphite

| | Nonaqueous solvent | Electrolyte salt | Type | Content (wt %) | Others Type | Content (wt %) | Cycle retention ratio (%) | Conservation retention ratio (%) | Load retention ratio (%) |
|---|---|---|---|---|---|---|---|---|---|
| Example 1-19 | EC + DMC | $LiPF_6$ | $LiBF_3(CF_3)$ | 0.1 | $LiPF_2O_2$ | 0.001 | 81 | 86 | 89 |
| Example 1-20 | | | | | | 0.1 | 81 | 87 | 90 |
| Example 1-21 | | | | | | 0.2 | 84 | 88 | 92 |
| Example 1-22 | | | | | | 1 | 82 | 86 | 92 |
| Example 1-23 | | | | | | 2 | 82 | 86 | 89 |
| Example 1-24 | EC + DMC | $LiPF_6$ | $LiBF_3(CF_3)$ | 0.01 | $LiPF_2O_2$ | 0.2 | 80 | 84 | 89 |
| Example 1-25 | | | | 0.05 | | | 81 | 85 | 90 |
| Example 1-26 | | | | 0.2 | | | 81 | 86 | 92 |
| Example 1-27 | | | | 0.5 | | | 80 | 85 | 89 |
| Example 1-28 | EC + DMC | $LiPF_6$ | $LiBF_3(CF_3)$ | 0.1 | (1-1) | 0.2 | 83 | 87 | 93 |

TABLE 2-continued

Anode active material: artificial graphite

| | Nonaqueous solvent | Electrolyte salt | Type | Content (wt %) | Others Type | Content (wt %) | Cycle retention ratio (%) | Conservation retention ratio (%) | Load retention ratio (%) |
|---|---|---|---|---|---|---|---|---|---|
| Example 1-29 | | | | | (2-1) | | 83 | 86 | 92 |
| Example 1-30 | | | | | (3-1) | | 85 | 89 | 94 |
| Example 1-31 | | | | | Li$_2$PFO$_3$ | | 84 | 87 | 90 |
| Example 1-32 | | | | | LiPF$_2$O$_2$ + (1-1) | 0.2 + 0.2 | 86 | 89 | 90 |
| Example 1-33 | EC + DMC | LiPF$_6$ | LiBF$_3$(C$_2$F$_5$) | 0.1 | (1-1) | 0.2 | 84 | 88 | 91 |
| Example 1-34 | | | | | (2-1) | | 84 | 86 | 90 |
| Example 1-35 | | | | | (3-1) | | 85 | 90 | 92 |
| Example 1-36 | | | | | Li$_2$PFO$_3$ | | 84 | 88 | 91 |

TABLE 3

Anode active material: artificial graphite

| | Nonaqueous solvent | Electrolyte salt | Type | Content (wt %) | Others Type | Content (wt %) | Cycle retention ratio (%) | Conservation retention ratio (%) | Load retention ratio (%) |
|---|---|---|---|---|---|---|---|---|---|
| Example 1-37 | EC + DMC | LiPF$_6$ | LiN(SO$_2$F)$_2$ | 0.1 | LiPF$_2$O$_2$ | 0.001 | 84 | 89 | 90 |
| Example 1-38 | | | | | | 0.1 | 86 | 89 | 91 |
| Example 1-39 | | | | | | 0.2 | 88 | 90 | 94 |
| Example 1-40 | | | | | | 1 | 87 | 89 | 94 |
| Example 1-41 | | | | | | 2 | 87 | 88 | 91 |
| Example 1-42 | EC + DMC | LiPF$_6$ | LiN(SO$_2$F)$_2$ | 0.01 | LiPF$_2$O$_2$ | 0.1 | 79 | 86 | 90 |
| Example 1-43 | | | | 0.05 | | | 84 | 88 | 91 |
| Example 1-44 | | | | 0.2 | | | 85 | 90 | 93 |
| Example 1-45 | | | | 0.5 | | | 84 | 88 | 90 |
| Example 1-46 | EC + DMC | LiPF$_6$ | LiN(SO$_2$F)$_2$ | 0.1 | (1-1) | 0.2 | 84 | 88 | 92 |
| Example 1-47 | | | | | (2-1) | | 84 | 87 | 92 |
| Example 1-48 | | | | | (3-1) | | 86 | 90 | 94 |
| Example 1-49 | | | | | Li$_2$PFO$_3$ | | 86 | 90 | 92 |
| Example 1-50 | | | | | LiPF$_2$O$_2$ + (1-1) | 0.2 + 0.2 | 90 | 91 | 92 |

TABLE 4

Anode active material: artificial graphite

| | Nonaqueous solvent | Electrolyte salt | Type | Content (wt %) | Type | Content (wt %) | Cycle retention ratio (%) | Conservation retention ratio (%) | Load retention ratio (%) |
|---|---|---|---|---|---|---|---|---|---|
| Example 1-51 | EC + DMC | $LiPF_6$ | — | — | — | — | 75 | 81 | 85 |
| Example 1-52 | EC + DMC | $LiPF_6$ | — | — | $LiPF_2O_2$ | 0.2 | 78 | 82 | 85 |
| Example 1-53 | | | | | (1-1) | | 77 | 82 | 84 |
| Example 1-54 | | | | | (2-1) | | 76 | 82 | 83 |
| Example 1-55 | | | | | (3-1) | | 78 | 83 | 85 |
| Example 1-56 | | | | | $Li_2PFO_3$ | | 77 | 82 | 85 |
| Example 1-57 | EC + DMC | $LiPF_6$ | $LiPF_3(C_2F_5)_3$ | 0.1 | — | — | 78 | 82 | 85 |
| Example 1-58 | | | $LiBF_3(CF_3)$ | | | | 77 | 82 | 85 |
| Example 1-59 | | | $LiN(SO_2F)_2$ | | | | 80 | 84 | 85 |

In the case where combination of $LiPF_3(C_2F_5)_3$ or the like and $LiPF_2O_2$ or the like was used, a higher cycle retention ratio, a higher conservation retention ratio, and a higher load retention ratio were obtained compared to the case that none thereof was used or the case that only either thereof was used.

More specifically, in the case where only either of $LiPF_3(C_2F_5)_3$ or the like and $LiPF_2O_2$ or the like was used, the cycle retention ratio and the conservation retention ratio were higher than those of the case that none thereof was used, while the load retention ratio was equal to or less than that of the case that none thereof was used. Meanwhile, in the case where combination of $LiPF_3(C_2F_5)_3$ or the like and $LiPF_2O_2$ or the like was used, the cycle retention ratio and the conservation retention ratio were significantly higher than those of the case that none thereof was used and those of the case that either thereof was used, and the load retention ratio was increased.

In particular, in the case where combination of $LiPF_3(C_2F_5)_3$ or the like and $LiPF_2O_2$ or the like was used, if the content of $LiPF_3(C_2F_5)_3$ or the like was from 0.01 wt % to 0.5 wt % both inclusive, or the content of $LiPF_2O_2$ or the like was from 0.001 wt % to 2 wt % both inclusive, favorable results were obtained.

Examples 2-1 to 2-39

Secondary batteries were fabricated by a procedure similar to that of Examples 1-3, 1-21, 1-39, and 1-51 except that the composition of the nonaqueous solvent was changed as illustrated in Table 5 to Table 8, and the respective characteristics were examined. In this case, the following nonaqueous solvents were used. That is, diethyl carbonate (DEC), ethylmethyl carbonate (EMC), or propylene carbonate (PC) was used. Further, vinylene carbonate (VC), bis(fluoromethyl)carbonate (DFDMC), 4-fluoro-1,3-dioxolane-2-one (FEC), or trans-4,5-difluoro-1,3-dioxolane-2-one (TDFEC), or cis-4,5-difluoro-1,3-dioxolane-2-one (CDFEC) was used. Further, propene sultone (PRS), succinic anhydride (SCAH), or sulfopropionic anhydride (SPAH) was used. The content of VC in the nonaqueous solvent was 2 wt %, and the contents of DFDMC, FEC, TDFEC, and CDFEC in the nonaqueous solvent were 5 wt %. In the case where FEC and VC or the like were mixed, the content of FEC in the nonaqueous solvent was 5 wt %, and the content of VC or the like in the nonaqueous solvent was 1 wt %.

TABLE 5

Anode active material: artificial graphite

| | Nonaqueous solvent | Electrolyte salt | Type | Content (wt %) | Type | Content (wt %) | Cycle retention ratio (%) | Conservation retention ratio (%) |
|---|---|---|---|---|---|---|---|---|
| Example 2-1 | EC + DEC | $LiPF_6$ | $LiPF_3(C_2F_5)_3$ | 0.1 | $LiPF_2O_2$ | 0.2 | 82 | 92 |
| Example 2-2 | EC + EMC | | | | | | 84 | 91 |
| Example 2-3 | EC + PC + DMC | | | | | | 85 | 91 |
| Example 2-4 | EC + DMC  VC | | | | | | 90 | 92 |
| Example 2-5 | DFDMC | | | | | | 87 | 88 |

TABLE 5-continued

Anode active material: artificial graphite

| | Nonaqueous solvent | Electrolyte salt | Others Type | Content (wt %) | Type | Content (wt %) | Cycle retention ratio (%) | Conservation retention ratio (%) |
|---|---|---|---|---|---|---|---|---|
| Example 2-6 | FEC | | | | | | 88 | 91 |
| Example 2-7 | TDFEC | | | | | | 88 | 90 |
| Example 2-8 | CDFEC | | | | | | 88 | 90 |
| Example 2-9 | FEC + VC | | | | | | 90 | 94 |
| Example 2-10 | FEC + PRS | | | | | | 91 | 94 |
| Example 2-11 | FEC + SCAH | | | | | | 91 | 93 |
| Example 2-12 | FEC + PSAH | | | | | | 93 | 94 |

TABLE 6

Anode active material: artificial graphite

| | Nonaqueous solvent | Electrolyte salt | Others Type | Content (wt %) | Type | Content (wt %) | Cycle retention ratio (%) | Conservation retention ratio (%) |
|---|---|---|---|---|---|---|---|---|
| Example 2-13 | EC + DEC | LiPF$_6$ | LiBF$_3$(CF$_3$) | 0.1 | LiPF$_2$O$_2$ | 0.2 | 80 | 89 |
| Example 2-14 | EC + EMC | | | | | | 82 | 88 |
| Example 2-15 | EC + PC + DMC | | | | | | 85 | 90 |
| Example 2-16 | EC + DMC | | VC | | | | 88 | 91 |
| Example 2-17 | DFDMC | | | | | | 85 | 86 |
| Example 2-18 | FEC | | | | | | 88 | 89 |
| Example 2-19 | TDFEC | | | | | | 87 | 88 |
| Example 2-20 | CDFEC | | | | | | 87 | 88 |
| Example 2-21 | FEC + VC | | | | | | 90 | 92 |
| Example 2-22 | FEC + PRS | | | | | | 91 | 94 |
| Example 2-23 | FEC + SCAH | | | | | | 91 | 92 |
| Example 2-24 | FEC + PSAH | | | | | | 93 | 94 |

TABLE 7

Anode active material: artificial graphite

| | Nonaqueous solvent | Electrolyte salt | Others Type | Content (wt %) | Type | Content (wt %) | Cycle retention ratio (%) | Conservation retention ratio (%) |
|---|---|---|---|---|---|---|---|---|
| Example 2-25 | EC + DEC | LiPF$_6$ | LiN(SO$_2$F)$_2$ | 0.1 | LiPF$_2$O$_2$ | 0.2 | 84 | 90 |
| Example 2-26 | EC + EMC | | | | | | 85 | 90 |
| Example 2-27 | EC + PC + DMC | | | | | | 86 | 90 |

TABLE 7-continued

Anode active material: artificial graphite

| | Nonaqueous solvent | Electrolyte salt | Others Type | Content (wt %) | Type | Content (wt %) | Cycle retention ratio (%) | Conservation retention ratio (%) |
|---|---|---|---|---|---|---|---|---|
| Example 2-28 | EC + DMC | VC | | | | | 90 | 92 |
| Example 2-29 | | DFDMC | | | | | 89 | 88 |
| Example 2-30 | | FEC | | | | | 90 | 92 |
| Example 2-31 | | TDFEC | | | | | 89 | 91 |
| Example 2-32 | | CDFEC | | | | | 89 | 91 |
| Example 2-33 | | FEC + VC | | | | | 92 | 94 |
| Example 2-34 | | FEC + PRS | | | | | 92 | 94 |
| Example 2-35 | | FEC + SCAH | | | | | 93 | 94 |
| Example 2-36 | | FEC + PSAH | | | | | 93 | 94 |

TABLE 8

Anode active material: artificial graphite

| | Nonaqueous solvent | Electrolyte salt | Others Type | Content (wt %) | Type | Content (wt %) | Cycle retention ratio (%) | Conservation retention ratio (%) |
|---|---|---|---|---|---|---|---|---|
| Example 2-37 | EC + DMC | VC | LiPF$_6$ | — | — | — | 82 | 83 |
| Example 2-38 | | FEC | | | | | 80 | 84 |
| Example 2-39 | | TDFEC | | | | | 80 | 84 |

In the case where the composition of the nonaqueous solvent was changed, a high cycle retention ratio and a high conservation retention ratio were obtained as in Table 1 to Table 4.

Examples 3-1 to 3-3

Secondary batteries were fabricated by a procedure similar to that of Example 1-3 except that the composition of the electrolyte salt was changed as illustrated in Table 9, and the respective characteristics were examined. In this case, as an electrolyte salt, lithium tetrafluoroborate (LiBF$_4$), (4,4,4-trifluorobutyrate oxalato) lithium borate (LiTFOB) shown in Formula (25-8), or bis(trifluoromethanesulfonyl)imide lithium (LiN(CF$_3$SO$_2$)$_2$: LiTFSI) was used. The content of LiPF$_6$ was 0.9 mol/kg with respect to the nonaqueous solvent, and the content of LiBF$_4$ or the like was 0.1 mol/kg with respect to the nonaqueous solvent.

TABLE 9

Anode active material: artificial graphite

| | Nonaqueous solvent | Electrolyte salt | | Others Type | Content (wt %) | Type | Content (wt %) | Cycle retention ratio (%) | Conservation retention ratio (%) |
|---|---|---|---|---|---|---|---|---|---|
| Example 3-1 | EC + DMC | LiPF$_6$ | LiBF$_4$ | LiPF$_3$(C$_2$F$_5$)$_3$ | 0.1 | LiPF$_2$O$_2$ | 0.2 | 87 | 95 |
| Example 3-2 | | | LiTFOB | | | | | 88 | 94 |
| Example 3-3 | | | LiTFSI | | | | | 88 | 94 |

In the case where the composition of the electrolyte salt was changed, a high cycle retention ratio and a high conservation retention ratio were obtained as in Table 1 to Table 4.

Examples 4-1 to 4-59

Secondary batteries were fabricated by a procedure similar to that of Examples 1-1 to 1-59 except that silicon was used as an anode active material, and the composition of the nonaqueous solvent was changed as illustrated in Table 10 to Table 13, and the respective characteristics were examined. In forming the anode 22, silicon was deposited on the surface of the anode current collector 22A by an evaporation method (electron beam evaporation method), and thereby the anode active material layer 22B was formed. In this case, 10 times of deposition steps were repeated to obtain the total thickness of the anode active material layer 22B of 6 μm.

TABLE 10

| | | | Anode active material: silicon | | | | | | |
|---|---|---|---|---|---|---|---|---|---|
| | | | | Others | | | Cycle retention ratio (%) | Conservation retention ratio (%) | Load retention ratio (%) |
| | Nonaqueous solvent | Electrolyte salt | Type | Content (wt %) | Type | Content (wt %) | | | |
| Example 4-1 | EC + DEC | LiPF$_6$ | LiPF$_3$(C$_2$F$_5$)$_3$ | 0.1 | LiPF$_2$O$_2$ | 0.001 | 53 | 88 | 90 |
| Example 4-2 | | | | | | 0.1 | 53 | 89 | 92 |
| Example 4-3 | | | | | | 0.2 | 53 | 90 | 93 |
| Example 4-4 | | | | | | 1 | 52 | 88 | 92 |
| Example 4-5 | | | | | | 2 | 52 | 88 | 90 |
| Example 4-6 | EC + DEC | LiPF$_6$ | LiPF$_3$(C$_2$F$_5$)$_3$ | 0.01 | LiPF$_2$O$_2$ | 0.2 | 51 | 86 | 89 |
| Example 4-7 | | | | 0.05 | | | 52 | 87 | 91 |
| Example 4-8 | | | | 0.2 | | | 52 | 88 | 93 |
| Example 4-9 | | | | 0.5 | | | 52 | 86 | 90 |
| Example 4-10 | EC + DEC | LiPF$_6$ | LiPF$_3$(C$_2$F$_5$)$_3$ | 0.1 | (1-1) | 0.2 | 54 | 87 | 93 |
| Example 4-11 | | | | | (2-1) | | 57 | 88 | 92 |
| Example 4-12 | | | | | (3-1) | | 56 | 90 | 94 |
| Example 4-13 | | | | | Li$_2$PFO$_3$ | | 52 | 89 | 92 |
| Example 4-14 | | | | | LiPF$_2$O$_2$ + (1-1) | 0.2 + 0.2 | 57 | 91 | 92 |
| Example 4-15 | EC + DEC | LiPF$_6$ | LiPF$_4$(C$_2$F$_5$)$_2$ | 0.1 | (1-1) | 0.2 | 54 | 88 | 91 |
| Example 4-16 | | | | | (2-1) | | 56 | 90 | 90 |
| Example 4-17 | | | | | (3-1) | | 55 | 92 | 93 |
| Example 4-18 | | | | | Li$_2$PFO$_3$ | | 53 | 89 | 92 |

TABLE 11

| | | | Anode active material: silicon | | | | | | |
|---|---|---|---|---|---|---|---|---|---|
| | | | | Others | | | Cycle retention ratio (%) | Conservation retention ratio (%) | Load retention ratio (%) |
| | Nonaqueous solvent | Electrolyte salt | Type | Content (wt %) | Type | Content (wt %) | | | |
| Example 4-19 | EC + DEC | LiPF$_6$ | LiBF$_3$(CF$_3$) | 0.1 | LiPF$_2$O$_2$ | 0.001 | 51 | 86 | 90 |
| Example 4-20 | | | | | | 0.1 | 51 | 87 | 92 |
| Example 4-21 | | | | | | 0.2 | 54 | 88 | 93 |
| Example 4-22 | | | | | | 1 | 52 | 86 | 92 |
| Example 4-23 | | | | | | 2 | 52 | 86 | 90 |
| Example 4-24 | EC + DEC | LiPF$_6$ | LiBF$_3$(CF$_3$) | 0.01 | LiPF$_2$O$_2$ | 0.2 | 50 | 84 | 90 |

TABLE 11-continued

| | Anode active material: silicon | | | | | | Cycle retention ratio (%) | Conservation retention ratio (%) | Load retention ratio (%) |
|---|---|---|---|---|---|---|---|---|---|
| | Nonaqueous solvent | Electrolyte salt | Type | Content (wt %) | Type | Content (wt %) | | | |
| Example 4-25 | | | | 0.05 | | | 51 | 85 | 90 |
| Example 4-26 | | | | 0.2 | | | 51 | 86 | 92 |
| Example 4-27 | | | | 0.5 | | | 50 | 85 | 90 |
| Example 4-28 | EC + DEC | LiPF$_6$ | LiBF$_3$(CF$_3$) | 0.1 | (1-1) | 0.2 | 53 | 87 | 94 |
| Example 4-29 | | | | | (2-1) | | 53 | 87 | 92 |
| Example 4-30 | | | | | (3-1) | | 55 | 89 | 95 |
| Example 4-31 | | | | | Li$_2$PFO$_3$ | | 54 | 86 | 92 |
| Example 4-32 | | | | | LiPF$_2$O$_2$ + (1-1) | 0.2 + 0.2 | 56 | 89 | 92 |
| Example 4-33 | EC + DEC | LiPF$_6$ | LiBF$_3$(C$_2$F$_5$) | 0.1 | (1-1) | 0.2 | 53 | 88 | 92 |
| Example 4-34 | | | | | (2-1) | | 53 | 86 | 91 |
| Example 4-35 | | | | | (3-1) | | 54 | 90 | 94 |
| Example 4-36 | | | | | Li$_2$PFO$_3$ | | 54 | 88 | 91 |

TABLE 12

| | Anode active material: silicon | | | | | | Cycle retention ratio (%) | Conservation retention ratio (%) | Load retention ratio (%) |
|---|---|---|---|---|---|---|---|---|---|
| | Nonaqueous solvent | Electrolyte salt | Type | Content (wt %) | Type | Content (wt %) | | | |
| Example 4-37 | EC + DEC | LiPF$_6$ | LiN(SO$_2$F)$_2$ | 0.1 | LiPF$_2$O$_2$ | 0.001 | 54 | 87 | 92 |
| Example 4-38 | | | | | | 0.1 | 56 | 89 | 93 |
| Example 4-39 | | | | | | 0.2 | 58 | 90 | 95 |
| Example 4-40 | | | | | | 1 | 57 | 89 | 95 |
| Example 4-41 | | | | | | 2 | 57 | 88 | 93 |
| Example 4-42 | EC + DEC | LiPF$_6$ | LiN(SO$_2$F)$_2$ | 0.01 | LiPF$_2$O$_2$ | 0.1 | 59 | 86 | 92 |
| Example 4-43 | | | | 0.05 | | | 54 | 88 | 91 |
| Example 4-44 | | | | 0.2 | | | 55 | 91 | 92 |
| Example 4-45 | | | | 0.5 | | | 54 | 89 | 91 |
| Example 4-46 | EC + DEC | LiPF$_6$ | LiN(SO$_2$F)$_2$ | 0.1 | (1-1) | 0.2 | 54 | 88 | 93 |
| Example 4-47 | | | | | (2-1) | | 54 | 87 | 93 |
| Example 4-48 | | | | | (3-1) | | 56 | 90 | 95 |
| Example 4-49 | | | | | Li$_2$PFO$_3$ | | 56 | 90 | 94 |
| Example 4-50 | | | | | LiPF$_2$O$_2$ + (1-1) | 0.2 + 0.2 | 60 | 91 | 94 |

TABLE 13

Anode active material: silicon

| | Nonaqueous solvent | Electrolyte salt | Others Type | Content (wt %) | Type | Content (wt %) | Cycle retention ratio (%) | Conservation retention ratio (%) | Load retention ratio (%) |
|---|---|---|---|---|---|---|---|---|---|
| Example 4-51 | EC + DEC | LiPF$_6$ | — | — | — | — | 40 | 80 | 87 |
| Example 4-52 | EC + DEC | LiPF$_6$ | — | — | LiPF$_2$O$_2$ | 0.2 | 41 | 82 | 87 |
| Example 4-53 | | | | | (1-1) | | 41 | 84 | 85 |
| Example 4-54 | | | | | (2-1) | | 42 | 82 | 85 |
| Example 4-55 | | | | | (3-1) | | 42 | 84 | 87 |
| Example 4-56 | | | | | Li$_2$PFO$_3$ | | 40 | 80 | 87 |
| Example 4-57 | EC + DEC | LiPF$_6$ | LiPF$_3$(C$_2$F$_5$)$_3$ | 0.1 | — | — | 42 | 85 | 87 |
| Example 4-58 | | | LiBF$_3$(CF$_3$) | | | | 42 | 84 | 87 |
| Example 4-59 | | | LiN(SO$_2$F)$_2$ | | | | 44 | 86 | 87 |

In the case where silicon was used as an anode active material, results similar to those in the case of using the carbon material (Table 1 to Table 4) were obtained. That is, a high cycle retention ratio, a high conservation retention ratio, and a high load retention ratio were obtained.

Examples 5-1 to 5-39

Secondary batteries were fabricated by a procedure similar to that of Examples 2-1 to 2-39 except that the composition of the nonaqueous solvent was changed as illustrated in Table 14 to Table 17, and the respective characteristics were examined.

TABLE 14

Anode active material: silicon

| | Nonaqueous solvent | Electrolyte salt | Others Type | Content (wt %) | Type | Content (wt %) | Cycle retention ratio (%) | Conservation retention ratio (%) |
|---|---|---|---|---|---|---|---|---|
| Example 5-1 | EC + DMC | LiPF$_6$ | LiPF$_3$(C$_2$F$_5$)$_3$ | 0.1 | LiPF$_2$O$_2$ | 0.2 | 55 | 88 |
| Example 5-2 | EC + EMC | | | | | | 54 | 90 |
| Example 5-3 | EC + PC + DMC | | | | | | 56 | 90 |
| Example 5-4 | EC + DEC + VC | | | | | | 69 | 92 |
| Example 5-5 | DFDMC | | | | | | 77 | 88 |
| Example 5-6 | FEC | | | | | | 68 | 90 |
| Example 5-7 | TDFEC | | | | | | 81 | 90 |
| Example 5-8 | CDFEC | | | | | | 81 | 90 |
| Example 5-9 | FEC + VC | | | | | | 78 | 94 |
| Example 5-10 | FEC + PRS | | | | | | 71 | 94 |
| Example 5-11 | FEC + SCAH | | | | | | 72 | 93 |
| Example 5-12 | FEC + PSAH | | | | | | 75 | 94 |

TABLE 15

| | Nonaqueous solvent | Electrolyte salt | Others Type | Content (wt %) | Type | Content (wt %) | Cycle retention ratio (%) | Conservation retention ratio (%) |
|---|---|---|---|---|---|---|---|---|
| | | | Anode active material: silicon | | | | | |
| Example 5-13 | EC + DMC | LiPF$_6$ | LiBF$_3$(CF$_3$) | 0.1 | LiPF$_2$O$_2$ | 0.2 | 50 | 89 |
| Example 5-14 | EC + EMC | | | | | | 52 | 88 |
| Example 5-15 | EC + PC + DMC | | | | | | 55 | 90 |
| Example 5-16 | EC + DEC    VC | | | | | | 74 | 91 |
| Example 5-17 | DFDMC | | | | | | 70 | 86 |
| Example 5-18 | FEC | | | | | | 66 | 89 |
| Example 5-19 | TDFEC | | | | | | 78 | 88 |
| Example 5-20 | CDFEC | | | | | | 78 | 88 |
| Example 5-21 | FEC + VC | | | | | | 79 | 92 |
| Example 5-22 | FEC + PRS | | | | | | 71 | 94 |
| Example 5-23 | FEC + SCAH | | | | | | 71 | 92 |
| Example 5-24 | FEC + PSAH | | | | | | 75 | 94 |

TABLE 16

| | Nonaqueous solvent | Electrolyte salt | Others Type | Content (wt %) | Type | Content (wt %) | Cycle retention ratio (%) | Conservation retention ratio (%) |
|---|---|---|---|---|---|---|---|---|
| | | | Anode active material: silicon | | | | | |
| Example 5-25 | EC + DMC | LiPF$_6$ | LiN(SO$_2$F)$_2$ | 0.1 | LiPF$_2$O$_2$ | 0.2 | 54 | 90 |
| Example 5-26 | EC + EMC | | | | | | 55 | 90 |
| Example 5-27 | EC + PC + DMC | | | | | | 56 | 90 |
| Example 5-28 | EC + DEC    VC | | | | | | 68 | 92 |
| Example 5-29 | DFDMC | | | | | | 79 | 88 |
| Example 5-30 | FEC | | | | | | 70 | 92 |
| Example 5-31 | TDFEC | | | | | | 79 | 91 |
| Example 5-32 | CDFEC | | | | | | 79 | 91 |
| Example 5-33 | FEC + VC | | | | | | 76 | 94 |
| Example 5-34 | FEC + PRS | | | | | | 72 | 94 |
| Example 5-35 | FEC + SCAH | | | | | | 72 | 93 |
| Example 5-36 | FEC + PSAH | | | | | | 74 | 94 |

TABLE 17

| | | | | Others | | | Cycle retention ratio (%) | Conservation retention ratio (%) |
|---|---|---|---|---|---|---|---|---|
| | Nonaqueous solvent | | Electrolyte salt | Type | Content (wt %) | Type | Content (wt %) | |

Anode active material: silicon

| | Nonaqueous solvent | Electrolyte salt | Type | Content (wt %) | Type | Content (wt %) | Cycle retention ratio (%) | Conservation retention ratio (%) |
|---|---|---|---|---|---|---|---|---|
| Example 5-37 | EC + DEC VC | LiPF$_6$ | — | — | — | — | 65 | 82 |
| Example 5-38 | FEC | | | | | | 66 | 81 |
| Example 5-39 | TDFEC | | | | | | 74 | 81 |

In the case where silicon was used as an anode active material, results similar to those in the case of using the carbon material (Table 5 to Table 8) were obtained. That is, a high cycle retention ratio and a high conservation retention ratio were obtained.

Examples 6-1 to 6-3

Secondary batteries were fabricated by a procedure similar to that of Examples 3-1 to 3-3 except that the composition of the electrolyte salt was changed as illustrated in Table 18, and the respective characteristics were examined.

TABLE 18

Anode active material: silicon

| | Nonaqueous solvent | Electrolyte salt | | Type | Content (wt %) | Type | Content (wt %) | Cycle retention ratio (%) | Conservation retention ratio (%) |
|---|---|---|---|---|---|---|---|---|---|
| Example 6-1 | EC + DEC | LiPF$_6$ | LiBF$_4$ | LiPF$_3$(C$_2$F$_5$)$_3$ | 0.1 | LiPF$_2$O$_2$ | 0.2 | 55 | 92 |
| Example 6-2 | | | LiTFOB | | | | | 58 | 92 |
| Example 6-3 | | | LiTFSI | | | | | 56 | 93 |

In the case where silicon was used as an anode active material, results similar to those in the case of using the carbon material (Table 9) were obtained. That is, a high cycle retention ratio and a high conservation retention ratio were obtained.

Examples 7-1 to 7-24

Secondary batteries were fabricated by a procedure similar to that of Examples 4-1 to 4-59 except that the SnCoC-containing material was used as an anode active material as illustrated in Table 19 and Table 20, and the respective characteristics were examined.

In forming the anode 22, first, cobalt powder and tin powder were alloyed to obtain cobalt tin alloy powder. After that, carbon powder was added to the resultant and the resultant was dry-mixed. Subsequently, 10 g of the foregoing mixture and about 400 g of a corundum being 9 mm in diameter were set in a reaction container of a planetary ball mill available from Ito Seisakusho Co. Subsequently, inside of the reaction container was substituted by argon atmosphere. After that, 10 minute operation at 250 rpm and 10 minute break were repeated until the total operation time reached 20 hours. Subsequently, the reaction container was cooled down to room temperature and the SnCoC-containing material was taken out. After that, the resultant was screened through a 280 mesh sieve to remove coarse grain.

The composition of the obtained SnCoC-containing material was analyzed. The tin content was 49.5 wt %, the cobalt content was 29.7 wt %, the carbon content was 19.8 wt %, and the ratio of tin and cobalt (Co/(Sn+Co)) was 37.5 wt %. At this time, the tin content and the cobalt content were measured by inductively coupled plasma (ICP) emission analysis, and the carbon content was measured by a carbon sulfur analysis device. Further, the SnCoC-containing material was analyzed by an X-ray diffraction method. A diffraction peak having half bandwidth in the range of 2θ which is 20 to 50 deg was observed. Further, after the SnCoC-containing material was analyzed by XPS, as illustrated in FIG. 5, peak P1 was obtained. After the peak P1 was analyzed, peak P2 of the surface contamination carbon and peak P3 of C1s in the SnCoC-containing material existing on the lower energy side (region lower than 284.5 eV) were obtained. From the result, it was confirmed that carbon in the SnCoC-containing material was bonded with other element.

After the SnCoC-containing material was obtained, 80 parts by mass of the SnCoC-containing material as an anode active material, 8 parts by mass of polyvinylidene fluoride as an anode binder, 11 parts by mass of graphite and 1 part by mass of acetylene black as an anode electrical conductor were mixed to obtain an anode mixture. Subsequently, the anode mixture was dispersed in N-methyl-2-pyrrolidone to obtain a paste anode mixture slurry. Finally, both surfaces of the anode current collector 22A were uniformly coated with the anode mixture slurry by using a coating device and the resultant was dried to form the anode active material layer 22B. After that, the anode active material layer 22B was compression-molded by a rolling press machine.

TABLE 19

Anode active material: SnCoC-containing material

| | Nonaqueous solvent | Electrolyte salt | Type | Content (wt %) | Others Type | Content (wt %) | Cycle retention ratio (%) | Conservation retention ratio (%) | Load retention ratio (%) |
|---|---|---|---|---|---|---|---|---|---|
| Example 7-1 | EC + DEC | $LiPF_6$ | $LiPF_3(C_2F_5)_3$ | 0.1 | $LiPF_2O_2$ | 0.2 | 44 | 85 | 90 |
| Example 7-2 | | | | | (1-1) | | 45 | 84 | 90 |
| Example 7-3 | | | | | (2-1) | | 46 | 85 | 90 |
| Example 7-4 | | | | | (3-1) | | 46 | 84 | 90 |
| Example 7-5 | | | | | $Li_2PFO_3$ | | 44 | 84 | 90 |
| Example 7-6 | EC + DEC | $LiPF_6$ | $LiBF_3(CF_3)$ | 0.1 | $LiPF_2O_2$ | 0.2 | 45 | 86 | 90 |
| Example 7-7 | | | | | (1-1) | | 45 | 85 | 90 |
| Example 7-8 | | | | | (2-1) | | 45 | 85 | 89 |
| Example 7-9 | | | | | (3-1) | | 46 | 87 | 90 |
| Example 7-10 | | | | | $Li_2PFO_3$ | | 44 | 87 | 90 |
| Example 7-11 | EC + DEC | $LiPF_6$ | $LiN(SO_2F)_2$ | 0.1 | $LiPF_2O_2$ | 0.2 | 48 | 86 | 90 |
| Example 7-12 | | | | | (1-1) | | 49 | 85 | 90 |
| Example 7-13 | | | | | (2-1) | | 49 | 85 | 89 |
| Example 7-14 | | | | | (3-1) | | 47 | 86 | 90 |
| Example 7-15 | | | | | $Li_2PFO_3$ | | 47 | 86 | 90 |

TABLE 20

Anode active material: SnCoC-containing material

| | Nonaqueous solvent | Electrolyte salt | Type | Content (wt %) | Others Type | Content (wt %) | Cycle retention ratio (%) | Conservation retention ratio (%) | Load retention ratio (%) |
|---|---|---|---|---|---|---|---|---|---|
| Example 7-16 | EC + DEC | $LiPF_6$ | — | — | — | — | 40 | 81 | 86 |
| Example 7-17 | EC + DEC | $LiPF_6$ | — | — | $LiPF_2O_2$ | 0.2 | 42 | 82 | 86 |
| Example 7-18 | | | | | (1-1) | | 42 | 82 | 84 |
| Example 7-19 | | | | | (2-1) | | 41 | 82 | 84 |
| Example 7-20 | | | | | (3-1) | | 44 | 83 | 86 |
| Example 7-21 | | | | | $Li_2PFO_3$ | | 42 | 82 | 86 |
| Example 7-22 | EC + DEC | $LiPF_6$ | $LiPF_3(C_2F_5)_3$ | 0.1 | — | — | 43 | 83 | 86 |
| Example 7-23 | | | $LiBF_3(CF_3)$ | | | | 43 | 82 | 86 |
| Example 7-24 | | | $LiN(SO_2F)_2$ | | | | 44 | 83 | 86 |

In the case where the SnCoC-containing material was used as an anode active material, results similar to those in the case of using the carbon material (Table 1 to Table 4) were obtained. That is, a high cycle retention ratio and a high conservation retention ratio were obtained, and a high load retention ratio was obtained.

From the results of Table 1 to Table 20, the following was derived. In the present invention, the electrolytic solution contains combination of the dicarbonic ester compound or the like and fluorinated lithium phosphate or the like. Thereby, cycle characteristics, conservation characteristics, and load characteristics is allowed to be improved without depending on the type of the anode active material, the composition of the nonaqueous solvent, the composition of the electrolyte salt, and the like.

In this case, increase ratios of the cycle retention ratio, the conservation retention ratio, and the load retention ratio in the case that the metal-based material (silicon) was used as an anode active material were larger than those in the case that the carbon material (artificial graphite) was used as an anode active material. Accordingly, higher effects is allowed to be obtained in the latter case than in the former case. The result may be obtained for the following reason. That is, in the case where the metal-based material advantageous to realizing a high capacity was used as an anode active material, the electrolytic solution was more easily decomposed than in a case that the carbon material was used. Accordingly, decomposition suppression effect of the electrolytic solution was significantly demonstrated.

[2. Examples of Second Embodiment]

Examples 8-1 to 8-21

The cylindrical type lithium ion secondary battery illustrated in FIG. 1 and FIG. 2 was fabricated by the following procedure.

First, the cathode 21 was formed. In this case, first, lithium carbonate ($Li_2CO_3$) and cobalt carbonate ($CoCO_3$) were mixed at a molar ratio of 0.5:1. After that, the mixture was fired in the air at 900 deg C. for 5 hours. Thereby, lithium-cobalt composite oxide ($LiCoO_2$) was obtained. Subsequently, 91 parts by mass of $LiCoO_2$ as a cathode active material, 6 parts by mass of graphite as a cathode electrical conductor, and 3 parts by mass of polyvinylidene fluoride as a cathode binder were mixed to obtain a cathode mixture. Subsequently, the cathode mixture was dispersed in N-methyl-2-pyrrolidone to obtain a paste cathode mixture slurry. Subsequently, both surfaces of the cathode current collector 21A were coated with the cathode mixture slurry by a coating device, which was dried to form the cathode active material layer 21B. As the cathode current collector 21A, a strip-shaped aluminum foil (thickness: 20 μm) was used. Finally, the cathode active material layer 21B was compression-molded by a roll pressing machine.

Next, the anode 22 was formed. In this case, first, 90 parts by mass of a carbon material (artificial graphite) as an anode active material and 10 parts by mass of polyvinylidene fluoride as an anode binder were mixed to obtain an anode mixture. Subsequently, the anode mixture was dispersed in N-methyl-2-pyrrolidone to obtain a paste anode mixture slurry. Subsequently, both surfaces of the anode current collector 22A were coated with the anode mixture slurry by a coating device, which was dried to form the anode active material layer 22B. As the anode current collector 22A, a strip-shaped electrolytic copper foil (thickness: 15 μm) was used. Finally, the anode active material layer 22B was compression-molded by a roll pressing machine.

Next, after an electrolyte salt was dissolved in a nonaqueous solvent, other materials were added to the nonaqueous solvent, and electrolytic solutions were prepared so that compositions illustrated in Table 1 were obtained. In this case, ethylene carbonate (EC) and dimethyl carbonate (DMC) were used as the nonaqueous solvent. The mixture ratio (weight ratio) of EC and DMC was 50:50. As the electrolyte salt, lithium hexafluorophosphate ($LiPF_6$) was used, and the content thereof was 1 mol/kg with respect to the solvent. Types and contents of other materials were as illustrated in Table 1.

Finally, the secondary battery was assembled by using the cathode 21, the anode 22, and the electrolytic solution. In this case, first, the cathode lead 25 was welded to the cathode current collector 21A, and the anode lead 26 was welded to the anode current collector 22A. Subsequently, the cathode 21 and the anode 22 were layered with the separator 23 in between and were spirally wound to form the spirally wound electrode body 20. After that, the center pin 24 was inserted in the center of the spirally wound electrode body. As the separator 23, a microporous polypropylene film (thickness: 25 μm) was used. Subsequently, while the spirally wound electrode body 20 was sandwiched between the pair of insulating plates 12 and 13, the spirally wound electrode body 20 was contained in the iron battery can 11 plated with nickel. At this time, the cathode lead 25 was welded to the safety valve mechanism 15, and the anode lead 26 was welded to the battery can 11. Subsequently, the electrolytic solution was injected into the battery can 11 by a depressurization method, and the separator 23 was impregnated with the electrolytic solution. Finally, at the open end of the battery can 11, the battery cover 14, the safety valve mechanism 15, and the PTC device 16 were fixed by being swaged with the gasket 17. The cylindrical type secondary battery was thereby completed. In forming the secondary battery, lithium metal was prevented from being precipitated on the anode 22 at the time of full charge by adjusting the thickness of the cathode active material layer 21B.

Cycle characteristics, conservation characteristics, and load characteristics for the secondary batteries were examined. Results illustrated in Table 21 were obtained.

In examining the cycle characteristics, first, two cycles of charge and discharge were performed in the atmosphere at 23 deg C., and the discharge capacity was measured. Subsequently, the secondary battery was charged and discharged repeatedly in the same atmosphere until the total number of cycles became 100 cycles, and thereby the discharge capacity was measured. Finally, cycle retention ratio (%)=(discharge capacity at the 100th cycle/discharge capacity at the second cycle)*100 was calculated. At the time of charge, constant current and constant voltage charge was performed at a current of 0.2 C until the voltage reached the upper limit voltage of 4.2 V. At the time of discharge, constant current discharge was performed at a current of 0.2 C until the voltage reached the final voltage of 2.5 V. "0.2 C" is a current value at which the theoretical capacity is completely discharged in 5 hours.

In examining the conservation characteristics, after 2 cycles of charge and discharge were performed in the atmosphere at 23 deg C., the discharge capacity was measured. Subsequently, after the battery was stored in a constant temperature bath at 80 deg C. for 10 days in a state of being charged again, discharge was performed in the atmosphere at 23 deg C., and the discharge capacity was measured. Finally, conservation retention ratio (%)=(discharge capacity after storage/discharge capacity before storage)*100 was calculated. Charge and discharge conditions were similar to those in the case of examining the cycle characteristics.

In examining the load characteristics, after 1 cycle of charge and discharge was performed in the atmosphere at 23 deg C., charge was performed again and the charge capacity was measured. Subsequently, discharge was performed in the same atmosphere to measure the discharge capacity. Finally, load retention ratio (%)=(charge capacity at the second cycle/discharge capacity at the second cycle)*100 was calculated. Charge and discharge conditions were similar to those in the case of examining the cycle characteristics, except for changing the current to 3C. "3C" is a current value at which the theoretical capacity is completely discharged in ⅓ hour.

TABLE 21

Anode active material: artificial graphite

| | Nonaqueous solvent | Electrolyte salt | Others Type | Content (wt %) | Type | Content (wt %) | Cycle retention ratio (%) | Conservation retention ratio (%) | Load retention ratio (%) |
|---|---|---|---|---|---|---|---|---|---|
| Example 8-1 | EC + DMC | $LiPF_6$ | (14-1) | 2 | $LiPF_2O_2$ | 0.001 | 81 | 88 | 86 |
| Example 8-2 | | | | | | 0.1 | 83 | 89 | 88 |
| Example 8-3 | | | | | | 0.2 | 86 | 90 | 91 |
| Example 8-4 | | | | | | 1 | 83 | 88 | 91 |
| Example 8-5 | | | | | | 2 | 81 | 88 | 88 |
| Example 8-6 | EC + DMC | $LiPF_6$ | (14-1) | 0.01 | $LiPF_2O_2$ | 0.2 | 80 | 86 | 86 |
| Example 8-7 | | | | 0.5 | | | 83 | 87 | 89 |
| Example 8-8 | | | | 1 | | | 82 | 90 | 91 |
| Example 8-9 | | | | 5 | | | 81 | 88 | 87 |
| Example 8-10 | EC + DMC | $LiPF_6$ | (14-1) | 2 | (9-1) | 0.2 | 84 | 89 | 91 |
| Example 8-11 | | | | | (10-1) | | 83 | 88 | 93 |
| Example 8-12 | | | | | (11-1) | | 88 | 90 | 92 |
| Example 8-13 | | | | | $Li_2PFO_3$ | | 85 | 90 | 92 |
| Example 8-14 | | | | | $LiPF_2O_2$ + (9-1) | 0.2 + 0.2 | 88 | 91 | 93 |
| Example 8-15 | EC + DMC | $LiPF_6$ | — | — | — | — | 75 | 81 | 85 |
| Example 8-16 | EC + DMC | $LiPF_6$ | — | — | $LiPF_2O_2$ | 0.2 | 78 | 82 | 85 |
| Example 8-17 | | | | | (9-1) | | 77 | 82 | 84 |
| Example 8-18 | | | | | (10-1) | | 76 | 82 | 83 |
| Example 8-19 | | | | | (11-1) | | 78 | 81 | 85 |
| Example 8-20 | | | | | $Li_2PFO_3$ | | 77 | 82 | 85 |
| Example 8-21 | EC + DMC | $LiPF_6$ | (14-1) | 2 | — | — | 79 | 82 | 85 |

In the case where combination of the compound shown in Formula (14-1) and $LiPF_2O_2$ or the like was used, a higher cycle retention ratio and a higher conservation retention ratio were obtained compared to the case that none thereof was used or the case that only either thereof was used, and the load retention ratio was increased.

More specifically, in the case where only either of the compound shown in Formula (14-1) or $LiPF_2O_2$ or the like was used, the cycle retention ratio and the conservation retention ratio were higher than those of the case that none thereof was used, while the load retention ratio was equal to or less than that of the case that none thereof was used. Meanwhile, in the case where combination of the compound shown in Formula (14-1) and $LiPF_2O_2$ or the like was used, the cycle retention ratio and the conservation retention ratio were significantly higher than those of the case that none thereof was used and those of the case that either thereof was used, and the load retention ratio was increased.

In particular, in the case where combination of the compound shown in Formula (14-1) and $LiPF_2O_2$ or the like was used, if the content of the compound shown in Formula (14-1) was from 0.01 wt % to 5 wt % both inclusive or the content of $LiPF_2O_2$ or the like was from 0.001 wt % to 2 wt % both inclusive, favorable results were obtained.

Examples 9-1 to 9-15

Secondary batteries were fabricated by a procedure similar to that of Examples 8-3 and 8-15 except that the composition of the nonaqueous solvent was changed as illustrated in Table 22, and the respective characteristics were examined. In this case, the following nonaqueous solvents were used. That is, diethyl carbonate (DEC), ethylmethyl carbonate (EMC), or propylene carbonate (PC) was used. Further, vinylene carbonate (VC), bis(fluoromethyl)carbonate (DFDMC), 4-fluoro-1,3-dioxolane-2-one (FEC), or trans-4,5-difluoro-1,3-dioxolane-2-one (TDFEC), or cis-4,5-difluoro-1,3-dioxolane-2-one (CDFEC) was used. Further, propene sultone (PRS), succinic anhydride (SCAH), or sulfopropionic anhydride (SPAH) was used. The mixture ratio of the nonaqueous solvent was EC:DEC=50:50, EC:EMC=50:50, PC:DMC=50:50, and EC:PC:DMC=10:20:70. The content of VC in the nonaqueous solvent was 2 wt %, and the contents of DFDMC, FEC, TDFEC, and CDFEC in the nonaqueous solvent were 5 wt %. In the case where FEC and VC or the like were mixed, the content of FEC in the nonaqueous solvent was 5 wt %, and the content of VC or the like in the nonaqueous solvent was 1 wt %.

TABLE 22

Anode active material: artificial graphite

| | Nonaqueous solvent | Electrolyte salt | Type | Content (wt %) | Type | Content (wt %) | Cycle retention ratio (%) | Conservation retention ratio (%) |
|---|---|---|---|---|---|---|---|---|
| Example 9-1 | EC + DEC | LiPF$_6$ | (14-1) | 2 | LiPF$_2$O$_2$ | 0.2 | 81 | 90 |
| Example 9-2 | EC + EMC | | | | | | 82 | 90 |
| Example 9-3 | EC + PC + DMC | | | | | | 86 | 90 |
| Example 9-4 | EC + DMC | | VC | | | | 90 | 92 |
| Example 9-5 | | | DFDMC | | | | 89 | 88 |
| Example 9-6 | | | FEC | | | | 90 | 90 |
| Example 9-7 | | | TDFEC | | | | 89 | 90 |
| Example 9-8 | | | CDFEC | | | | 89 | 90 |
| Example 9-9 | | | VC + FEC | | | | 92 | 94 |
| Example 9-10 | | | FEC + PRS | | | | 92 | 94 |
| Example 9-11 | | | FEC + SCAH | | | | 93 | 93 |
| Example 9-12 | | | FEC + SPAH | | | | 93 | 93 |
| Example 9-13 | EC + DMC | LiPF$_6$ | VC | | — | — | 82 | 83 |
| Example 9-14 | | | FEC | | | | 80 | 84 |
| Example 9-15 | | | TDFEC | | | | 80 | 84 |

In the case where the composition of the nonaqueous solvent was changed, a high cycle retention ratio and a high conservation retention ratio were obtained as in Table 21.

Examples 10-1 to 10-3

Secondary batteries were fabricated by a procedure similar to that of Example 21-3 except that the composition of the electrolyte salt was changed as illustrated in Table 23, and the respective characteristics were examined. In this case, as an electrolyte salt, lithium tetrafluoroborate (LiBF$_4$), (4,4,4-trifluorobutyrate oxalato) lithium borate (LiTFOB) shown in Formula (25-8), or bis(trifluoromethanesulfonyl) imide lithium (LiN(CF$_3$SO$_2$)$_2$: LiTFSI) was used. The content of LiPF$_6$ was 0.9 mol/kg with respect to the nonaqueous solvent, and the content of LiBF$_4$ or the like was 0.1 mol/kg with respect to the nonaqueous solvent.

TABLE 23

Anode active material: artificial graphite

| | Nonaqueous solvent | Electrolyte salt | | Type | Content (wt %) | Type | Content (wt %) | Cycle retention ratio (%) | Conservation retention ratio (%) |
|---|---|---|---|---|---|---|---|---|---|
| Example 10-1 | EC + DMC | LiPF$_6$ | LiBF$_4$ | (14-1) | 2 | LiPF$_2$O$_2$ | 0.2 | 85 | 92 |
| Example 10-2 | | | LiTFOB | | | | | 86 | 93 |
| Example 10-3 | | | LiTFSI | | | | | 88 | 92 |

In the case where the composition of the electrolyte salt was changed, a high cycle retention ratio and a high conservation retention ratio were obtained as in Table 21.

Examples 11-1 to 11-21

Secondary batteries were fabricated by a procedure similar to that of Examples 21-1 to 21-21 except that silicon was used as an anode active material, and the composition of the nonaqueous solvent was changed as illustrated in Table 24, and the respective characteristics were examined. In forming the anode 22, silicon was deposited on the surface of the anode current collector 22A by an evaporation method (electron beam evaporation method), and thereby the anode active material layer 22B was formed. In this case, 10 times of deposition steps were repeated to obtain the total thickness of the anode active material layer 22B of 6 μm.

cycle retention ratio, a high conservation retention ratio, and a high load retention ratio were obtained.

Examples 12-1 to 12-15

Secondary batteries were fabricated by a procedure similar to that of Examples 24-1 and 24-15 except that the composition of the nonaqueous solvent was changed as illustrated in Table 25, and the respective characteristics were examined. In this case, the mixture ratio of the nonaqueous solvent was EC:DMC=50:50, EC:EMC=50:50, PC:DMC=50:50, and EC:PC:DEC=10:20:70 at a weigh ratio. The content of VC, DFDMC, FEC, TDFEC, and CDFEC in the nonaqueous solvent were 5 wt %. In the case where FEC and VC were mixed, the content of FEC in the nonaqueous solvent was 5 wt %, and the content of VC in the nonaqueous solvent was 2 wt %. In the case where FEC,

TABLE 24

Anode active material: silicon

| | Nonaqueous solvent | Electrolyte salt | Others Type | Content (wt %) | Type | Content (wt %) | Cycle retention ratio (%) | Conservation retention ratio (%) | Load retention ratio (%) |
|---|---|---|---|---|---|---|---|---|---|
| Example 11-1 | EC + DEC | LiPF$_6$ | (14-1) | 2 | LiPF$_2$O$_2$ | 0.001 | 52 | 85 | 88 |
| Example 11-2 | | | | | | 0.1 | 53 | 88 | 89 |
| Example 11-3 | | | | | | 0.2 | 54 | 88 | 91 |
| Example 11-4 | | | | | | 1 | 54 | 86 | 89 |
| Example 11-5 | | | | | | 2 | 53 | 85 | 88 |
| Example 11-6 | EC + DEC | LiPF$_6$ | (14-1) | 0.01 | LiPF$_2$O$_2$ | 0.2 | 43 | 84 | 88 |
| Example 11-7 | | | | 0.5 | | | 45 | 85 | 90 |
| Example 11-8 | | | | 1 | | | 47 | 86 | 91 |
| Example 11-9 | | | | 5 | | | 46 | 86 | 89 |
| Example 11-10 | EC + DEC | LiPF$_6$ | (14-1) | 2 | (9-1) | 0.2 | 52 | 87 | 91 |
| Example 11-11 | | | | | (10-1) | | 50 | 88 | 93 |
| Example 11-12 | | | | | (11-1) | | 52 | 90 | 90 |
| Example 11-13 | | | | | Li$_2$PFO$_3$ | | 53 | 88 | 90 |
| Example 11-14 | | | | | LiPF$_2$O$_2$ + (9-1) | 0.2 + 0.2 | 54 | 92 | 92 |
| Example 11-15 | EC + DEC | LiPF$_6$ | — | — | — | — | 40 | 81 | 87 |
| Example 11-16 | EC + DEC | LiPF$_6$ | — | — | LiPF$_2$O$_2$ | 0.2 | 42 | 82 | 87 |
| Example 11-17 | | | | | (9-1) | | 42 | 82 | 85 |
| Example 11-18 | | | | | (10-1) | | 41 | 82 | 85 |
| Example 11-19 | | | | | (11-1) | | 44 | 83 | 87 |
| Example 11-20 | | | | | Li$_2$PFO$_3$ | | 40 | 82 | 87 |
| Example 11-21 | EC + DEC | LiPF$_6$ | (14-1) | 2 | — | — | 47 | 83 | 87 |

In the case where silicon was used as an anode active material, results similar to those in the case of using the carbon material (Table 21) were obtained. That is, a high and PRS, SCAH, or SPAH were mixed, the content of FEC in the nonaqueous solvent was 5 wt %, and the content of PRS or the like in the nonaqueous solvent was 1 wt %.

TABLE 25

Anode active material: silicon

| | Nonaqueous solvent | Electrolyte salt | Others Type | Content (wt %) | Type | Content (wt %) | Cycle retention ratio (%) | Conservation retention ratio (%) |
|---|---|---|---|---|---|---|---|---|
| Example 12-1 | EC + DMC | LiPF$_6$ | (14-1) | 2 | LiPF$_2$O$_2$ | 0.2 | 52 | 86 |
| Example 12-2 | EC + EMC | | | | | | 52 | 87 |
| Example 12-3 | EC + PC + DEC | | | | | | 52 | 90 |
| Example 12-4 | EC + DEC | VC | | | | | 76 | 90 |
| Example 12-5 | | DFDMC | | | | | 72 | 88 |
| Example 12-6 | | FEC | | | | | 75 | 88 |
| Example 12-7 | | TDFEC | | | | | 85 | 89 |
| Example 12-8 | | CDFEC | | | | | 85 | 89 |
| Example 12-9 | | VC + FEC | | | | | 80 | 92 |
| Example 12-10 | | FEC + PRS | | | | | 75 | 94 |
| Example 12-11 | | FEC + SCAH | | | | | 78 | 93 |
| Example 12-12 | | FEC + SPAH | | | | | 78 | 94 |
| Example 12-13 | EC + DEC | VC | LiPF$_6$ | — | — | — | — | 70 | 84 |
| Example 12-14 | | FEC | | | | | 60 | 84 |
| Example 12-15 | | TDFEC | | | | | 76 | 84 |

In the case where silicon was used as an anode active material, results similar to those in the case of using the carbon material (Table 22) were obtained. That is, a high cycle retention ratio and a high conservation retention ratio were obtained.

Examples 13-1 to 13-3

Secondary batteries were fabricated by a procedure similar to that of Example 24-3 except that the composition of the electrolyte salt was changed as in Examples 23-1 to 23-3, and the respective characteristics were examined.

Examples 14-1 to 14-4

Secondary batteries were fabricated by a procedure similar to that of Examples 21-3, 21-15, 21-16, and 21-21 except that the SnCoC-containing material was used as an anode active material and the composition of the nonaqueous solvent was changed as illustrated in Table 27, and the respective characteristics were examined.

In forming the anode 22, first, cobalt powder and tin powder were alloyed to obtain cobalt tin alloy powder. After that, carbon powder was added to the resultant and the

TABLE 26

Anode active material: silicon

| | Nonaqueous solvent | Electrolyte salt | | Others Type | Content (wt %) | Type | Content (wt %) | Cycle retention ratio (%) | Conservation retention ratio (%) |
|---|---|---|---|---|---|---|---|---|---|
| Example 13-1 | EC + DEC | LiPF$_6$ | LiBF$_4$ | (14-1) | 2 | LiPF$_2$O$_2$ | 0.2 | 53 | 92 |
| Example 13-2 | | | LiTFOB | | | | | 57 | 92 |
| Example 13-3 | | | LiTFSI | | | | | 53 | 92 |

In the case where silicon was used as an anode active material, results similar to those in the case of using the carbon material (Table 23) were obtained. That is, a high cycle retention ratio and a high conservation retention ratio were obtained.

resultant was dry-mixed. Subsequently, 10 g of the foregoing mixture and about 400 g of a corundum being 9 mm in diameter were set in a reaction container of a planetary ball mill available from Ito Seisakusho Co. Subsequently, inside of the reaction container was substituted by argon atmosphere. After that, 10 minute operation at 250 rpm and 10 minute break were repeated until the total operation time reached 20 hours. Subsequently, the reaction container was cooled down to room temperature and the SnCoC-containing material was taken out. After that, the resultant was screened through a 280 mesh sieve to remove coarse grain.

The composition of the obtained SnCoC-containing material was analyzed. The tin content was 49.5 wt %, the cobalt content was 29.7 wt %, the carbon content was 19.8 wt %, and the ratio of tin and cobalt (Co/(Sn+Co)) was 37.5 wt %. At this time, the tin content and the cobalt content were measured by inductively coupled plasma (ICP) emission analysis, and the carbon content was measured by a carbon sulfur analysis device. Further, the SnCoC-containing material was analyzed by an X-ray diffraction method. A diffraction peak having 1 deg or more half bandwidth in the range of 2θ which is 20 to 50 deg was observed. Further, after the SnCoC-containing material was analyzed by XPS, as illustrated in FIG. 5, peak P1 was obtained. After the peak P1 was analyzed, peak P2 of the surface contamination carbon and peak P3 of C1s in the SnCoC-containing material existing on the lower energy side (region lower than 284.5 eV) were obtained. From the result, it was confirmed that carbon in the SnCoC-containing material was bonded with other elements.

After the SnCoC-containing material was obtained, 80 parts by mass of the SnCoC-containing material as an anode active material, 8 parts by mass of polyvinylidene fluoride as an anode binder, 11 parts by mass of graphite and 1 part by mass of acetylene black as an anode electrical conductor were mixed to obtain an anode mixture. Subsequently, the anode mixture was dispersed in N-methyl-2-pyrrolidone to obtain a paste anode mixture slurry. Finally, both surfaces of the anode current collector 22A were uniformly coated with the anode mixture slurry by using a coating device and the resultant was dried to form the anode active material layer 22B. After that, the coating film was compression-molded by a rolling press machine.

acteristics are allowed to be improved without depending on the type of the anode active material, the composition of the nonaqueous solvent, the composition of the electrolyte salt, and the like.

In this case, increase ratios of the cycle retention ratio and the conservation retention ratio in the case that the metal-based material (silicon and the SnCoC-containing material) was used as an anode active material were larger than those in the case that the carbon material (artificial graphite) was used as an anode active material. Accordingly, higher effects are allowed to be obtained in the latter case than in the former case. The result may be obtained for the following reason. That is, in the case where the metal-based material advantageous to realizing a high capacity was used as an anode active material, the electrolytic solution was more easily decomposed than in a case that the carbon material was used. Accordingly, decomposition suppression effect of the electrolytic solution was significantly demonstrated.

[3. Examples of Third Embodiment]

Examples 15-1 to 15-21

The cylindrical type lithium ion secondary battery illustrated in FIG. 1 and FIG. 2 was fabricated by the following procedure.

First, the cathode 21 was formed. First, lithium carbonate ($Li_2CO_3$) and cobalt carbonate ($CoCO_3$) were mixed at a molar ratio of 0.5:1. After that, the mixture was fired in the air at 900 deg C. for 5 hours. Thereby, lithium-cobalt composite oxide ($LiCoO_2$) was obtained. Subsequently, 91 parts by mass of $LiCoO_2$ as a cathode active material, 6 parts by mass of graphite as a cathode electrical conductor, and 3 parts by mass of polyvinylidene fluoride as a cathode binder were mixed to obtain a cathode mixture. Subsequently, the cathode mixture was dispersed in N-methyl-2-pyrrolidone (NMP) to obtain a paste cathode mixture slurry. Subsequently, both surfaces of the cathode current collector 21A were coated with the cathode mixture slurry by a coating

TABLE 27

Anode active material: SnCoC-containing material

| | Nonaqueous solvent | Electrolyte salt | Others Type | Content (wt %) | Type | Content (wt %) | Cycle retention ratio (%) | Conservation retention ratio (%) | Load retention ratio (%) |
|---|---|---|---|---|---|---|---|---|---|
| Example 14-1 | EC + DEC | $LiPF_6$ | (14-1) | 2 | $LiPF_2O_2$ | 0.2 | 80 | 92 | 91 |
| Example 14-2 | EC + DEC | $LiPF_6$ | — | — | — | — | 70 | 76 | 87 |
| Example 14-3 | | | — | — | $LiPF_2O_2$ | 0.2 | 72 | 78 | 87 |
| Example 14-4 | | | (14-1) | 2 | — | — | 74 | 81 | 87 |

In the case where the SnCoC-containing material was used as an anode active material, results similar to those in the case of using the carbon material (Table 21) and in the case of using silicon (Table 24) were obtained. That is, a high cycle retention ratio, a high conservation retention ratio, and a high load retention ratio were obtained.

From the results of Table 21 to Table 27, the following was derived. In the present invention, the electrolytic solution contains combination of the dicarbonic ester compound or the like and the spirodilactone compound. Thereby, cycle characteristics, conservation characteristics, and load chardevice, which was dried to form the cathode active material layer 21B. As the cathode current collector 21A, a strip-shaped aluminum foil (thickness: 20 μm) was used. Finally, the cathode active material layer 21B was compression-molded by a roll pressing machine.

Next, the anode 22 was formed. First, 90 parts by mass of the carbon material (artificial graphite) as an anode active material and 10 parts by mass of polyvinylidene fluoride as an anode binder were mixed to obtain an anode mixture. Subsequently, the anode mixture was dispersed in NMP to obtain a paste anode mixture slurry. Subsequently, both surfaces of the anode current collector 22A were coated with the anode mixture slurry by a coating device, which was dried to form the anode active material layer 22B. As the anode current collector 22A, a strip-shaped electrolytic copper foil (thickness: 15 µm) was used. Finally, the anode active material layer 22B was compression-molded by a roll pressing machine.

Next, after an electrolyte salt (lithium hexafluorophosphate ($LiPF_6$)) was dissolved in a nonaqueous solvent (ethylene carbonate (EC) and dimethyl carbonate (DMC)), other materials were added to the resultant as needed, and electrolytic solutions were prepared. Presence, types, and contents of such other materials were as illustrated in Table 28 and Table 29. In this case, the mixture ratio (weight ratio) of the nonaqueous solvent was EC:DMC=50:50. The content of the electrolyte salt was 1 mol/kg with respect to the solvent.

Finally, the secondary battery was assembled by using the cathode 21, the anode 22, and the electrolytic solution. In this case, first, the cathode lead 25 was welded to the cathode current collector 21A, and the anode lead 26 was welded to the anode current collector 22A. Subsequently, the cathode 21 and the anode 22 were layered with the separator 23 in between and were spirally wound to form the spirally wound electrode body 20. After that, the center pin 24 was inserted in the center of the spirally wound electrode body. As the separator 23, a microporous polypropylene film (thickness: 25 µm) was used. Subsequently, while the spirally wound electrode body 20 was sandwiched between the pair of insulating plates 12 and 13, the spirally wound electrode body 20 was contained in the iron battery can 11 plated with nickel. At this time, the cathode lead 25 was welded to the safety valve mechanism 15, and the anode lead 26 was welded to the battery can 11. Subsequently, the electrolytic solution was injected into the battery can 11 by a depresurization method, and the separator 23 was impregnated with the electrolytic solution. Finally, at the open end of the battery can 11, the battery cover 14, the safety valve mechanism 15, and the PTC device 16 were fixed by being swaged with the gasket 17. The cylindrical type secondary battery was thereby completed. In forming the secondary battery, lithium metal was prevented from being precipitated on the anode 22 at the time of full charge by adjusting the thickness of the cathode active material layer 21B.

Cycle characteristics, conservation characteristics, and load characteristics for the secondary batteries were examined. Results illustrated in Table 28 and Table 29 were obtained.

In examining the cycle characteristics, first, two cycles of charge and discharge were performed in the atmosphere at 23 deg C., and the discharge capacity was measured. Subsequently, the secondary battery was charged and discharged repeatedly in the same atmosphere until the total number of cycles became 100 cycles, and thereby the discharge capacity was measured. Finally, cycle retention ratio (%)=(discharge capacity at the 100th cycle/discharge capacity at the second cycle)*100 was calculated. At the time of charge, constant current and constant voltage charge was performed at a current of 0.2 C until the voltage reached the upper limit voltage of 4.2 V. At the time of discharge, constant current discharge was performed at a current of 0.2 C until the voltage reached the final voltage of 2.5 V. "0.2 C" is a current value at which the theoretical capacity is completely discharged in 5 hours.

In examining the conservation characteristics, first, 2 cycles of charge and discharge were performed in the atmosphere at 23 deg C., the discharge capacity was measured. Subsequently, after the battery was stored in a constant temperature bath at 80 deg C. for 10 days in a state of being charged again, discharge was performed in the atmosphere at 23 deg C., and the discharge capacity was measured. Finally, conservation retention ratio (%)=(discharge capacity after storage/discharge capacity before storage)*100 was calculated. The charge and discharge conditions were similar to those in the case of examining the cycle characteristics.

In examining the load characteristics, after 1 cycle of charge and discharge was performed in the atmosphere at 23 deg C., charge was performed again and the charge capacity was measured. Subsequently, discharge was performed in the same atmosphere to measure the discharge capacity. Finally, load retention ratio (%)=(charge capacity at the second cycle/discharge capacity at the second cycle)*100 was calculated. Charge and discharge conditions were similar to those in the case of examining the cycle characteristics, except for changing the current at the time of second cycle discharge to 3C. "3C" is a current value at which the theoretical capacity is completely discharged in ⅓ hour.

TABLE 28

Anode active material: artificial graphite

|  | Nonaqueous solvent | Electrolyte salt | Type | Content (wt %) | Others Type | Content (wt %) | Cycle retention ratio (%) | Conservation retention ratio (%) | Load retention ratio (%) |
|---|---|---|---|---|---|---|---|---|---|
| Example 15-1 | EC + DMC | $LiPF_6$ | (17-1) | 2 | $LiPF_2O_2$ | 0.001 | 80 | 88 | 87 |
| Example 15-2 |  |  |  |  |  | 0.1 | 82 | 89 | 89 |
| Example 15-3 |  |  |  |  |  | 0.2 | 85 | 90 | 91 |
| Example 15-4 |  |  |  |  |  | 1 | 82 | 88 | 91 |
| Example 15-5 |  |  |  |  |  | 2 | 80 | 88 | 89 |
| Example 15-6 | EC + DMC | $LiPF_6$ | (17-1) | 0.01 | $LiPF_2O_2$ | 0.2 | 79 | 86 | 87 |
| Example 15-7 |  |  |  | 0.5 |  |  | 82 | 87 | 90 |
| Example 15-8 |  |  |  | 1 |  |  | 81 | 88 | 92 |

TABLE 28-continued

Anode active material: artificial graphite

| | Nonaqueous solvent | Electrolyte salt | Type | Content (wt %) | Others Type | Content (wt %) | Cycle retention ratio (%) | Conservation retention ratio (%) | Load retention ratio (%) |
|---|---|---|---|---|---|---|---|---|---|
| Example 15-9 | | | | 5 | | | 82 | 90 | 88 |
| Example 15-10 | | | | 10 | | | 82 | 88 | 86 |
| Example 15-11 | EC + DMC | LiPF$_6$ | (17-1) | 2 | Li$_2$PFO$_3$ | 0.2 | 85 | 90 | 92 |
| Example 15-12 | EC + DMC | LiPF$_6$ | (18-1) | 2 | LiPF$_2$O$_2$ | 0.2 | 82 | 89 | 91 |
| Example 15-13 | | | (18-7) | | | | 85 | 89 | 93 |
| Example 15-14 | EC + DMC | LiPF$_6$ | (18-1) | 2 | Li$_2$PFO$_3$ | 0.2 | 83 | 90 | 92 |
| Example 15-15 | | | (18-7) | | | | 85 | 90 | 93 |

TABLE 29

Anode active material: artificial graphite

| | Nonaqueous solvent | Electrolyte salt | Type | Content (wt %) | Others Type | Content (wt %) | Cycle retention ratio (%) | Conservation retention ratio (%) | Load retention ratio (%) |
|---|---|---|---|---|---|---|---|---|---|
| Example 15-16 | EC + DMC | LiPF$_6$ | — | — | — | — | 75 | 81 | 85 |
| Example 15-17 | EC + DMC | LiPF$_6$ | — | — | LiPF$_2$O$_2$ | 0.2 | 78 | 82 | 85 |
| Example 15-18 | | | | | Li$_2$PFO$_3$ | | 77 | 82 | 85 |
| Example 15-19 | EC + DMC | LiPF$_6$ | (17-1) | 2 | — | — | 79 | 82 | 85 |
| Example 15-20 | | | (18-1) | | | | 75 | 82 | 85 |
| Example 15-21 | | | (18-7) | | | | 76 | 84 | 85 |

In the case where combination of the dioxane compound or the like and LiPF$_2$O$_2$ or the like was used, a higher cycle retention ratio and a higher conservation retention ratio were obtained compared to the case that none thereof was used or the case that only either thereof was used, and the load retention ratio was increased.

More specifically, in the case where only either of the dioxane compound or the like or LiPF$_2$O$_2$ or the like was used, the cycle retention ratio and the conservation retention ratio were higher than those of the case that none thereof was used, while the load retention ratio was suppressed to an equivalent level to that of the case that none thereof was used. Meanwhile, in the case where combination of the dioxane compound or the like and LiPF$_2$O$_2$ or the like was used, the cycle retention ratio and the conservation retention ratio were significantly higher than those of the case that none thereof was used and those of the case that either thereof was used, and the load retention ratio was increased.

In particular, in the case where combination of the dioxane compound or the like and LiPF$_2$O$_2$ or the like was used, if the content of the dioxane compound or the like was from 0.001 wt % to 2 wt % both inclusive or the content of LiPF$_2$O$_2$ or the like was from 0.01 wt % to 10 wt % both inclusive, favorable results were obtained.

Examples 16-1 to 16-18

Secondary batteries were fabricated by a similar procedure except that other materials were added to the electrolytic solution as illustrated in Table 30, and the respective characteristics were examined.

TABLE 30

Anode active material: artificial graphite

| | Nonaqueous solvent | Electrolyte salt | Type | Content (wt %) | Others Type | Content (wt %) | Cycle retention ratio (%) | Conservation retention ratio (%) | Load retention ratio (%) |
|---|---|---|---|---|---|---|---|---|---|
| Example 16-1 | EC + DMC | LiPF$_6$ | (17-1) | 2 | LiPF$_2$O$_2$ + (19-1) | 0.2 + 0.2 | 88 | 91 | 90 |
| Example 16-2 | | | (18-1) | | | | 85 | 88 | 89 |
| Example 16-3 | | | (18-7) | | | | 87 | 91 | 89 |
| Example 16-4 | EC + DMC | LiPF$_6$ | (17-1) | 2 | LiPF$_2$O$_2$ + (20-1) | 0.2 + 0.2 | 88 | 92 | 91 |
| Example 16-5 | | | (18-1) | | | | 87 | 90 | 90 |
| Example 16-6 | | | (18-7) | | | | 87 | 92 | 91 |
| Example 16-7 | EC + DMC | LiPF$_6$ | (17-1) | 2 | LiPF$_2$O$_2$ + (21-1) | 0.2 + 0.2 | 86 | 90 | 89 |
| Example 16-8 | | | (18-1) | | | | 84 | 88 | 88 |
| Example 16-9 | | | (18-7) | | | | 86 | 90 | 90 |
| Example 16-10 | EC + DMC | LiPF$_6$ | (17-1) | 2 | Li$_2$PFO$_3$ + (19-1) | 0.2 + 0.2 | 89 | 92 | 92 |
| Example 16-11 | | | (18-1) | | | | 86 | 90 | 90 |
| Example 16-12 | | | (18-7) | | | | 88 | 92 | 92 |
| Example 16-13 | EC + DMC | LiPF$_6$ | (17-1) | 2 | Li$_2$PFO$_3$ + (20-1) | 0.2 + 0.2 | 92 | 92 | 94 |
| Example 16-14 | | | (18-1) | | | | 88 | 90 | 92 |
| Example 16-15 | | | (18-7) | | | | 90 | 91 | 94 |
| Example 16-16 | EC + DMC | LiPF$_6$ | (17-1) | 2 | Li$_2$PFO$_3$ + (21-1) | 0.2 + 0.2 | 88 | 90 | 90 |
| Example 16-17 | | | (18-1) | | | | 86 | 88 | 89 |
| Example 16-18 | | | (18-7) | | | | 88 | 90 | 90 |

In the case where the dicarbonate ester compound or the like was added to the electrolytic solution, a high cycle retention ratio, a high conservation retention ratio, and a high load retention ratio were obtained as in the results of Table 28 and Table 29. In particular, in the case where the dicarbonate ester compound or the like was added to the electrolytic solution, a cycle retention ratio, a conservation retention ratio, and a load retention ratio were more increased.

Examples 17-1 to 17-27

Secondary batteries were fabricated by a similar procedure except that the composition of the nonaqueous solvent was changed as illustrated in Table 31, and the respective characteristics were examined. In this case, the following nonaqueous solvents were used. That is, diethyl carbonate (DEC), ethylmethyl carbonate (EMC), or propylene carbonate (PC) was used. Further, vinylene carbonate (VC), bis(fluoromethyl)carbonate (DFDMC), 4-fluoro-1,3-dioxolane-2-one (FEC), or trans-4,5-difluoro-1,3-dioxolane-2-one (TDFEC), or cis-4,5-difluoro-1,3-dioxolane-2-one (CDFEC) was used. Further, propene sultone (PRS), succinic anhydride (SCAH), or sulfopropionic anhydride (SPAH) was used. The mixture ratio (weight ratio) of the nonaqueous solvent was EC:PC:DMC=10:20:70. The content of VC in the nonaqueous solvent was 2 wt %, and the contents of DFDMC, FEC, TDFEC, and CDFEC in the nonaqueous solvent were 5 wt %. In the case where FEC and VC or the like were mixed, the content of FEC in the nonaqueous solvent was 5 wt %, and the content of VC or the like in the nonaqueous solvent was 1 wt %.

TABLE 31

Anode active material: artificial graphite

| | Nonaqueous solvent | Electrolyte salt | Type | Content (wt %) | Others Type | Content (wt %) | Cycle retention ratio (%) | Conservation retention ratio (%) |
|---|---|---|---|---|---|---|---|---|
| Example 17-1 | EC + DEC | LiPF$_6$ | (17-1) | 2 | LiPF$_2$O$_2$ | 0.2 | 81 | 90 |

TABLE 31-continued

| | Anode active material: artificial graphite | | | | | | | |
|---|---|---|---|---|---|---|---|---|
| | | | Electrolyte | | Others | | Cycle retention ratio (%) | Conservation retention ratio (%) |
| | Nonaqueous solvent | | salt | Type | Content (wt %) | Type | Content (wt %) | | |

| | Nonaqueous solvent | Electrolyte salt | Type | Content (wt %) | Type | Content (wt %) | Cycle retention ratio (%) | Conservation retention ratio (%) |
|---|---|---|---|---|---|---|---|---|
| Example 17-2 | EC + EMC | | | | | | 82 | 90 |
| Example 17-3 | EC + PC + DMC | | | | | | 86 | 90 |
| Example 17-4 | EC + DMC    VC | | | | | | 90 | 92 |
| Example 17-5 | DFDMC | | | | | | 89 | 88 |
| Example 17-6 | FEC | | | | | | 90 | 90 |
| Example 17-7 | TDFEC | | | | | | 89 | 90 |
| Example 17-8 | CDFEC | | | | | | 89 | 90 |
| Example 17-9 | VC + FEC | | | | | | 92 | 94 |
| Example 17-10 | FEC + PRS | | | | | | 92 | 94 |
| Example 17-11 | FEC + SCAH | | | | | | 93 | 93 |
| Example 17-12 | FEC + SPAH | | | | | | 93 | 94 |
| Example 17-13 | EC + DEC | LiPF$_6$ | (18-7) | 2 | LiPF$_2$O$_2$ | 0.2 | 84 | 90 |
| Example 17-14 | EC + EMC | | | | | | 84 | 90 |
| Example 17-15 | EC + PC + DMC | | | | | | 86 | 90 |
| Example 17-16 | EC + DMC    VC | | | | | | 90 | 92 |
| Example 17-17 | DFDMC | | | | | | 87 | 88 |
| Example 17-18 | FEC | | | | | | 92 | 60 |
| Example 17-19 | TDFEC | | | | | | 90 | 90 |
| Example 17-20 | CDFEC | | | | | | 89 | 90 |
| Example 17-21 | VC + FEC | | | | | | 92 | 94 |
| Example 17-22 | FEC + PRS | | | | | | 93 | 94 |
| Example 17-23 | FEC + SCAH | | | | | | 94 | 93 |
| Example 17-24 | FEC + SPAH | | | | | | 95 | 94 |
| Example 17-25 | EC + DMC    VC | LiPF$_6$ | — | — | — | — | 82 | 83 |
| Example 17-26 | FEC | | | | | | 80 | 84 |
| Example 17-27 | TDFEC | | | | | | 80 | 84 |

In the case where the composition of the nonaqueous solvent was changed, a high cycle retention ratio and a high conservation retention ratio were obtained as the results of Table 28 and Table 29.

Examples 18-1 to 18-6

Secondary batteries were fabricated by a similar procedure except that the composition of the electrolyte salt was changed as illustrated in Table 32, and the respective characteristics were examined. In this case, as an electrolyte salt, lithium tetrafluoroborate ($LiBF_4$), (4,4,4-trifluorobutyrate oxalato) lithium borate (LiTFOB) shown in Formula (25-8), or bis(trifluoromethanesulfonyl)imide lithium (LiN($CF_3SO_2$)$_2$: LiTFSI) was used. The content of $LiPF_6$ was 0.9 mol/kg with respect to the nonaqueous solvent, and the content of $LiBF_4$ or the like was 0.1 mol/kg with respect to the nonaqueous solvent.

TABLE 32

| | Anode active material: artificial graphite | | | | | | | |
|---|---|---|---|---|---|---|---|---|
| | | | Others | | | | Cycle retention ratio (%) | Conservation retention ratio (%) |
| | Nonaqueous solvent | Electrolyte salt | Type | Content (wt %) | Type | Content (wt %) | | |
| Example 18-1 | EC + DMC | $LiPF_6$ | $LiBF_4$ | (17-1) | 2 | $LiPF_2O_2$ | 0.2 | 85 | 92 |
| Example 18-2 | | | LiTFOB | | | | | 88 | 92 |
| Example 18-3 | | | LiTFSI | | | | | 86 | 93 |
| Example 18-4 | EC + DMC | $LiPF_6$ | $LiBF_4$ | (18-7) | 2 | $LiPF_2O_2$ | 0.2 | 84 | 94 |
| Example 18-5 | | | LiTFOB | | | | | 87 | 92 |
| Example 18-6 | | | LiTFSI | | | | | 85 | 93 |

In the case where the composition of the electrolyte salt was changed, a high cycle retention ratio and a high conservation retention ratio were obtained as the results of Table 28 and Table 29.

Examples 19-1 to 19-21

Secondary batteries were fabricated by a procedure similar to that of Examples 28-1 to 28-21 except that silicon was used as an anode active material, and the composition of the nonaqueous solvent was changed as illustrated in Table 33 and Table 34, and the respective characteristics were examined. In forming the anode 22, silicon was deposited on the surface of the anode current collector 22A by an evaporation method (electron beam evaporation method), and thereby the anode active material layer 22B was formed. In this case, 10 times of deposition steps were repeated to obtain the total thickness of the anode active material layer 22B of 6 µm.

TABLE 33

| | Anode active material: silicon | | | | | | | |
|---|---|---|---|---|---|---|---|---|
| | | | Others | | | Cycle retention ratio (%) | Conservation retention ratio (%) | Load retention ratio (%) |
| | Nonaqueous solvent | Electrolyte salt | Type | Content (wt %) | Type | Content (wt %) | | | |
| Example 19-1 | EC + DEC | $LiPF_6$ | (17-1) | 2 | $LiPF_2O_2$ | 0.001 | 50 | 85 | 89 |
| Example 19-2 | | | | | | 0.1 | 52 | 88 | 90 |
| Example 19-3 | | | | | | 0.2 | 53 | 88 | 91 |
| Example 19-4 | | | | | | 1 | 53 | 86 | 90 |
| Example 19-5 | | | | | | 2 | 52 | 85 | 89 |
| Example 19-6 | EC + DEC | $LiPF_6$ | (17-1) | 0.01 | $LiPF_2O_2$ | 0.2 | 42 | 84 | 88 |

TABLE 33-continued

| | | | Others | | | Cycle retention ratio (%) | Conservation retention ratio (%) | Load retention ratio (%) |
|---|---|---|---|---|---|---|---|---|
| | Nonaqueous solvent | Electrolyte salt | Type | Content (wt %) | Type | Content (wt %) | | |

Anode active material: silicon

| | Nonaqueous solvent | Electrolyte salt | Type | Content (wt %) | Type | Content (wt %) | Cycle retention ratio (%) | Conservation retention ratio (%) | Load retention ratio (%) |
|---|---|---|---|---|---|---|---|---|---|
| Example 19-7 | | | | 0.5 | | | 44 | 85 | 90 |
| Example 19-8 | | | | 1 | | | 46 | 86 | 91 |
| Example 19-9 | | | | 5 | | | 48 | 86 | 89 |
| Example 19-10 | | | | 10 | | | 46 | 84 | 88 |
| Example 19-11 | EC + DEC | LiPF$_6$ | (17-1) | 2 | Li$_2$PFO$_3$ | 0.2 | 53 | 88 | 91 |
| Example 19-12 | EC + DEC | LiPF$_6$ | (18-1) | 2 | LiPF$_2$O$_2$ | 0.2 | 46 | 86 | 91 |
| Example 19-13 | | | (18-7) | | | | 52 | 88 | 92 |
| Example 19-14 | EC + DEC | LiPF$_6$ | (18-1) | 2 | Li$_2$PFO$_3$ | 0.2 | 46 | 86 | 92 |
| Example 19-15 | | | (18-7) | | | | 52 | 88 | 92 |

TABLE 34

Anode active material: silicon

| | Nonaqueous solvent | Electrolyte salt | Type | Content (wt %) | Type | Content (wt %) | Cycle retention ratio (%) | Conservation retention ratio (%) | Load retention ratio (%) |
|---|---|---|---|---|---|---|---|---|---|
| Example 19-16 | EC + DEC | LiPF$_6$ | — | — | — | — | 40 | 81 | 85 |
| Example 19-17 | EC + DEC | LiPF$_6$ | — | — | LiPF$_2$O$_2$ | 0.2 | 42 | 82 | 85 |
| Example 19-18 | | | | | Li$_2$PFO$_3$ | | 40 | 82 | 85 |
| Example 19-19 | EC + DEC | LiPF$_6$ | (17-1) | 2 | — | — | 47 | 83 | 85 |
| Example 19-20 | | | (18-1) | | | | 45 | 82 | 85 |
| Example 19-21 | | | (18-7) | | | | 48 | 85 | 85 |

In the case where the SnCoC-containing material was used as an anode active material, results similar to those in the case of using the carbon material (Table 28 and Table 29) were obtained. That is, a high cycle retention ratio, a high conservation retention ratio, and a high load retention ratio were obtained.

Examples 20-1 to 20-18

Secondary batteries were fabricated by a similar procedure except that the composition of the electrolytic solution was changed as illustrated in Table 35, and the respective characteristics were examined.

TABLE 35

Anode active material: silicon

| | Nonaqueous solvent | Electrolyte salt | Type | Content (wt %) | Type | Content (wt %) | Cycle retention ratio (%) | Conservation retention ratio (%) | Load retention ratio (%) |
|---|---|---|---|---|---|---|---|---|---|
| Example 20-1 | EC + DEC | LiPF$_6$ | (17-1) | 2 | LiPF$_2$O$_2$ + (19-1) | 0.2 + 0.2 | 54 | 92 | 92 |
| Example 20-2 | | | (18-1) | | | | 54 | 91 | 92 |
| Example 20-3 | | | (18-7) | | | | 56 | 92 | 92 |

TABLE 35-continued

| | | | | Others | | Cycle retention ratio (%) | Conservation retention ratio (%) | Load retention ratio (%) |
|---|---|---|---|---|---|---|---|---|
| | Nonaqueous solvent | Electrolyte salt | Type | Content (wt %) | Type | Content (wt %) | | | |
| Example 20-4 | EC + DEC | LiPF$_6$ | (17-1) | 2 | LiPF$_2$O$_2$ + (20-1) | 0.2 + 0.2 | 55 | 93 | 93 |
| Example 20-5 | | | (18-1) | | | | 54 | 92 | 93 |
| Example 20-6 | | | (18-7) | | | | 55 | 92 | 93 |
| Example 20-7 | EC + DEC | LiPF$_6$ | (17-1) | 2 | LiPF$_2$O$_2$ + (21-1) | 0.2 + 0.2 | 54 | 92 | 93 |
| Example 20-8 | | | (18-1) | | | | 53 | 91 | 92 |
| Example 20-9 | | | (18-7) | | | | 54 | 92 | 92 |
| Example 20-10 | EC + DEC | LiPF$_6$ | (17-1) | 2 | Li$_2$PFO$_3$ + (19-1) | 0.2 + 0.2 | 55 | 93 | 93 |
| Example 20-11 | | | (18-1) | | | | 54 | 92 | 92 |
| Example 20-12 | | | (18-7) | | | | 57 | 93 | 93 |
| Example 20-13 | EC + DEC | LiPF$_6$ | (17-1) | 2 | Li$_2$PFO$_3$ + (20-1) | 0.2 + 0.2 | 56 | 93 | 93 |
| Example 20-14 | | | (18-1) | | | | 55 | 92 | 92 |
| Example 20-15 | | | (18-7) | | | | 58 | 93 | 93 |
| Example 20-16 | EC + DEC | LiPF$_6$ | (17-1) | 2 | Li$_2$PFO$_3$ + (21-1) | 0.2 + 0.2 | 54 | 91 | 92 |
| Example 20-17 | | | (18-1) | | | | 54 | 90 | 92 |
| Example 20-18 | | | (18-7) | | | | 54 | 92 | 93 |

In the case where silicon was used as an anode active material, a high cycle retention ratio, a high conservation retention ratio, and a high load retention ratio were obtained as in the case of using the carbon material (Table 30).

Examples 21-1 to 21-27

Secondary batteries were fabricated by a similar procedure except that the composition of the nonaqueous solvent was changed as illustrated in Table 36, and the respective characteristics were examined.

TABLE 36

Anode active material: silicon

| | Nonaqueous solvent | Electrolyte salt | Others | | | | Cycle retention ratio (%) | Conservation retention ratio (%) |
|---|---|---|---|---|---|---|---|---|
| | | | Type | Content (wt %) | Type | Content (wt %) | | |
| Example 21-1 | EC + DMC | LiPF$_6$ | (17-1) | 2 | LiPF$_2$O$_2$ | 0.2 | 52 | 86 |
| Example 21-2 | EC + EMC | | | | | | 52 | 87 |
| Example 21-3 | EC + PC + DMC | | | | | | 52 | 90 |
| Example 21-4 | EC + DMC | VC | | | | | 64 | 90 |
| Example 21-5 | | DFDMC | | | | | 65 | 88 |
| Example 21-6 | | FEC | | | | | 65 | 88 |
| Example 21-7 | | TDFEC | | | | | 75 | 89 |

TABLE 36-continued

| | Anode active material: silicon | | | | | | | |
|---|---|---|---|---|---|---|---|---|
| | | | | Others | | | Cycle retention | Conservation retention |
| | Nonaqueous solvent | Electrolyte salt | Type | Content (wt %) | Type | Content (wt %) | ratio (%) | ratio (%) |
| Example 21-8 | CDFEC | | | | | | 75 | 89 |
| Example 21-9 | VC + FEC | | | | | | 72 | 92 |
| Example 21-10 | FEC + PRS | | | | | | 66 | 94 |
| Example 21-11 | FEC + SCAH | | | | | | 70 | 93 |
| Example 21-12 | FEC + SPAH | | | | | | 70 | 94 |
| Example 21-13 | EC + DMC | LiPF$_6$ | (18-7) | 2 | LiPF$_2$O$_2$ | 0.2 | 54 | 86 |
| Example 21-14 | EC + EMC | | | | | | 55 | 87 |
| Example 21-15 | EC + PC + DMC | | | | | | 55 | 90 |
| Example 21-16 | EC + DMC  VC | | | | | | 65 | 90 |
| Example 21-17 | DFDMC | | | | | | 69 | 88 |
| Example 21-18 | FEC | | | | | | 68 | 88 |
| Example 21-19 | TDFEC | | | | | | 78 | 89 |
| Example 21-20 | CDFEC | | | | | | 78 | 89 |
| Example 21-21 | VC + FEC | | | | | | 76 | 92 |
| Example 21-22 | FEC + PRS | | | | | | 68 | 94 |
| Example 21-23 | FEC + SCAH | | | | | | 75 | 93 |
| Example 21-24 | FEC + SPAH | | | | | | 78 | 94 |
| Example 21-25 | EC + DMC  VC | LiPF$_6$ | — | — | — | — | 70 | 84 |
| Example 21-26 | FEC | | | | | | 60 | 84 |
| Example 21-27 | TDFEC | | | | | | 76 | 84 |

In the case where silicon was used as an anode active material, a high cycle retention ratio and a high conservation retention ratio were obtained as in the case of using the carbon material (Table 31).

Examples 22-1 to 22-6

Secondary batteries were fabricated by a similar procedure except that the composition of the electrolyte salt was changed as illustrated in Table 37, and the respective characteristics were examined.

TABLE 37

| | Anode active material: silicon | | | | | | | |
|---|---|---|---|---|---|---|---|---|
| | | | | Others | | | Cycle retention | Conservation retention |
| | Nonaqueous solvent | Electrolyte salt | | Type | Content (wt %) | Type | Content (wt %) | ratio (%) | ratio (%) |
| Example 22-1 | EC + DEC | LiPF$_6$  LiBF$_4$ | (17-1) | 2 | LiPF$_2$O$_2$ | 0.2 | 53 | 92 |
| Example 22-2 | | LiTFOB | | | | | 53 | 92 |

TABLE 37-continued

Anode active material: silicon

| | Nonaqueous solvent | Electrolyte salt | Others Type | Content (wt %) | Type | Content (wt %) | Cycle retention ratio (%) | Conservation retention ratio (%) |
|---|---|---|---|---|---|---|---|---|
| Example 22-3 | | LiTFSI | | | | | 57 | 92 |
| Example 22-4 | EC + DEC | LiPF$_6$ | LiBF$_4$ | (18-7) | 2 | LiPF$_2$O$_2$ | 0.2 | 55 | 94 |
| Example 22-5 | | LiTFOB | | | | | 55 | 94 |
| Example 22-6 | | LiTFSI | | | | | 58 | 94 |

In the case where silicon was used as an anode active material, a high cycle retention ratio and a high conservation retention ratio were obtained as in the case of using the carbon material (Table 32).

Examples 23-1 to 23-4

Secondary batteries were fabricated by a similar procedure except that the SnCoC-containing material was used as an anode active material as illustrated in Table 38, and the respective characteristics were examined.

In forming the anode 22, first, cobalt powder and tin powder were alloyed to obtain cobalt tin alloy powder. After that, carbon powder was added to the resultant and the resultant was dry-mixed. Subsequently, 10 g of the foregoing mixture and about 400 g of a corundum being 9 mm in diameter were set in a reaction container of a planetary ball mill available from Ito Seisakusho Co. Subsequently, inside of the reaction container was substituted by argon atmosphere. After that, 10 minute operation at 250 rpm and 10 minute break were repeated until the total operation time reached 20 hours. Subsequently, the reaction container was cooled down to room temperature and the SnCoC-containing material was taken out. After that, the resultant was screened through a 280 mesh sieve to remove coarse grain.

The composition of the SnCoC-containing material was analyzed. The tin content was 49.5 wt %, the cobalt content was 29.7 wt %, the carbon content was 19.8 wt %, and the ratio of tin and cobalt (Co/(Sn+Co)) was 37.5 wt %. At this time, the tin content and the cobalt content were measured by inductively coupled plasma (ICP) emission analysis, and the carbon content was measured by a carbon sulfur analysis device. Further, the SnCoC-containing material was analyzed by an X-ray diffraction method. A diffraction peak having half bandwidth in the range of 2θ which is 20 to 50 deg was observed. Further, after the SnCoC-containing material was analyzed by XPS, as illustrated in FIG. 5, peak P1 was obtained. After the peak P1 was analyzed, peak P2 of the surface contamination carbon and peak P3 of C1s in the SnCoC-containing material existing on the lower energy side (region lower than 284.5 eV) were obtained. From the result, it was confirmed that carbon in the SnCoC-containing material was bonded with other elements.

80 parts by mass of the SnCoC-containing material as an anode active material, 8 parts by mass of polyvinylidene fluoride as an anode binder, 11 parts by mass of graphite and 1 part by mass of acetylene black as an anode electrical conductor were mixed to obtain an anode mixture. Subsequently, the anode mixture was dispersed in NMP to obtain a paste anode mixture slurry. Finally, both surfaces of the anode current collector 22A were coated with the anode mixture slurry by using a coating device and the resultant was dried to form the anode active material layer 22B. After that, the anode active material layer 22B was compression-molded by a rolling press machine.

TABLE 38

Anode active material: SnCoC-containing material

| | Nonaqueous solvent | Electrolyte salt | Others Type | Content (wt %) | Type | Content (wt %) | Cycle retention ratio (%) | Conservation retention ratio (%) | Load retention ratio (%) |
|---|---|---|---|---|---|---|---|---|---|
| Example 23-1 | EC + DEC | LiPF$_6$ | (18-7) | 2 | LiPF$_2$O$_2$ | 0.2 | 80 | 92 | 91 |
| Example 23-2 | EC + DEC | LiPF$_6$ | — | — | — | — | 70 | 76 | 87 |
| Example 23-3 | EC + DEC | LiPF$_6$ | — | — | LiPF$_2$O$_2$ | 0.2 | 72 | 78 | 87 |
| Example 23-4 | EC + DEC | LiPF$_6$ | (18-7) | 2 | — | — | 74 | 81 | 87 |

In the case where the SnCoC-containing material was used as an anode active material, results similar to those in the case of using the carbon material (Table 28 and Table 29) were obtained. That is, a high cycle retention ratio and a high conservation retention ratio were obtained, and a high load retention ratio was obtained.

From the results of Table 28 to Table 38, the following was derived. In the present invention, the electrolytic solution contains combination of fluorinated lithium phosphate or the like and the dioxane compound or the like. Therefore, cycle characteristics, conservation characteristics, and load characteristics are allowed to be improved without depending on the type of the anode active material, the composition of the nonaqueous solvent, the composition of the electrolyte salt, and the like.

In this case, increase ratios of the cycle retention ratio, the conservation retention ratio, and the load retention ratio in the case that the metal-based material (silicon or the SnCoC-containing material) was used as an anode active material were larger than those in the case that the carbon material (artificial graphite) was used as an anode active material. Accordingly, higher effects are allowed to be obtained in the latter case t than in the former case. The result may be obtained for the following reason. That is, in the case where the metal-based material advantageous to realizing a high capacity was used as an anode active material, the electrolytic solution was more easily decomposed than in a case that the carbon material was used. Accordingly, decomposition suppression effect of the electrolytic solution was significantly demonstrated.

The present invention has been described with reference to the embodiments and the examples. However, the present invention is not limited to the aspects described in the embodiments and the examples, and various modifications may be made. For example, use application of the electrolytic solution of the present invention is not necessarily limited to the secondary battery, but may be other devices such as a capacitor.

Further, in the embodiments and the examples, the description has been given of the lithium ion secondary battery or the lithium metal secondary battery as a secondary battery type. However, the secondary battery of the present invention is not limited thereto. The secondary battery of the present invention is similarly applicable to a secondary battery in which the anode capacity includes the capacity by inserting and extracting lithium ions and the capacity associated with precipitation and dissolution of lithium metal, and the anode capacity is expressed by the sum of these capacities. In this case, an anode material capable of inserting and extracting lithium ions is used as an anode active material, and the chargeable capacity of the anode material is set to a smaller value than the discharge capacity of the cathode.

Further, in the embodiments and the examples, the description has been given with the specific examples of the case in which the battery structure is the cylindrical type or the laminated film type, and with the specific example in which the battery device has the spirally wound structure. However, applicable structures are not limited thereto. The secondary battery of the present invention is similarly applicable to a battery having other battery structures such as a square type battery, a coin type battery, and a button type battery, or a battery in which the battery device has other structures such as a laminated structure.

Further, in the embodiments and the examples, the description has been given of the case using lithium as an element of a carrier. However, the carrier is not necessarily limited thereto. As a carrier, for example, other Group 1 element such as sodium (Na) and potassium (K), Group 2 elements such as magnesium and calcium, or other light metals such as aluminum may be used. The effect of the present invention may be obtained without depending on the carrier type, and thus, even if the carrier type is changed, similar effect is allowed to be obtained.

Further, in the embodiments and the examples, for the contents of the dicarbonic ester compound or the like or fluorinated lithium phosphate or the like, the description has been given of the appropriate ranges derived from the results of the examples. However, the description does not totally deny a possibility that the contents are out of the foregoing ranges. That is, the foregoing appropriate ranges are the ranges particularly preferable for obtaining the effects of the present invention. Therefore, as long as the effects of the invention are obtained, the contents may be out of the foregoing ranges in some degrees.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
a cathode;
an anode; and
an electrolytic solution, wherein
the electrolytic solution includes a nonaqueous solvent, an electrolyte salt, one or more of compounds represented by formulas (1), (2), (4) and (5), and one or more of compounds represented by formula (6) and formula (7):

[formula 1]

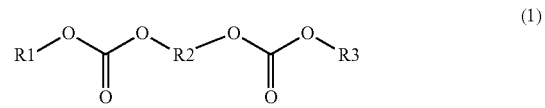

(1)

where R1 and R3 is an alkyl group, an alkenyl group, an alkynyl group, an aryl group, or a heterocyclic group; an alkyl group, an alkenyl group, or an alkynyl group partially substituted by an aromatic hydrocarbon group or an alicyclic hydrocarbon group; or a halogenated group thereof, and where R2 is a straight-chain or branched alkylene group, an arylene group, a divalent group including an arylene group and an alkylene group, a divalent group having carbon number from 2 to 12 both inclusive and including an ether bond (—O—) and an alkylene group, or a halogenated group thereof

[formula 2]

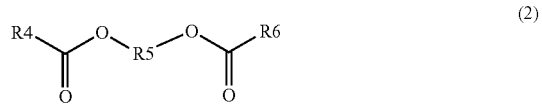

(2)

where R4 and R6 is an alkyl group, an alkenyl group, an alkynyl group, an aryl group, or a heterocyclic group; an alkyl group, an alkenyl group, or an alkynyl group partially substituted by an aromatic hydrocarbon group or an alicyclic hydrocarbon group; or a halogenated group thereof, and where R5 is a straight-chain or branched alkylene group, an arylene group, a divalent group including an arylene group and an alkylene group, a divalent group having carbon number from 2 to 12 both inclusive and including an ether bond and an alkylene group, or a halogenated group thereof $$Li_2PFO_3 \quad \text{(formula 4)}$$

$$LiPF_2O_2 \quad \text{(formula 5)}$$

$$Li[PF_mR10_{6-m}] \quad \text{(formula 6)}$$

where R10 is a perfluoroalkyl group or a perfluoroaryl group. m is one of integer numbers from 0 to 5 both inclusive $$Li[BF_nR11_{4-n}] \quad \text{(formula 7)}$$

where R11 is a perfluoroalkyl group or a perfluoroaryl group, n is one of integer numbers from 0 to 3 both inclusive.

2. The secondary battery according to claim 1, wherein
the formula (1) is one or more of formula (1-1) to formula (1-12),
the formula (2) is one or more of formula (2-1) to formula (2-17),
the formula (6) is one or more of Li[PF$_3$(CF$_3$)$_3$], Li[PF$_3$(C$_2$F$_5$)$_3$], Li[PF$_4$(C$_2$F$_5$)$_2$], Li[PF$_4$(CF$_3$)$_2$], Li[PF$_4$(C$_3$F$_7$)$_2$], Li[PF$_5$(CF$_3$)], Li[PF$_5$(C$_2$F$_5$)], Li[PF$_5$(C$_3$F$_7$)], Li[PF$_2$(C$_2$F$_5$)$_4$], and Li[PF$_2$(CF$_3$)$_4$], and
the formula (7) means one or more of Li[BF$_3$(CF$_3$)], Li[BF$_3$(C$_2$F$_5$)], Li[BF$_2$(CF$_3$)$_2$], Li[BF(CF$_3$)$_3$], Li[B(CF$_3$)$_4$], Li[BF$_2$(C$_2$F$_5$)$_2$], Li[BF(C$_2$F$_5$)$_3$], Li[B(C$_2$F$_5$)$_4$], Li[BF$_3$(C$_3$F$_7$)], Li[BF$_2$(C$_3$F$_7$)$_2$], Li[BF(C$_3$F$_7$)$_3$], and Li[B(C$_3$F$_7$)$_4$], wherein formulas (1-1) to (1-12) are as follows:

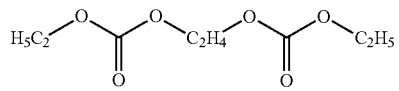 (1-1)

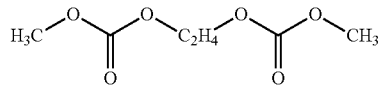 (1-2)

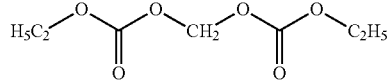 (1-3)

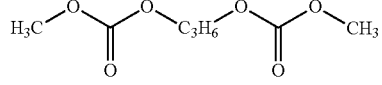 (1-4)

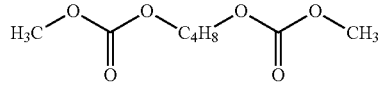 (1-5)

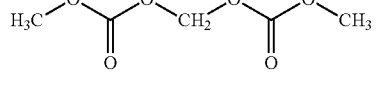 (1-6)

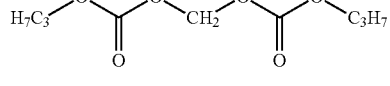 (1-7)

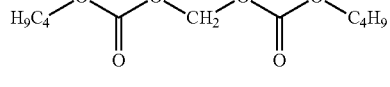 (1-8)

-continued

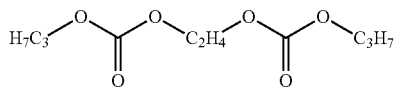 (1-9)

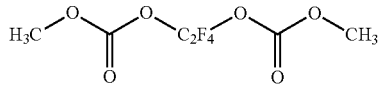 (1-10)

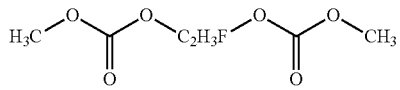 (1-11)

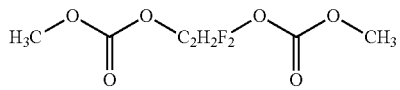 (1-12)

wherein formulas (2-1) to (2-9) are as follows:

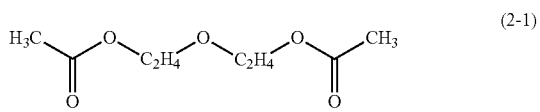 (2-1)

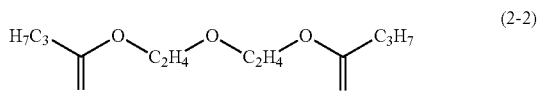 (2-2)

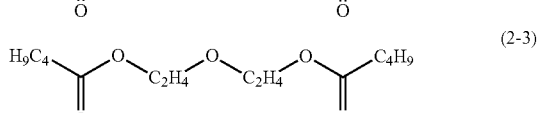 (2-3)

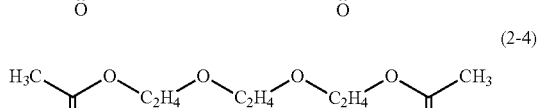 (2-4)

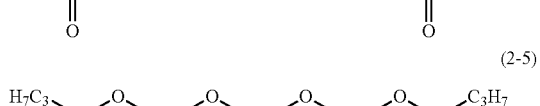 (2-5)

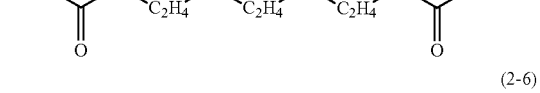 (2-6)

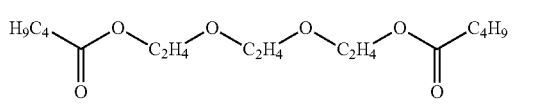 (2-7)

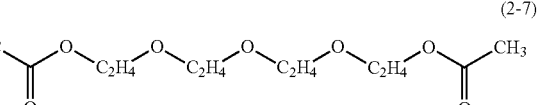 (2-8)

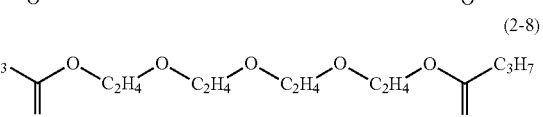 (2-9)

wherein formulas (2-10) to (2-17) are as follows:

(2-10) 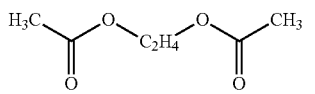

(2-11) 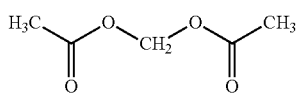

(2-12) 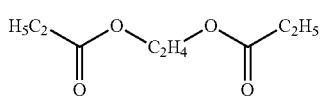

(2-13) 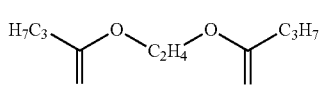

(2-14) 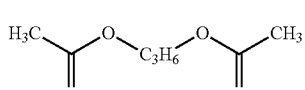

(2-15) 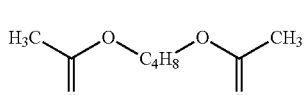

(2-16) 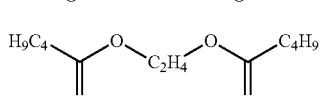

(2-17) 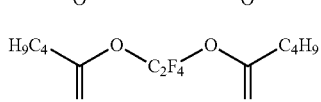

(3-1) 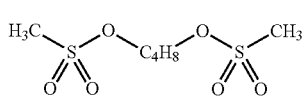

(3-2) 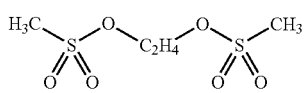

(3-3) 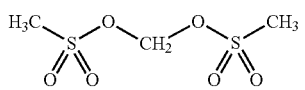

(3-4) 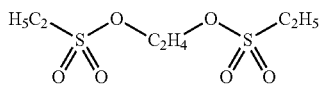

(3-6) 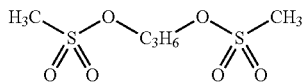

(3-7) 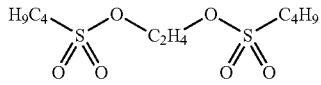

(3-8) 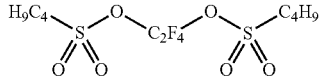

(3-9) 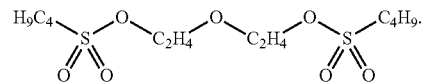

3. The secondary battery according to claim 1, wherein content of the compounds shown in the formula (1) to the formula (5) in the electrolytic solution is from 0.001 weight percent to 2 weight percent both inclusive, and content of the compounds shown in the formula (6) to the formula (8) in the electrolytic solution is from 0.01weight percent to 0.5 weight percent both inclusive.

4. The secondary battery according to claim 1, wherein the anode includes, as an anode active material, a carbon material, a lithium metal (Li), or a material being capable of inserting and extracting lithium ions and having one or more of metal elements and metalloid elements as constituent elements.

5. An electrolytic solution comprising:
a nonaqueous solvent;
an electrolyte salt;
one or more of compounds represented by formulas (1), (2), (4) and (5); and
one or more of compounds represented by formula (6) and formula(7), wherein
the electrolytic solution is used for a second battery

[formula 1]

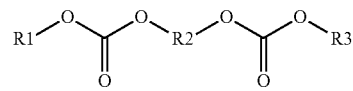 (1)

where R1 and R3 is an alkyl group, an alkenyl group, an alkynyl group, an aryl group, or a heterocyclic group; an alkyl group, an alkenyl group, or an alkynyl group partially substituted by an aromatic hydrocarbon group or an alicyclic hydrocarbon group; or a halogenated group thereof, and where R2 is a straight-chain or branched alkylene group, an arylene group, a divalent group including an arylene group and an alkylene group, a divalent group having carbon number from 2 to 12 both inclusive and including an ether bond (—O—) and an alkylene group, or a halogenated group thereof

[formula 2]

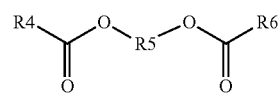 (2)

where R4 and R6 is an alkyl group, an alkenyl group, an alkynyl group, an aryl group, or a heterocyclic group; an alkyl group, an alkenyl group, or an alkynyl group partially substituted by an aromatic hydrocarbon group or an alicyclic hydrocarbon group; or a halogenated group thereof, and where R5 is a straight-chain or branched alkylene group, an arylene group, a divalent group including an arylene group and an alkylene group, a divalent group having carbon number from 2 to 12 both inclusive and including an ether bond and an alkylene group, or a halogenated group thereof $$Li_2PFO_3 \quad (4)$$

$$LiPF_2O_2 \quad (5)$$

$$Li[PF_mR10_{6-m}] \quad (6)$$

where R10 is a perfluoroalkyl group or a perfluoroaryl group, m is one of integer numbers from 0 to 5 both inclusive;

$$Li[BF_nR11_{4-n}] \quad (7)$$

where R11 is a perfluoroalkyl group or a perfluoroaryl group, n is one of integer numbers from 0 to 3 both inclusive.

6. A battery pack comprising:
the secondary battery according to claim 1;
a control section controlling the secondary battery; and
an outer package containing the secondary battery.

7. An electronic device, the electronic device being supplied with electric power from the secondary battery according to claim 1.

8. An electrical vehicle comprising:
a conversion unit being supplied with electric power from the secondary battery according claim 1, and converting the electric power to drive power of the vehicle; and
a control unit performing information processing related to vehicle control based on information of the secondary battery.

* * * * *